US011040876B2

(12) United States Patent
Hu et al.

(10) Patent No.: US 11,040,876 B2
(45) Date of Patent: Jun. 22, 2021

(54) CATALYSTS AND PROCESSES FOR TUNABLE BASE-GROWN MULTIWALLED CARBON NANOTUBES

(71) Applicant: West Virginia University, Morgantown, WV (US)

(72) Inventors: Jianli Hu, Morgantown, WV (US); Deepa Ayillath Kutteri, Morgantown, WV (US); I-Wen Wang, Morgantown, WV (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 0 days.

(21) Appl. No.: 16/134,352

(22) Filed: Sep. 18, 2018

(65) Prior Publication Data

US 2019/0084832 A1   Mar. 21, 2019

Related U.S. Application Data

(60) Provisional application No. 62/559,930, filed on Sep. 18, 2017.

(51) Int. Cl.
| | |
|---|---|
| *C01B 3/26* | (2006.01) |
| *C01B 32/162* | (2017.01) |
| *B01J 35/10* | (2006.01) |
| *B01J 23/745* | (2006.01) |
| *B01J 23/75* | (2006.01) |
| *B01J 23/755* | (2006.01) |
| *B01J 35/00* | (2006.01) |
| *B82Y 40/00* | (2011.01) |
| *B82Y 30/00* | (2011.01) |

(52) U.S. Cl.
CPC .............. *C01B 3/26* (2013.01); *B01J 23/745* (2013.01); *B01J 23/75* (2013.01); *B01J 23/755* (2013.01); *B01J 35/002* (2013.01); *B01J 35/1014* (2013.01); *B01J 35/1019* (2013.01); *B01J 35/1038* (2013.01); *B01J 35/1047* (2013.01); *C01B 32/162* (2017.08); *B82Y 30/00* (2013.01); *B82Y 40/00* (2013.01); *C01B 2202/06* (2013.01); *C01B 2203/0277* (2013.01); *C01B 2203/1047* (2013.01); *C01B 2203/1052* (2013.01); *C01B 2203/1058* (2013.01); *C01B 2203/1082* (2013.01); *C01B 2203/1235* (2013.01); *C01B 2203/1241* (2013.01)

(58) Field of Classification Search
CPC ....................................................... C01B 3/26
USPC ......................................................... 423/445
See application file for complete search history.

(56) References Cited

U.S. PATENT DOCUMENTS

| | | | |
|---|---|---|---|
| 6,413,487 B1 | 7/2002 | Resasco et al. | |
| 6,919,064 B2 | 7/2005 | Resasco et al. | |
| 7,923,615 B2 | 4/2011 | Silvy et al. | |
| 2007/0281452 A1* | 12/2007 | Sandhu ................. | B82Y 10/00 438/584 |
| 2008/0279753 A1 | 11/2008 | Harutyunyan | |
| 2009/0087372 A1 | 4/2009 | Buchholz et al. | |
| 2012/0219490 A1 | 8/2012 | Noda et al. | |
| 2013/0072077 A1* | 3/2013 | Steiner, III ............ | B82Y 30/00 442/59 |
| 2013/0224106 A1 | 8/2013 | Basset et al. | |
| 2013/0302241 A1* | 11/2013 | Pieterse ................... | B01J 21/02 423/654 |
| 2016/0129423 A1* | 5/2016 | Basset ...................... | C07C 2/76 423/651 |
| 2016/0129424 A1 | 5/2016 | Pant et al. | |
| 2016/0318764 A1 | 11/2016 | Raman et al. | |

FOREIGN PATENT DOCUMENTS

| | | | |
|---|---|---|---|
| GB | 1567003 | * | 5/1980 |
| WO | 2006040788 A1 | | 4/2006 |

OTHER PUBLICATIONS

Villacampa et al., Catalytic decomposition of methane over Ni-Al2O3 coprecipitated catalysts Reaction and regeneration studies, Applied Catalysis A: General 252, p. 363-383, 2003.
Hao et al., Agglomerated CNTs synthesized in a fluidized bed reactor:Agglomerate structure and formation mechanism, Carbon 41, p. 2855-2863, 2003.
Purohit et al., Carbon Nanotubes and Their Growth Methods, Procedia Materials Science 6, p. 716-728, 2014.
Shah et al., Hydrogen Production by Catalytic Decomposition of Methane, Energy & Fuels, 15, p. 1528-1534, 2001.
Li et al., Simultaneous Production of Hydrogen and Nanocarbon from Decomposition of Methane on a Nickel-Based Catalyst, Energy & Fuels, 14, p. 1188-1194, 2000.
Saraswat et al., NieCueZn/MCM-22 catalysts for simultaneous production of hydrogen and multiwall carbon nanotubes via thermocatalytic decomposition of methane, International Journal of Hydrogen Energy 36, p. 13352-13360, 2011.
International Search Report issued for PCT/US2018/51545, dated Dec. 4, 2018.

* cited by examiner

Primary Examiner — Douglas B Call
(74) Attorney, Agent, or Firm — Innovators Legal

(57) ABSTRACT

In various aspects, the present disclosure is directed to methods and compositions for the simultaneous production of carbon nanotubes and hydrogen gas from lower hydrocarbon comprises methane, ethane, propane, butane, or a combination thereof utilizing the disclosed catalysts. In various aspects, the disclosure relates to methods for COx-free production of hydrogen with concomitant production of carbon nanotubes. Also disclosed are methods and compositions for selective base grown carbon nanotubes over a disclosed catalyst composition. In a further aspect, the disclosure relates to mono, bimetallic, and trimetallic catalysts comprising a 3d transition metal (e.g., Ni, Fe, Co, Mn, Cr, Mo, and combinations thereof) over a support material selected from a silica, an alumina, a zeolite, titatnium dioxide, and combinations thereof. This abstract is intended as a scanning tool for purposes of searching in the particular art and is not intended to be limiting of the present disclosure.

18 Claims, 47 Drawing Sheets

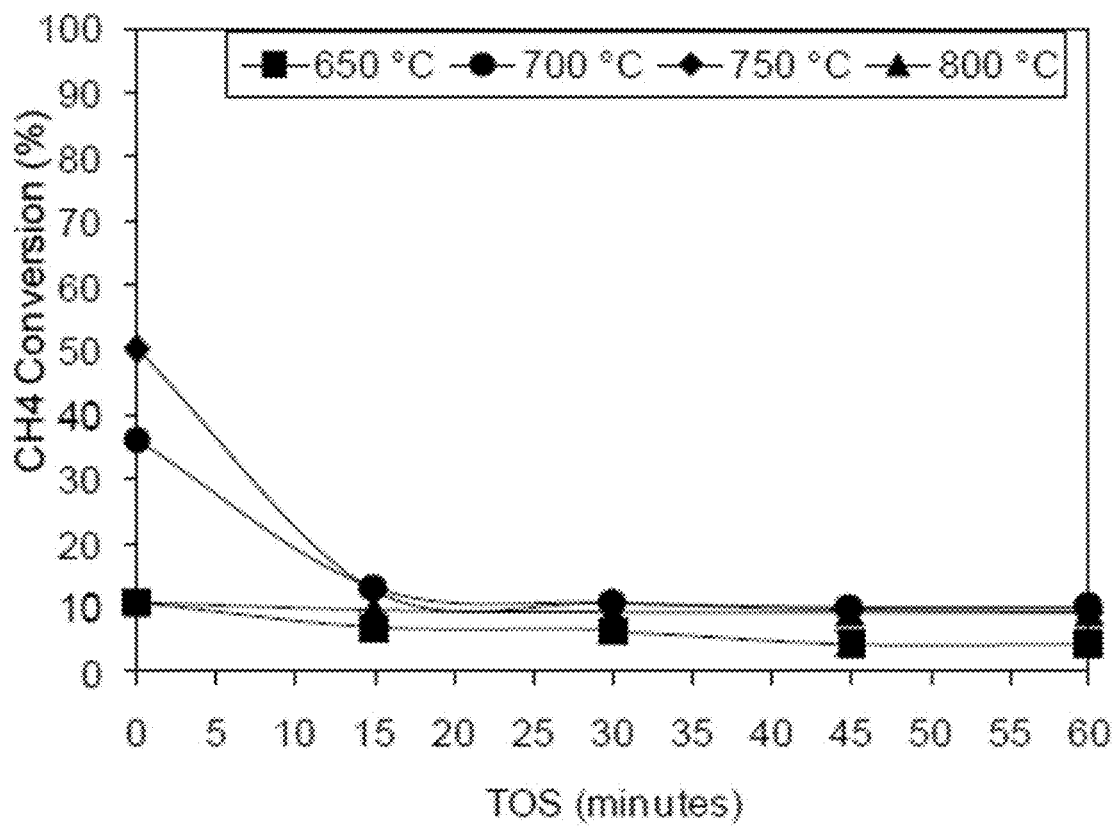
FIG. 10
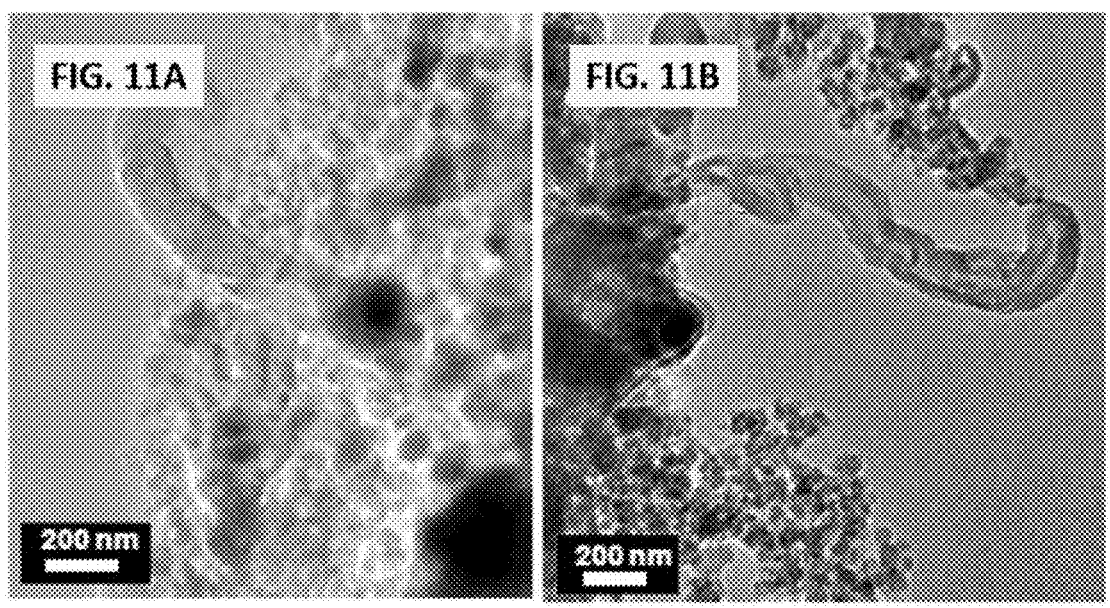

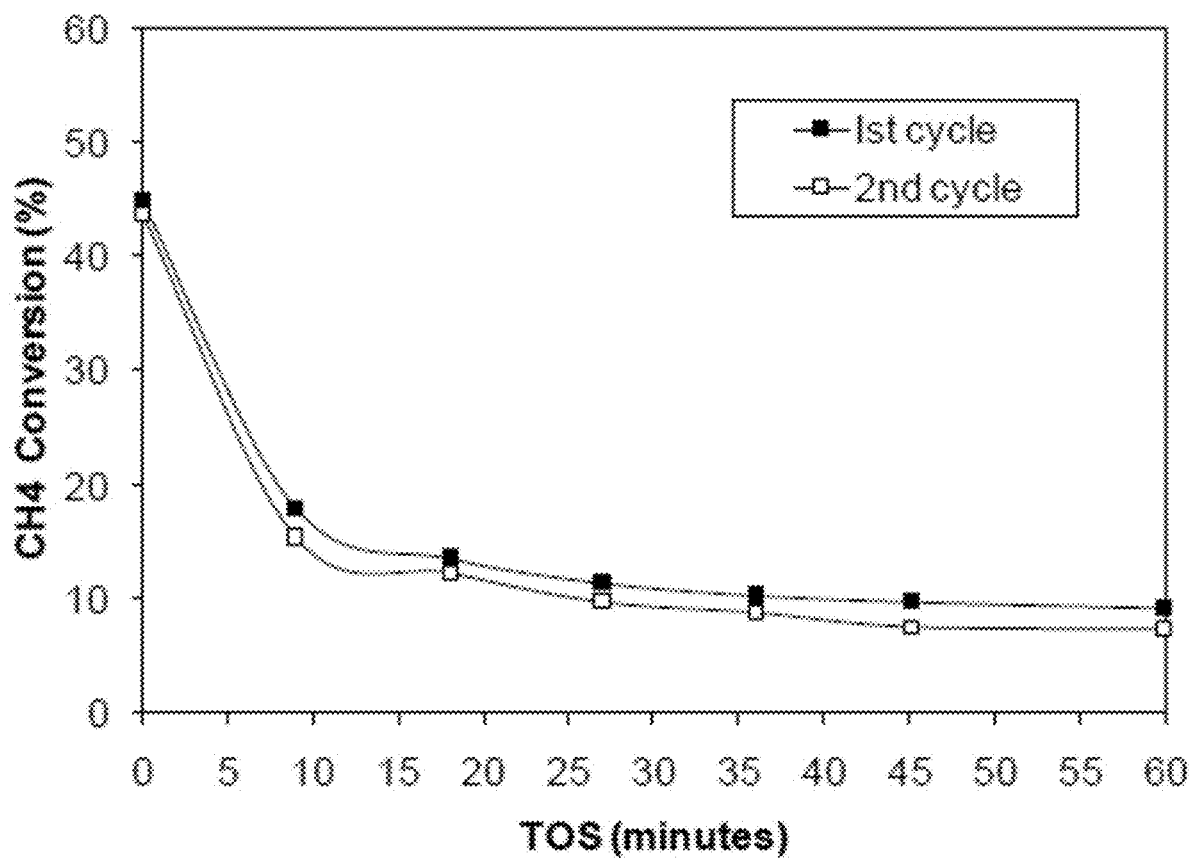
FIG. 12
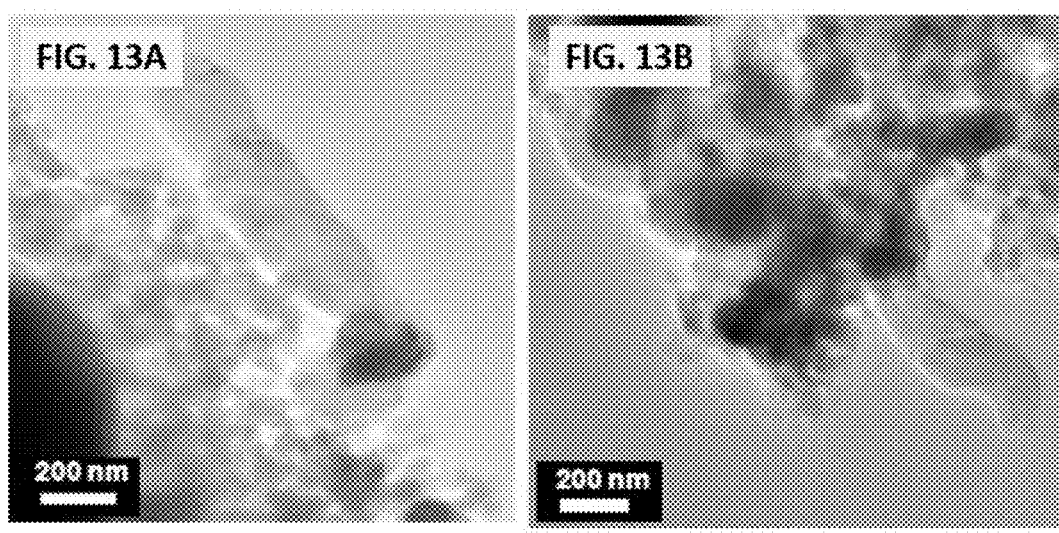

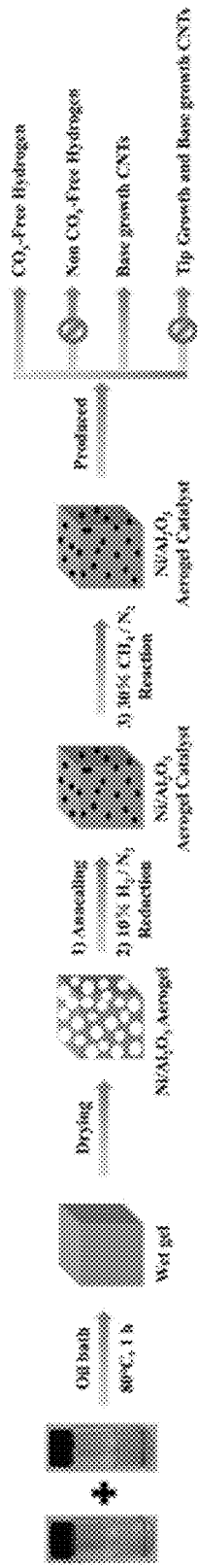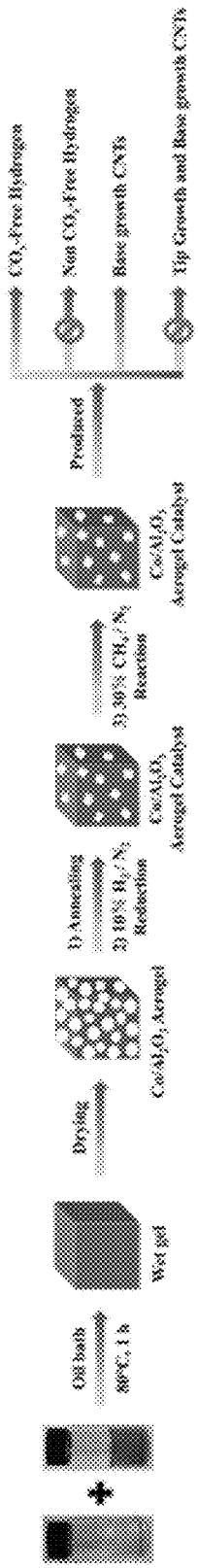
FIG. 38A
FIG. 38B

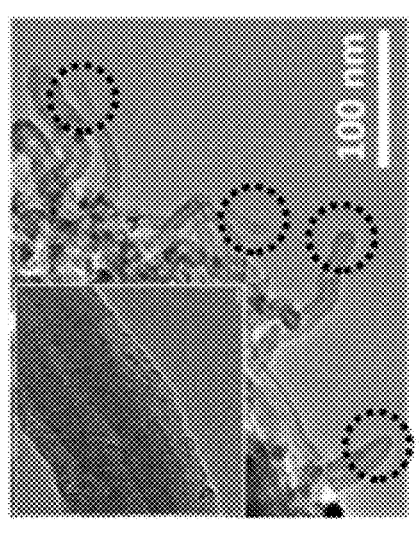
FIG. 45A
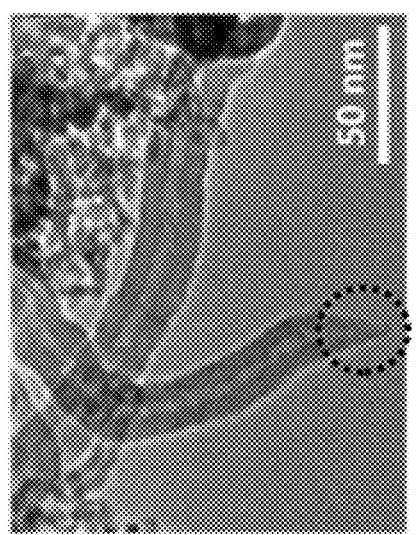
FIG. 45B
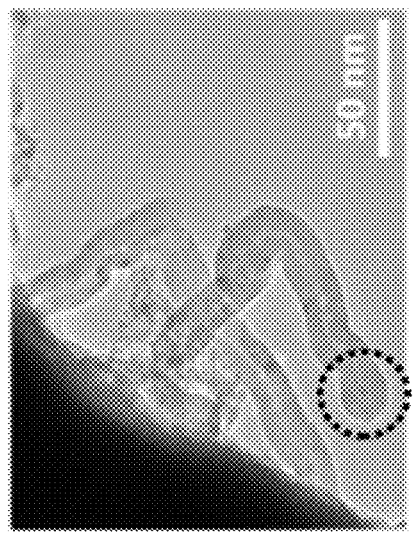
FIG. 45C
FIG. 45D
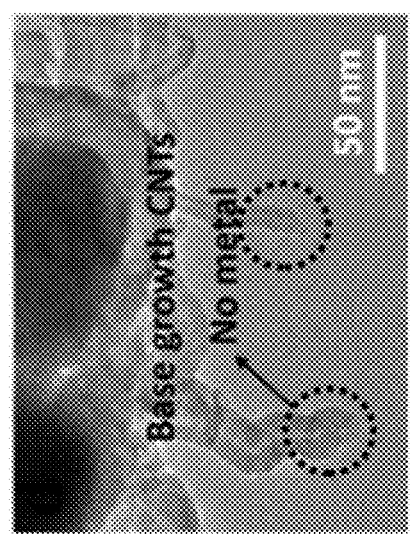
FIG. 45E
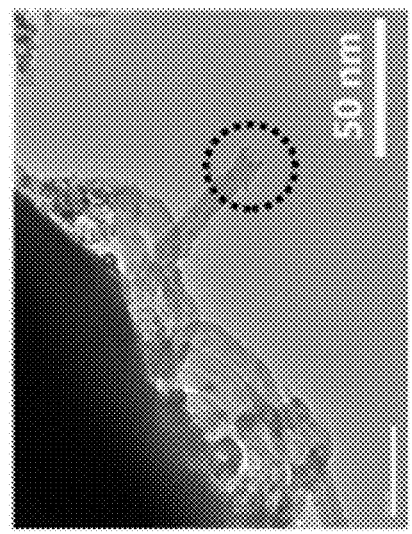
FIG. 45F

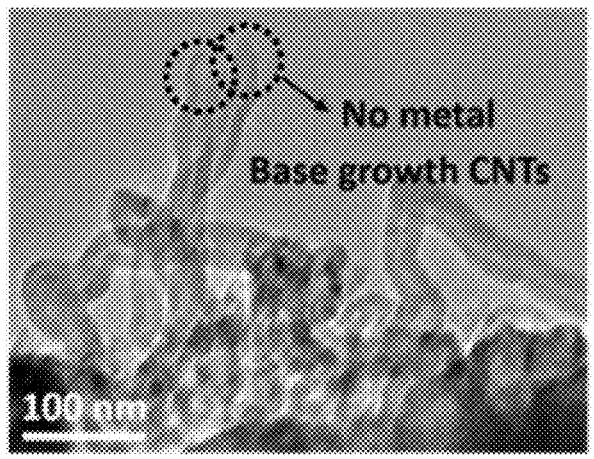 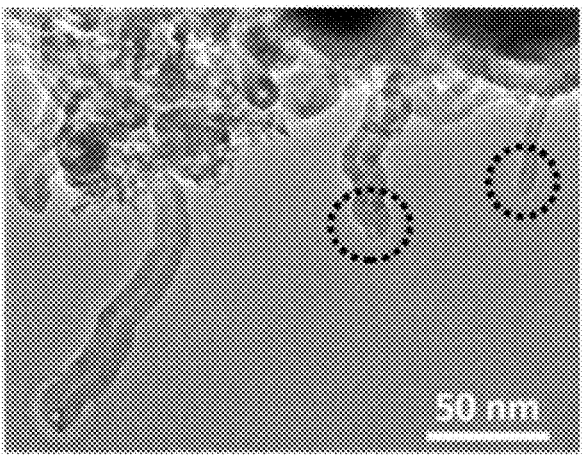
FIG. 47A　　　　　　　　FIG. 47B
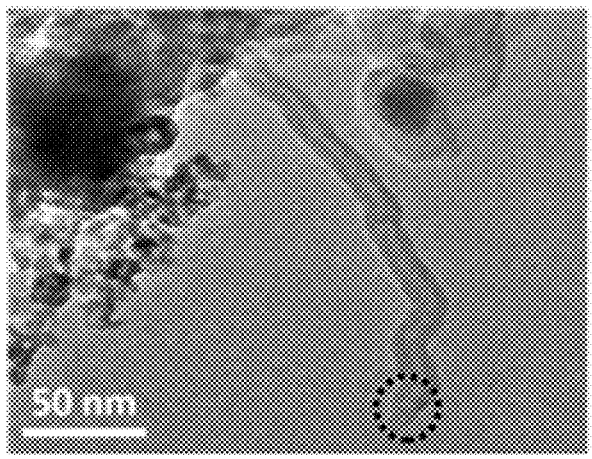 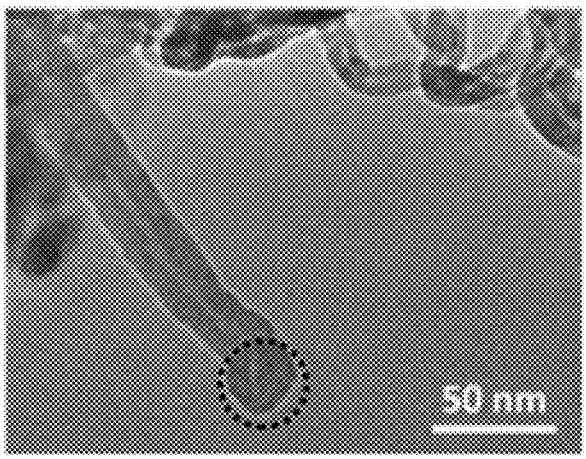
FIG. 47C　　　　　　　　FIG. 47D

CATALYSTS AND PROCESSES FOR TUNABLE BASE-GROWN MULTIWALLED CARBON NANOTUBES

CROSS-REFERENCE TO RELATED APPLICATIONS

This Application claims the benefit of U.S. Provisional Application No. 62/559,930, filed on Sep. 18, 2017, which is incorporated herein by reference in its entirety.

BACKGROUND

Currently hydrogen appears to be the most promising and environmentally benign source of energy since it can be converted into electricity and other energy forms with less pollution and high efficiency. Among various methods of hydrogen production, steam reforming of natural gas is the most popular and economic technology, which contributes to 50% of world's hydrogen consumption (J. Holladay, et al., Catal. Today, 2009, 139, 244-260). But these processes are highly endothermic (68.7 kJmol$^{-1}$ H$_2$) and produces large amount of COx. As a result, the steam reforming is accompanied by water-gas shift reaction, separation as well as purification steps thereby increasing the cost of the process. Recently, shale gas has become a very important source of natural gas in the United States. It contributed only 3% of United States natural gas production in 2005, rising to 35% by 2012 and predicted to grow to almost 50% by 2035 (R. W. Howarth, Energy Sci. Eng., 2014, 2, 47-60). Increase in demand of CO$_x$ free hydrogen and the abundance of shale gas resource presents opportunities to develop novel chemical processes converting its major composition, methane into more valuable fuels and chemicals.

Direct conversion of methane is an attractive alternative process since it is a less endothermic process (37.4 kJmol$^{-1}$ H$_2$; see J. N. Armor, Appl. Catal. A Gen., 1999, 176, 159-176; Q. Weizhong, et al., Appl. Catal. A Gen., 2004, 260, 223-228) compared to steam reforming. This process generates CO$_x$ free hydrogen, which has a great application in low temperature fuel cells and also generates valuable carbon nanotubes (carbon nanotube) or nanofibers. Methane, a linear hydrocarbon, thermally decomposes to atomic carbons, which eventually form straight and hollow carbon nanotube per the following reaction:

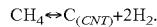

$$CH_4 \leftrightarrow C_{(CNT)} + 2H_2.$$

Although extensive research has been carried out to identify processes for the production of carbon nanotubes by methane decomposition, at present none of these methods are feasible for an industrial scale production. Among the metal catalysts used most of the researchers have focused on Ni-based catalysts due to their high catalytic activity and capability of producing carbon nanotubes (T. Zhang and M. D. Amiridis, Appl. Catal. A Gen., 1998, 167, 161-172; A. M. Amin, et al., Int. J. Hydrogen Energy, 2011, 36, 2904-2935). Although Ni catalysts showed superior performance, they deactivated immediately at temperature above 600° C. (S. T. Hussain, et al., J. Nat. Gas Chem., 2008, 17, 374-382; Y. Wang, et al., Int. J. Hydrogen Energy, 2014, 39, 778-787). To improve the durability and reduce the deactivation of the catalyst at the reaction temperatures, different metals and metal oxides, have been introduced to the Ni-based catalysts (G. Wang, et al., Energy & Fuels, 2013, 27, 4448-4456; Y. Li, et al., Chem. Commun., 1999, 1141-1142; J. Chen, et al., Appl. Catal. A Gen., 2004, 269, 179-186; I. Suelves, et al., Catal. Today, 2006, 116, 271-280; J. Ashok, et al., Energy & Fuels, 2009, 23, 5-13; A. Monzón, et al., Catal. Today, 2006, 116, 264-270). Iron-based catalysts has also been studied, but showed a shorter lifetime and low activity than Ni catalyst (K. G. Ermakova and Ermakov D. Y., Appl. Catal. A Gen., 2000, 201, 61-70). When Fe-based catalysts were used, a higher temperature range was also required for an efficient operation. Co catalysts have received less attention than Ni and Fe containing catalysts, but still there are few literatures which show their activity for methane decomposition (A. E. Awadallah, et al., Chem. Eng. Commun., 2015, 202, 163-174; L. B. Avdeeva, et al. Appl. Catal. A Gen., 2002, 228, 53-6; A. H. Fakeeha, et al., Pet. Sci. Technol., 2016, 34, 1617-1623). Based on previous literatures it can be summarized that catalytic activity of iron group metals are in the order Ni>Co>Fe (L. B. Avdeeva, et al. Appl. Catal. A Gen., 2002, 228, 53-6). Unfortunately, the activity of the catalyst is gradually lost during the course of the reaction due to the coverage of active sites by the carbon formed.

Currently available methods of catalytic methane decomposition forms carbon nanotubes by "tip growth". However, a significant disadvantage of tip grown carbon nanotubes is that during the process of harvesting carbon nanotube from the catalyst using acid or base treatment the metal nanoparticles are dissolved and the catalyst is sacrificed. Also, tip grown carbon nanotube results in catalyst nanoparticle that is attached to the tip creating an impurity in the carbon nanotube. Hence extraction of carbon nanotube with a complete recovery of the catalyst is most recommended. To overcome this problem catalysts and reaction processes were designed in such a way to produce "base grown" carbon nanotube. It is believed that base grown carbon nanotube can be easily harvested and the catalyst can regenerated without getting consumed during the extraction process.

Despite advances in research directed to COx-free production of hydrogen with concomitant production of carbon nanotubes, there remain a lack of compositions and methods to accomplish these production, particularly in a manner that allows for facile separation of the carbon nanotubes produced from the catalyst used. These needs and other needs are satisfied by the present disclosure.

SUMMARY

In accordance with the purpose(s) of the disclosure, as embodied and broadly described herein, the disclosure, in one aspect, relates to methods and compositions for the simultaneous production of carbon nanotubes and hydrogen gas from a lower hydrocarbon comprises methane, ethane, propane, butane, or a combination thereof utilizing the disclosed catalysts. In various aspects, the disclosure relates to methods for COx-free production of hydrogen with concomitant production of carbon nanotubes. Also disclosed are methods and compostions for selective base grown carbon nanotubes over a disclosed catalyst composition. In a further aspect, the disclosure relates to mono, bimetallic, and trimetallic catalysts comprising a 3d transition metal (e.g., Ni, Fe, Co, Mn, Cr, Mo, and combinations thereof) over a support material selected from a silica, an alumina, a zeolite, titatnium dioxide, and combinations thereof. Also disclosed are methods for preparing the disclosed catalysts.

Disclosed are compositions comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

Disclosed are compositions comprising two 3d transition metals and a support material, wherein the composition comprising the two 3d transition metals is represented by the formula xM:yN, wherein each of M and N is independently selected from Ni, Fe, Co, Mn, Cr, Mo, and combinations thereof provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

Also disclosed are compositions comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

Also disclosed are compositions comprising a 3d transition metal and a support material, wherein the 3d transition metal is selected from Ni, Fe, Co, Mn, Cr, Mo, and combinations thereof; wherein the support material is selected from a silica, an alumina, a zeolite, titatnium dioxide or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

Also disclosed are compositions comprising a 3d transition metal and a support material, wherein the 3d transition metal is selected from Ni, Fe, and Co; wherein the support material is selected from a silica, an alumina, a zeolite, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

Also disclosed are methods of making a disclosed composition comprising an incipient wetness technique.

Also disclosed are methods of making a disclosed composition comprising a sol-gel technique.

Also disclosed are methods of making a disclosed composition, the method comprising the steps of: contacting a support material with an aqueous solution comprising a first 3d transition metal salt and a second 3d transition metal to form a mixture comprising the support material and the aqueous solution comprising the first 3d transition metal salt and the second 3d transition metal metal; wherein the support material is selected from a silica, an alumina, a zeolite, titanium dioxide, or a mixture thereof; and wherein the first 3d metal salt and the second 3d metal salt are not the same; drying the mixture to form a dried mixture; calcining the dried mixture to form a calcined mixture; and reducing the calcined mixture, thereby providing the composition comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

Also disclosed are methods of making a disclosed composition, the method comprising the steps of: contacting a support material with an aqueous solution comprising a first 3d transition metal salt and a second 3d transition metal to form a mixture comprising the support material and the aqueous solution comprising the first 3d transition metal salt and the second 3d transition metal metal; wherein the support material is selected from a silica, an alumina, a zeolite, titanium dioxide, or a mixture thereof; and wherein the first 3d metal salt and the second 3d metal salt are not the same; drying the mixture to form a dried mixture; calcining the dried mixture to form a calcined mixture; and reducing the calcined mixture, thereby providing the composition comprising two 3d transition metals and a support material, wherein the composition comprising the two 3d transition metals is represented by the formula xM:yN, wherein each of M and N is independently selected from Ni, Fe, Co, Mn, Cr, Mo, and combinations thereof provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

Also disclosed are method of making a composition comprising a 3d transition metal and a support material, wherein the 3d transition metal is selected from Ni, Fe, Co, Mn, Cr, Mo, and combinations thereof; wherein the support material is selected from a silica, an alumina, a zeolite, titanium dioxide, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; the method comprising the steps of: contacting a support material with an aqueous solution comprising 3d transition metal salt selected from a nickel salt, an iron salt, a cobalt salt, a manganese salt, a chromium salt, a molybedenum salt, or combinations thereof; form a mixture comprising the support material and the aqueous solution comprising the 3d transition metal salt; wherein the support material is selected from a silica, an alumina, a zeolite, titanium dioxide, or a mixture thereof; wherein the 3d transition metal salt is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

Also disclosed are method of making a composition comprising a 3d transition metal and a support material, wherein the 3d transition metal is selected from Ni, Fe, and Co; wherein the support material is selected from a silica, an alumina, a zeolite, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; the method comprising the steps of: contacting a support material with an aqueous solution comprising 3d transition metal salt selected from a nickel salt, an iron salt, and a cobalt salt form a mixture comprising the support material and the aqueous solution comprising the 3d transition metal salt; wherein the support material is selected from a silica, an alumina, a zeolite, or a mixture thereof; wherein the 3d transition metal salt is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, titanium dioxide, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$ based on about 0.1 gram catalyst loading (all gas flow rate given in this application is based on 0.1 g catalyst loading unless otherwise indicated); wherein the flow of the first inert gas is in contact with the catalyst bed; terminating the flow of the first inert gas through the inlet end; providing a flow of a reactant gas through to the inlet end at a reactant gas flow rate equivalent to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises two 3d transition metals and a support material, wherein the composition comprising the two 3d transition metals is represented by the formula xM:yN, wherein each of M and N is independently selected from Ni, Fe, Co, Mn, Cr, Mo, and combinations thereof provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, titanium dioxide, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$; wherein the flow of the first inert gas is in contact with the catalyst bed; terminating the flow of the first inert gas through the inlet end; providing a flow of a reactant gas through to the inlet end at a reactant gas flow rate of equivalent to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises a 3d transition metal and a support material, wherein the 3d transition metal is selected from Ni, Fe, Co, Mn, Cr, Mo, and combinations thereof; wherein the support material is selected from a silica, an alumina, a zeolite, a titanium dioxide, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; wherein the support material is selected from a silica, an alumina, a zeolite, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$; wherein the flow of the first inert gas is in contact with the catalyst bed; terminating the flow of the first inert gas through the inlet end; providing a flow of a reactant gas through to the inlet end at a reactant gas flow rate of equivalent to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises a 3d transition metal and a support material, wherein the 3d transition metal is selected from Ni, Fe, and Co; wherein the support material is selected from a silica, an alumina, a zeolite, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; wherein the support material is selected from a silica, an alumina, a zeolite, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$; wherein the flow of the first inert gas is in contact with the catalyst bed; terminating the flow of the first inert gas through the inlet end; providing a flow of a reactant gas through to the inlet end at a reactant gas flow rate of about 25 ml min$^{-1}$ to about 200 ml min$^{-1}$ and a space velocity of about 20,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the disclosure.

FIG. 4A shows representative data for x-ray diffraction patterns of carbon nanotubes over a representative disclosed Ni—Fe catalyst. FIG. 4B shows representative data for x-ray diffraction patterns of carbon nanotubes over a representative disclosed Ni—Co catalyst. FIG. 4C shows representative data for x-ray diffraction patterns of carbon nanotubes over a representative disclosed Fe—Co catalyst.

FIGS. 9A and 9B show representative images for growth of carbon filaments over representative disclosed 9Ni-1Fe/SiO$_2$ catalysts at differing magnifications (see figure for scaling bar); FIGS. 9C and 9D show representative images for growth of carbon filaments over representative disclosed 9Ni-1Co/SiO$_2$ catalysts at differing magnifications (see figure for scaling bar); and FIGS. 9E and 9F show representative images for growth of carbon filaments over representative disclosed 1Fe-2Co/SiO$_2$ catalysts. All images were obtained after methane decomposition carried out as described in the examples under conditions of T=650° C., TOS=60 minutes, GHSV=42000 h$^{-1}$.

FIG. 10 shows representative data for base growth of carbon filaments over Fe/SiO$_2$ catalysts at the indicated temperatures and TOS=60 minutes/GHSV=42000 h-1.

FIGS. 11A and 11B show representative transmission electron micrographs of base grown carbon nanotubes over representative disclosed Fe/SiO$_2$ catalysts carried out as described in the examples under conditions of T=700° C., TOS=60 minutes, GHSV=42000 h$^{-1}$.

FIG. 12 shows representative data for the conversion of methane to hydrogen obtained from a catalyst regeneration study over representative disclosed Fe/SiO$_2$ catalysts carried out as described in the examples under conditions of T=650° C., TOS=60 minutes, GHSV=42000 h$^{-1}$.

FIGS. 13A and 13B show representative transmission electron micrographs of base grown carbon nanotubes in the $2^{nd}$ cycle of Fe/SiO$_2$ catalysts carried out as described in the examples under conditions of T=700° C., TOS=60 minutes, GHSV=42000 h$^{-1}$.

FIG. 37A shows representative XRD pattern data for spent disclosed 9Ni:1Fe/$SiO_2$ and Fe/$SiO_2$ catalysts and carbon nanotubes purified after acid reflux. FIG. 37B shows representative Raman spectra data for spent disclosed 9Ni:1Fe/$SiO_2$ and Fe/$SiO_2$ catalysts and carbon nanotubes purified after acid reflux. FIG. 37C shows a representative transmission electron micrograph image of a disclosed carbon nanotube before acid reflux. FIG. 37D shows a representative transmission electron micrograph image of a disclosed carbon nanotube after acid reflux.

FIGS. 38A-38B show schematic illustrations for a proposed formation mechanism of disclosed mesoporous aerogel catalysts. FIG. 38A shows a proposed formation mechanism of disclosed mesoporous aerogel catalyst, Ni/$Al_2O_3$. FIG. 38B shows a proposed formation mechanism of disclosed mesoporous aerogel catalyst, Co/$Al_2O_3$.

FIG. 39A shows methane conversion over disclosed Ni/$Al_2O_3$ aerogel catalysts having the wt % Ni amounts as described in the figure. FIG. 39B shows $H_2$ yield over disclosed Ni/$Al_2O_3$ aerogel catalysts having the wt % Ni amounts as described in the figure. FIG. 39C shows methane conversion over disclosed Co/$Al_2O_3$ aerogel catalysts having the wt % Ni amounts as described in the figure. FIG. 39D shows $H_2$ yield over disclosed Co/$Al_2O_3$ aerogel catalysts having the wt % Ni amounts as described in the figure.

Ni/Al$_2$O$_3$, and 70 wt % Ni/Al$_2$O$_3$) compared to the indicated metal oxide catalysts prepared by an incipient wetness method.

Figure 41A:
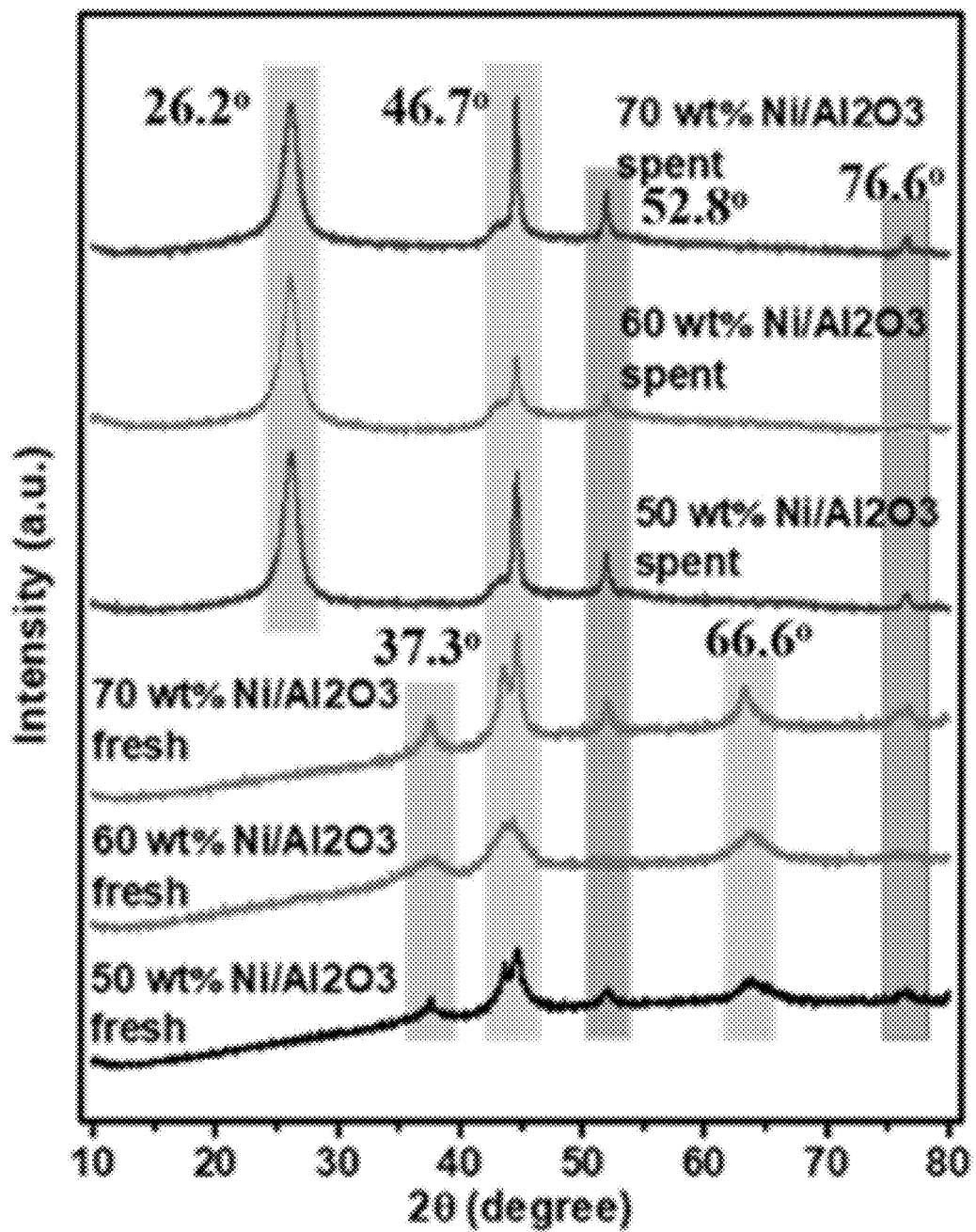
Figure 41B:
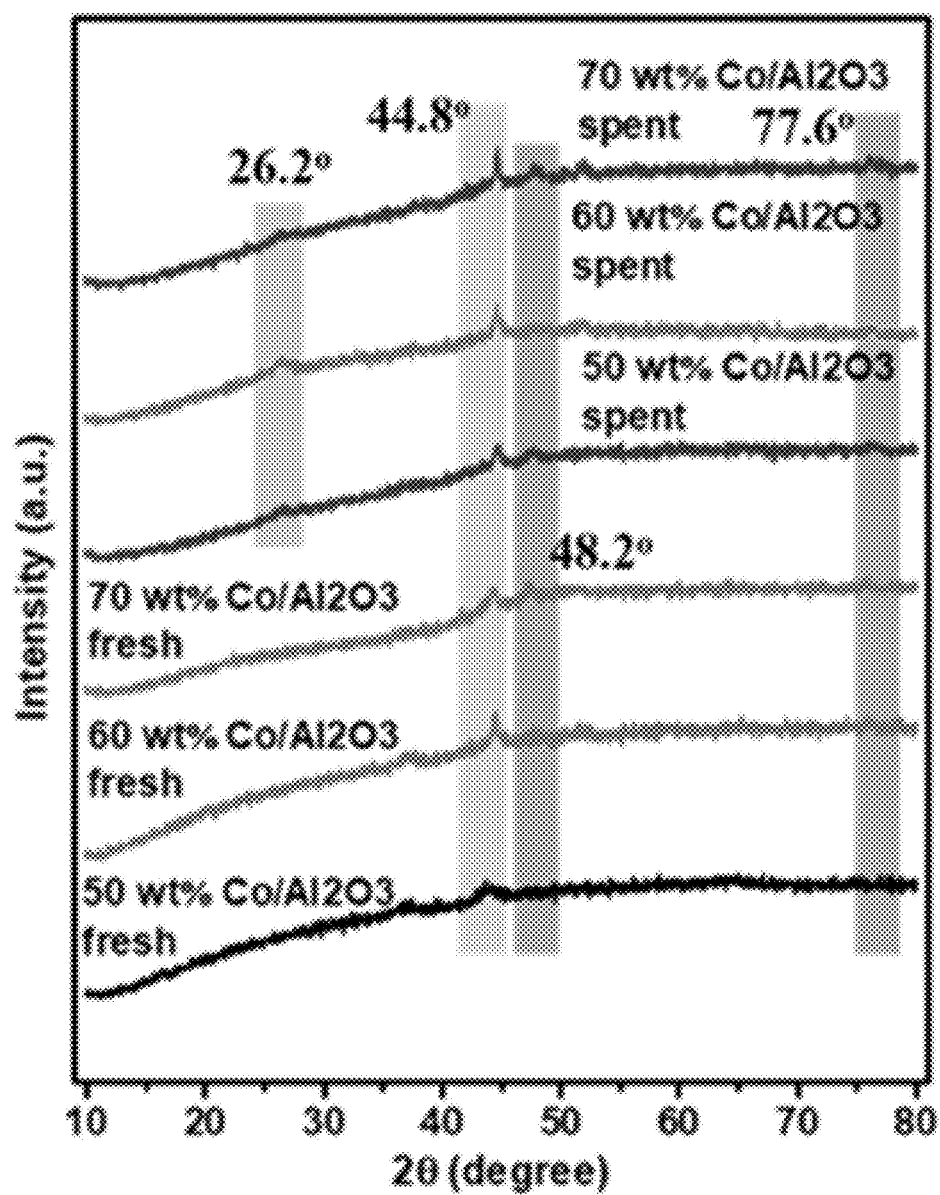

FIGS. 41A-41B show representative data x-ray diffraction (XRD) analysis data obtained on fresh and spent disclosed aerogel catalysts as indicated. FIG. 41A shows XRD data obtained on a fresh and spent disclosed aerogel catalyst, Ni/Al$_2$O$_3$. FIG. 41A shows XRD data obtained on a fresh and spent disclosed aerogel catalyst, Co/Al$_2$O$_3$.

Figure 42A:
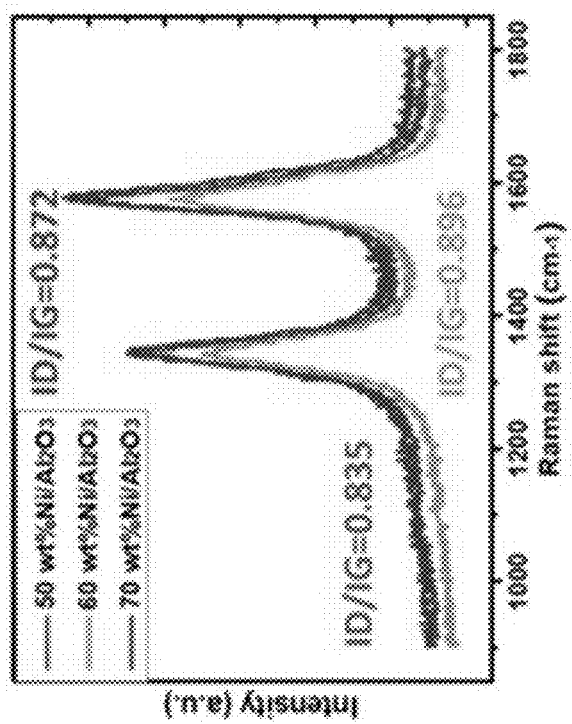
Figure 42B:
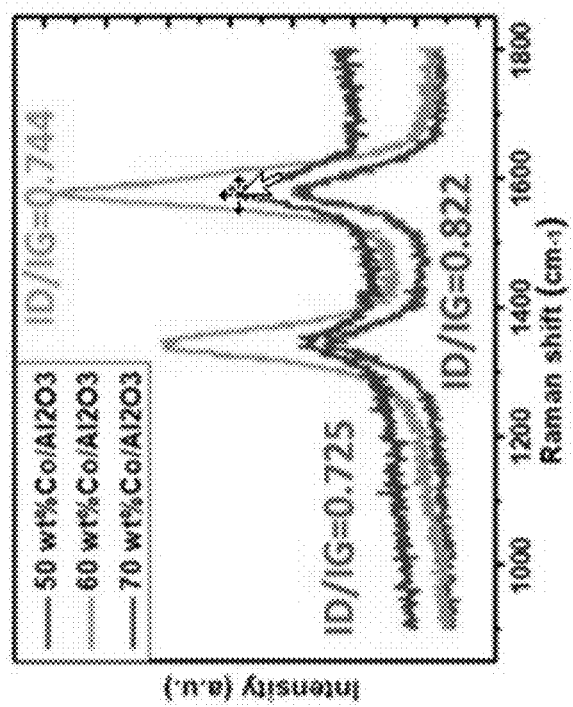
Figure 42D:
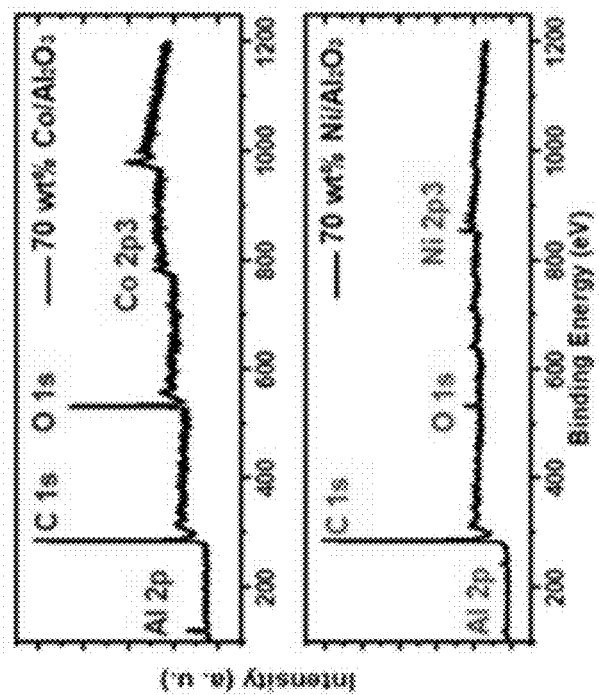
Figure 42C:
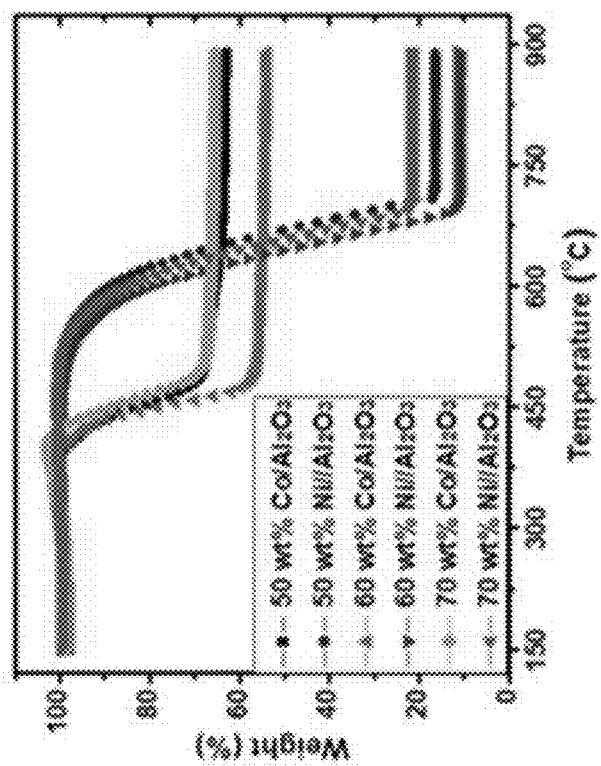

FIGS. 42A-42D show representative data of disclosed aerogel catalysts after use. FIG. 42A shows representative Raman spectroscopy data obtained from a disclosed used Ni/Al$_2$O$_3$ aerogel catalyst. FIG. 42B shows representative Raman spectroscopy data obtained from a disclosed used Co/Al$_2$O$_3$ aerogel catalyst. FIG. 42C shows representative X-ray photoelectron spectroscopy (XPS) data obtained from a disclosed used Ni/Al$_2$O$_3$ aerogel catalyst. FIG. 42D shows representative X-ray photoelectron spectroscopy (XPS) data obtained from a disclosed used Co/Al$_2$O$_3$ aerogel catalyst.

Figure 43A:
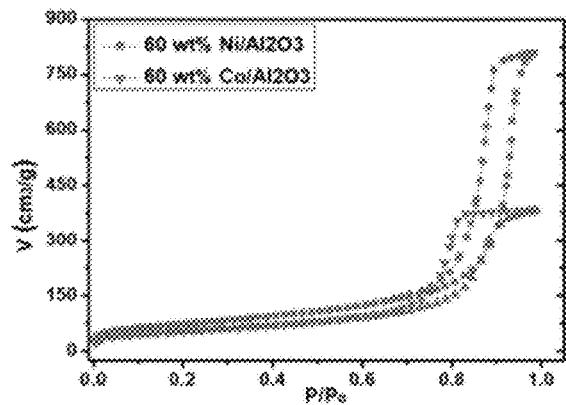
Figure 43B:
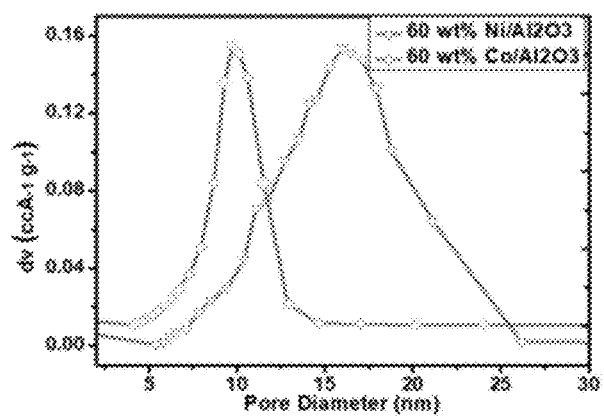
Figure 43C:
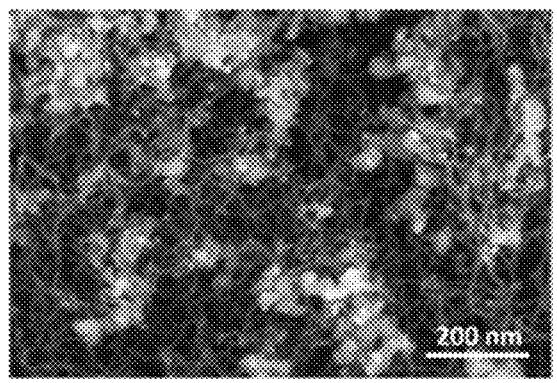
Figure 43D:
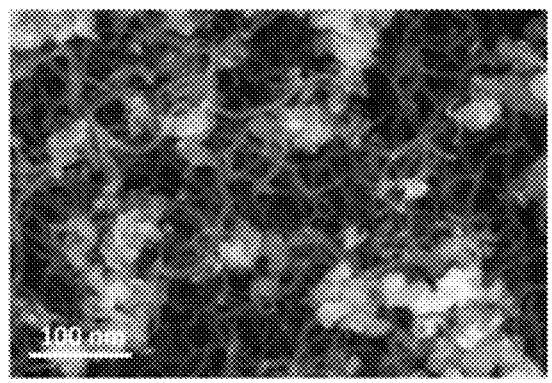

FIGS. 43A-43D show representative data pertaining to characterization of disclosed aerogel catalysts after use, 60 wt % Ni/Al$_2$O$_3$ and Co/Al$_2$O$_3$ aerogel catalysts. FIG. 43A shows Brunauer-Emmett-Teller (BET) analysis of N$_2$ absorption-desorption isotherms for the indicated disclosed aerogel catalysts. FIG. 43B shows pore size distribution data for the indicated disclosed aerogel catalysts. FIGS. 43C and 43D each show representative scanning electron microscopy (SEM) images for a disclosed aerogel catalyst, 60 wt % Ni/Al$_2$O$_3$. The images in FIGS. 43C and 43D are at different magnifications with a scalar bar as shown in each image.

Figure 44A:
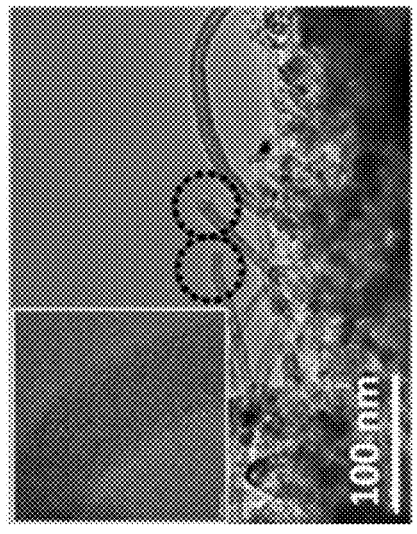
Figure 44B:
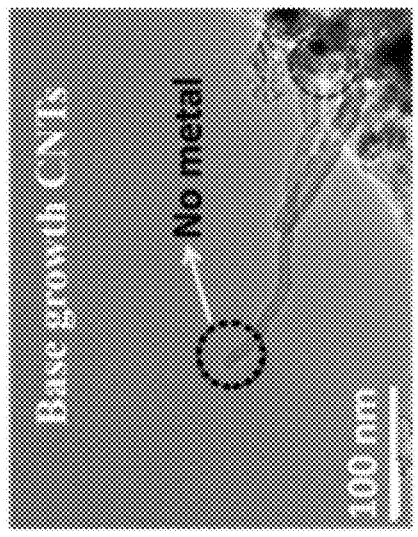
Figure 44C:
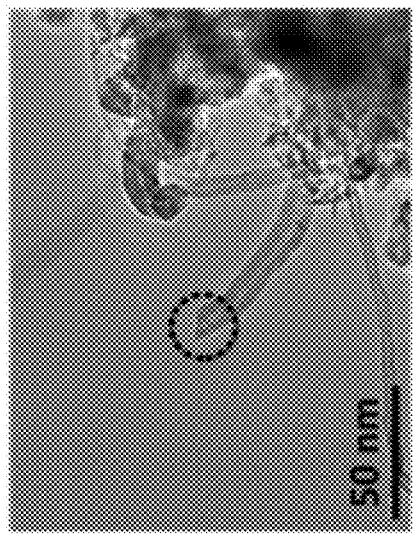
Figure 44D:
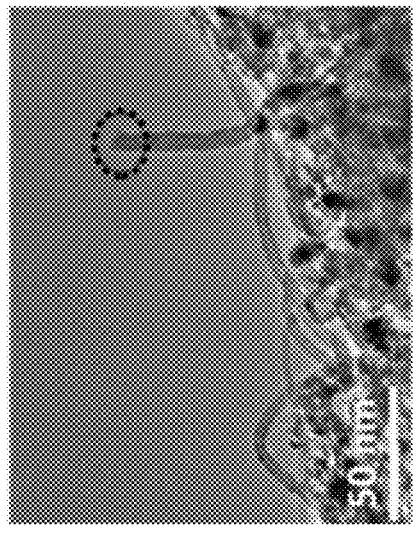
Figure 44E:
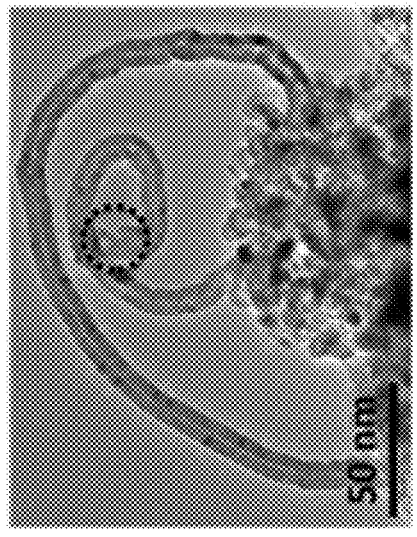
Figure 44F:
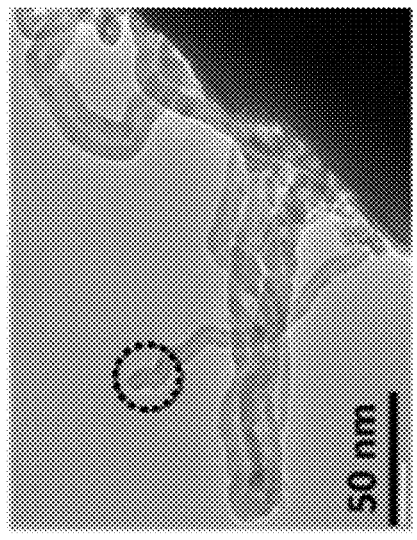

FIGS. 44A-44F show representative transmission electron microscopy (TEM) images for a disclosed aerogel catalyst. Each of FIGS. 44A, 44B, and 44C show representative TEM images of a disclosed 60 wt % Ni/Al$_2$O$_3$ aerogel catalyst, whereas each of FIGS. 44D, 44E, and 44F show representative TEM images of a disclosed 70 wt % Ni/Al$_2$O$_3$ aerogel catalyst. In the various figures, a scalar bar is shown in the lower left of each figure and carbon nanotube tip structures are highlighted by a circle with a dashed line.

FIGS. 45A-45F show representative transmission electron microscopy (TEM) images for a disclosed aerogel catalyst. Each of FIGS. 45A, 45B, and 45C show representative TEM images of a disclosed 60 wt % Co/Al$_2$O$_3$ aerogel catalyst, whereas each of FIGS. 45D, 45E, and 45F show representative TEM images of a disclosed 70 wt % Co/Al$_2$O$_3$ aerogel catalyst. In the various figures, a scalar bar is shown in the lower left of each figure and carbon nanotube tip structures are highlighted by a circle with a dashed line.

Figure 4A:
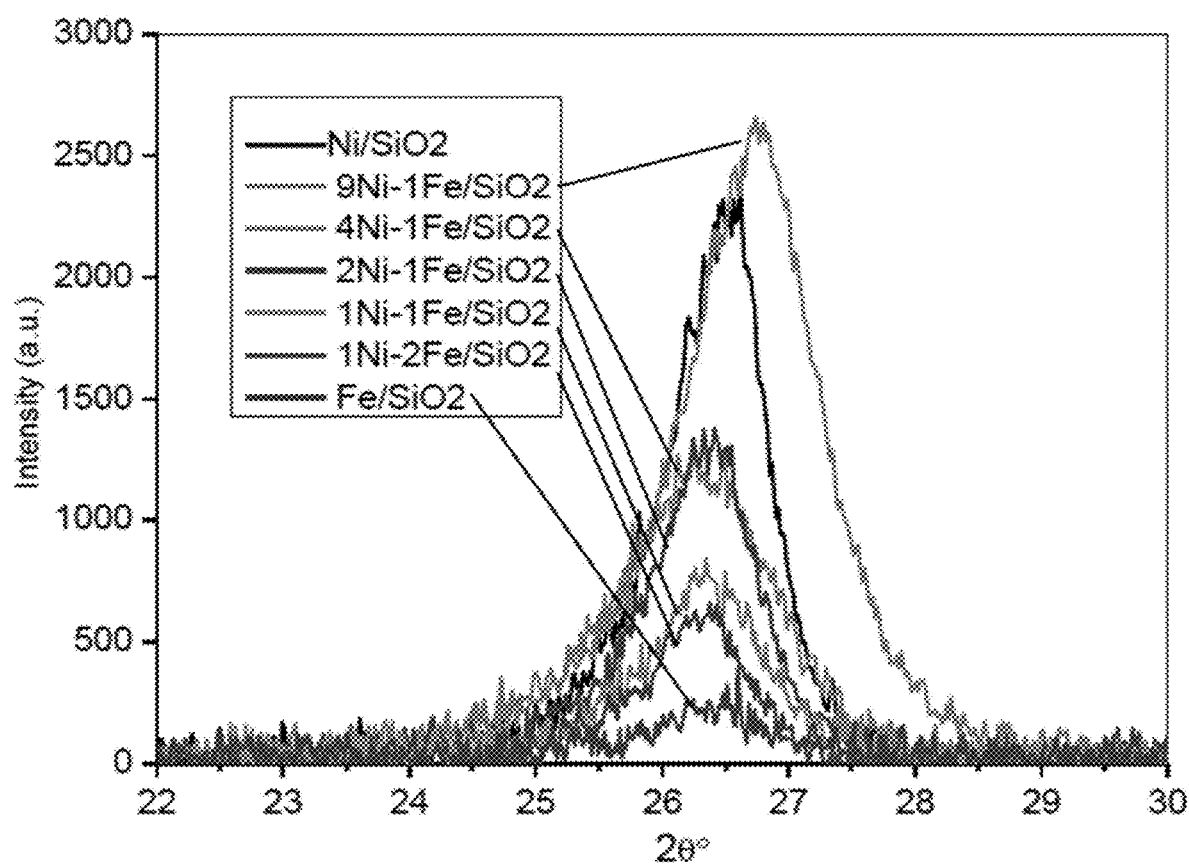
FIGS. 4A-4C shows representative data for x-ray diffraction patterns of carbon nanotubes over representative disclosed mono and bimetallic catalysts. Specifically.
Figure 4B:
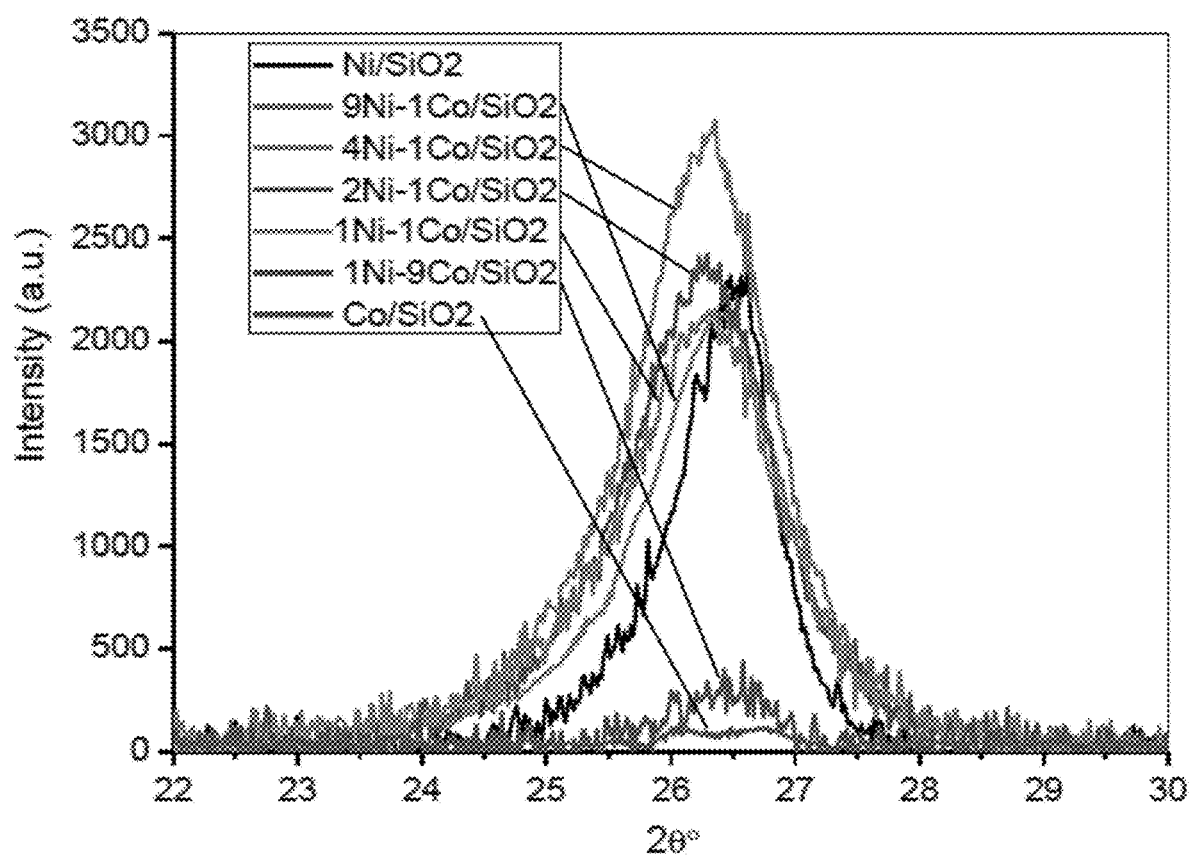
Figure 4C:
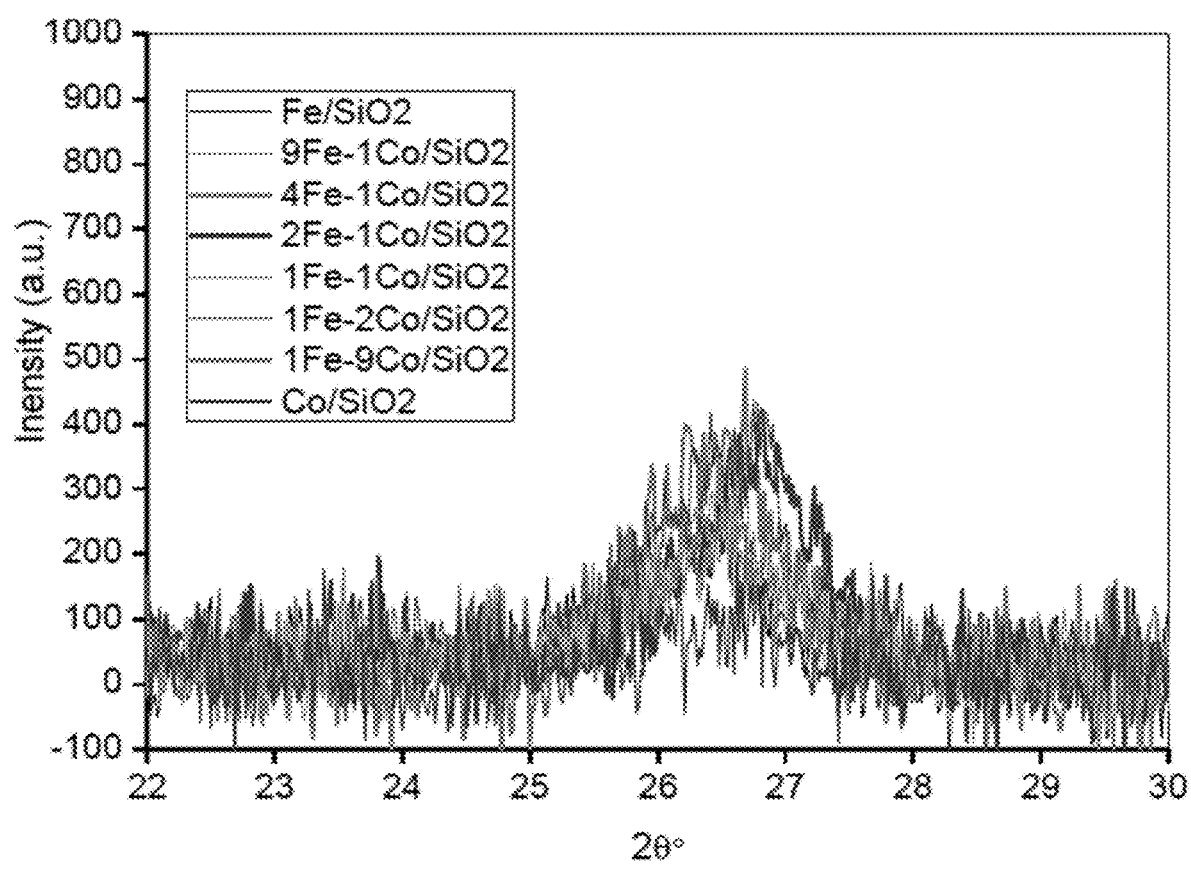
Figure 46B:
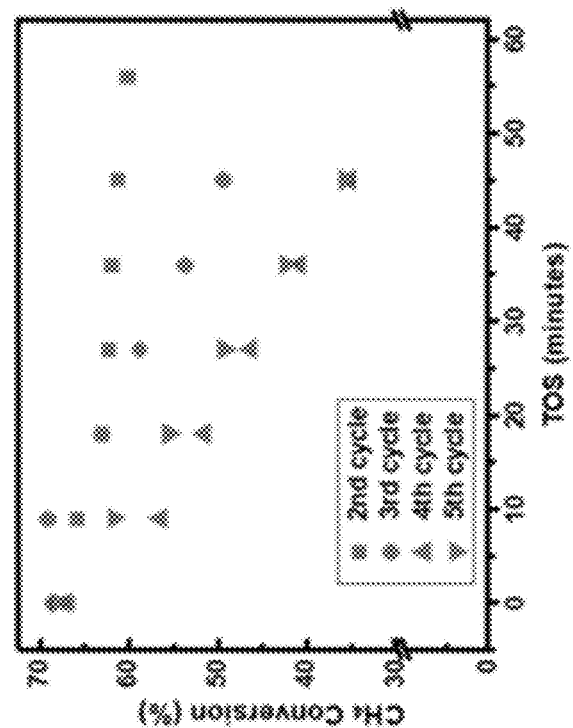
Figure 46A:
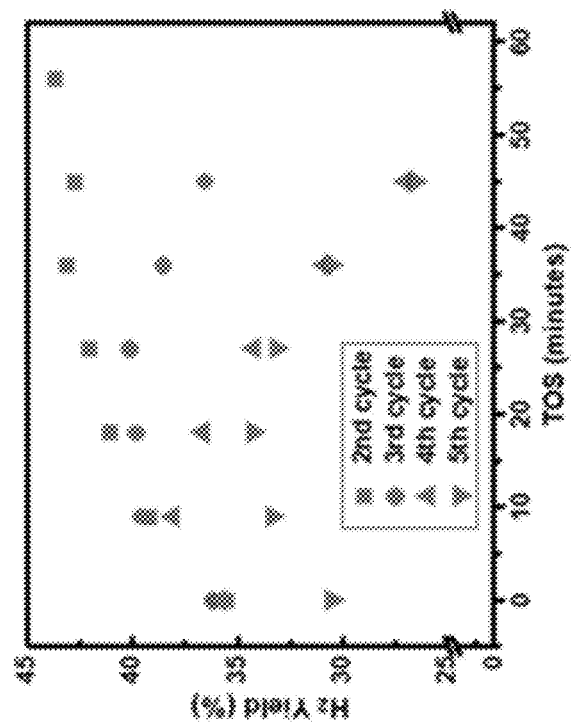
Figure 48A:
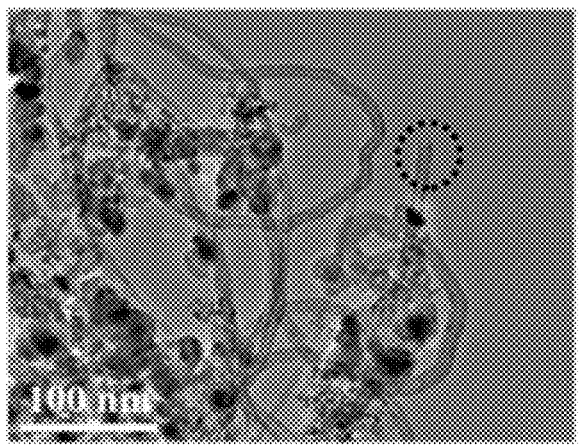
Figure 48B:
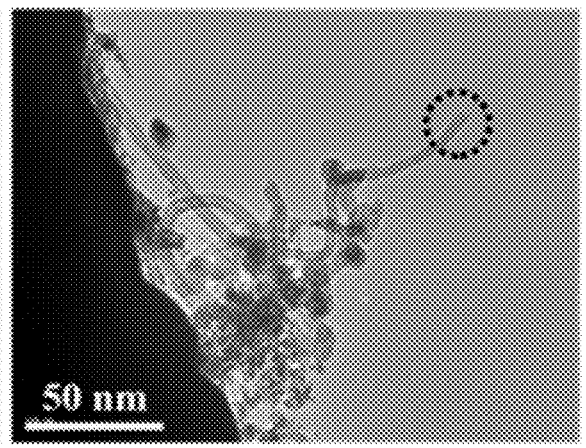
Figure 48C:
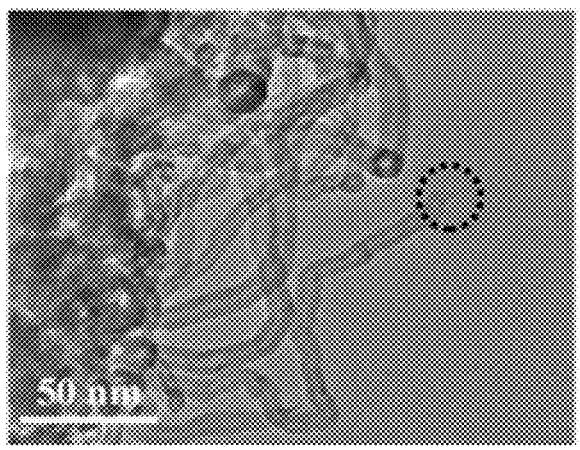
Figure 48D:
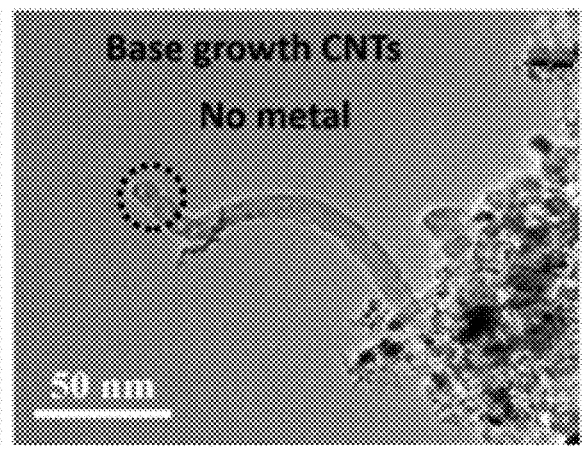

FIGS. 46A-46B show representative data for a regenerated disclosed aerogel catalyst after various cycles of regeneration. FIG. 46A shows methane conversion results in a catalyst regeneration study over a disclosed 60 wt % Ni/Al2O3 aerogel catalyst at 650° C., TOS=60 minutes, and GHSV=42000 h$^{-1}$. In the catalyst regeneration study, after each cycle, the catalyst was regenerated by treating the catalyst with 10% O$_2$ at 650° C. for 45 min. FIG. 4.B shows H$_2$ yield results in a catalyst regeneration study over a disclosed 60 wt % Ni/Al2O3 aerogel catalyst at 650° C., TOS=60 minutes, and GHSV=42000 h$^{-1}$. In the catalyst regeneration study, after each cycle, the catalyst was regenerated by treating the catalyst with 10% O$_2$ at 650° C. for 45 min.

FIGS. 47A-47D show representative data representative transmission electron microscopy (TEM) images for a disclosed aerogel catalyst. Each of FIGS. 47A, 47B, 47C, and 47D show representative TEM images of 60 wt % Ni/Al2O3 aerogel catalyst from the after the second cycle of the study described in FIGS. 46A-46B. In the various figures, a scalar bar is shown in the lower left of each figure and carbon nanotube tip structures are highlighted by a circle with a dashed line.

FIGS. 48A-48D show representative data representative transmission electron microscopy (TEM) images for a disclosed aerogel catalyst. Each of FIGS. 48A, 48B, 48C, and 48D show representative TEM images of 60 wt % Ni/Al2O3 aerogel catalyst from the after the fifth cycle of the study described in FIGS. 46A-46B. In the various figures, a scalar bar is shown in the lower left of each figure and carbon nanotube tip structures are highlighted by a circle with a dashed line.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings.

Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Prior to describing the various embodiments, the following definitions are provided and should be used unless otherwise indicated.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a carbon nanotube," "a catalyst," or "a base," includes, but is not limited to, two or more such carbon nanotubes, catalysts, or bases, and the like.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" Fe—Co catalyst is interpreted to include one or more catalyst compositions, where the catalyst compositions may or may not be identical (e.g., different ratios of Fe—Co).

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Metal-Supported Catalysts

In various aspects, the present disclosure pertains to metal-supported catalyst compositions that have utility for the simultaneous production of carbon nanotubes and hydrogen gas from methane utilizing the disclosed catalysts.

In various aspects, the present disclosure relates to trimetallic catalysts comprising 3d transition metals (e.g., Ni, Fe, Co, Mn, Cr, Mo, and combinations thereof) over a support material selected from a silica, an alumina, a zeolite, or a mixture thereof.

In various aspects, the present disclosure relates to bimetallic catalysts comprising 3d transition metals (e.g., Ni, Fe, Co, Mn, Cr, Mo, and combinations thereof) over a support material selected from a silica, an alumina, a zeolite, or a mixture thereof.

In various aspects, the present disclosure relates to monometallic catalysts comprising 3d transition metals (e.g., Ni, Fe, Co, Mn, Cr, and Mo) over a support material selected from a silica, an alumina, a zeolite, or a mixture thereof.

In various aspects, disclosed herein are catalyst compositions comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

In various aspects, disclosed herein are catalyst compositions comprising two 3d transition metals and a support material, wherein the composition comprising the two 3d transition metals is represented by the formula xM:yN, wherein each of M and N is independently selected from Ni, Fe, Co, Mn, Cr, Mo, and combinations thereof provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

In various aspects, disclosed herein are catalyst compositions comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

In various aspects, disclosed herein are catalyst compositions comprising a 3d transition metal and a support material, wherein the 3d transition metal is selected from Ni, Fe, Co, Mn, Cr, Mo, and combinations thereof; wherein the support material is selected from a silica, an alumina, a zeolite, titatnium dioxide or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

In various aspects, disclosed herein are catalyst compositions comprising a 3d transition metal and a support material, wherein the 3d transition metal is selected from Ni, Fe, and Co; wherein the support material is selected from a silica, an alumina, a zeolite, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

In various aspects, the disclosed catalysts are prepared using an incipient wetness technique as known to one skilled in the art. In other aspects, the disclosed catalysts are aerogel catalysts prepared using a sol-gel technique, e.g., as described herein or as generally known to one skilled in the art.

As used herein, the term "incipient wetness" refers generally to a free flowing porous powder becoming wetted to the point at which a further small addition of liquid brings about a marked decrease in its ability to flow, (e.g., see W. B. Innes, Analytical Chemistry, Vol. 28, No. 3, March 1956, page 332, which is incorporated herein by reference).

As used herein, "aerogel catalyst" is a catalyst composition comprising at least one or more 3d transition metals and a support material with a low density. It is understood, that an aerogel catalyst is a material obtained a sol-gel technique, e.g., vacuum extraction or supercritical extraction of the liquid out of a gel, itself consisting of a solid three-dimensional network. It is believed that drying by transition from the liquid extraction to the gel formation phase does away with the capillary forces, which act in evaporation and cause partial or total collapse of the pore network. Hence, vacuum or supercritical drying leads to materials with low density, high specific surface area, large pore volume and very versatile pore size.

In an aspect, the support material is a metal oxide material, e.g., a transition metal oxide such as, but not limited to, silicas, aluminas, titanium dioxides, and zeolites. In various aspects, the support material is a silica, an alumina, or a zeolite.

In a further aspect, the alumina is $\gamma$-$Al_2O_3$. Alternatively, the alumina can be a fumed alumina. In a still further aspect, the zeolite is ZSM-5, Zeolite $\beta$ and USY.

In a yet further aspect, the silicate is a fumed silica. In certain aspects, the support material can be a combination of support materials, such as, as silica and zeolite, silica and alumina, silica and silica, alumina and silica, and alumina and zeolite.

Methods for Preparation of Disclosed Metal-Supported Catalysts

In accordance with the purpose(s) of the disclosure, as embodied and broadly described herein, the disclosure, in one aspect, relates to methods for preparing the disclosed catalysts. In a various aspects, methods of making a disclosed composition comprising an incipient wetness technique. In a further aspect, disclosed are methods of making a disclosed composition comprising a sol-gel technique.

In various aspects, disclosed are methods of making a disclosed composition, the method comprising the steps of: contacting a support material with an aqueous solution comprising a first 3d transition metal salt and a second 3d transition metal to form a mixture comprising the support material and the aqueous solution comprising the first 3d transition metal salt and the second 3d transition metal metal; wherein the support material is selected from a silica, an alumina, a zeolite, titanium dioxide, or a mixture thereof; and wherein the first 3d metal salt and the second 3d metal salt are not the same; drying the mixture to form a dried mixture; calcining the dried mixture to form a calcined mixture; and reducing the calcined mixture, thereby providing the composition comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

In various aspects, disclosed are methods of making a disclosed composition, the method comprising the steps of: contacting a support material with an aqueous solution comprising a first 3d transition metal salt and a second 3d transition metal to form a mixture comprising the support material and the aqueous solution comprising the first 3d transition metal salt and the second 3d transition metal metal; wherein the support material is selected from a silica, an alumina, a zeolite, titanium dioxide, or a mixture thereof; and wherein the first 3d metal salt and the second 3d metal salt are not the same; drying the mixture to form a dried mixture; calcining the dried mixture to form a calcined mixture; and reducing the calcined mixture, thereby providing the composition comprising two 3d transition metals and a support material, wherein the composition comprising the two 3d transition metals is represented by the formula xM:yN, wherein each of M and N is independently selected from Ni, Fe, Co, Mn, Cr, Mo, and combinations thereof provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, or a mixture thereof.

In various aspects, disclosed are method of making a composition comprising a 3d transition metal and a support material, wherein the 3d transition metal is selected from Ni, Fe, Co, Mn, Cr, Mo, and combinations thereof; wherein the support material is selected from a silica, an alumina, a zeolite, titanium dioxide, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; the method comprising the steps of: contacting a support material with an aqueous solution comprising 3d transition metal salt selected from a nickel salt, an iron salt, a cobalt salt, a manganese salt, a chromium salt, a molybedenum salt, or combinations thereof; form a mixture comprising the support material and the aqueous solution comprising the 3d transition metal salt; wherein the support material is selected from a silica, an alumina, a zeolite, titanium dioxide, or a mixture thereof; wherein the 3d transition metal salt is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

In various aspects, disclosed are method of making a composition comprising a 3d transition metal and a support material, wherein the 3d transition metal is selected from Ni, Fe, and Co; wherein the support material is selected from a silica, an alumina, a zeolite, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; the method comprising the steps of: contacting a support material with an aqueous solution comprising 3d transition metal salt selected from a nickel salt, an iron salt, and a cobalt salt form a mixture comprising the support material and the aqueous solution comprising the 3d transition metal salt; wherein the support material is selected from a silica, an alumina, a zeolite, or a mixture thereof; wherein the 3d transition metal salt is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material.

Methods for Preparation of Carbon Nanotudes and Hydrogen Gase

In accordance with the purpose(s) of the disclosure, as embodied and broadly described herein, the disclosure, in one aspect, relates to methods and compositions for the simultaneous production of carbon nanotubes and hydrogen gas from a reactant gas comprising lower hydrocarbon comprises methane, ethane, propane, butane, or a combination thereof, in the presence of a disclosed catalyst. In various aspects, the present disclosure pertains to methods for COx-free production of hydrogen with concomitant production of carbon nanotubes using as a reactant a lower hydrocarbon comprises methane, ethane, propane, butane, or a combination thereof. In various aspects, the present disclosure pertains to methods and compositions for the simultaneous production of carbon nanotubes and hydrogen gas from lower hydrocarbon comprises methane, ethane, propane, butane, or a combination thereof utilizing the disclosed catalysts.

Also disclosed are methods for the efficient COx-free production of hydrogen with the simultaneous production of carbon nanotubes from a lower hydrocarbon, e.g., methane, utilizing a disclosed catalyst. In various aspects, the carbon nanotubes produced are a mixture of base grown and tip grown nanotubes. In some aspects, the methods provide for selective base grown carbon nanotubes over a disclosed catalyst. The "lower hydrocarbon" generally be any gaseous or volatile hydrocarbon containing compound, including, but not limited to, a C1-C4 alkane, e.g., methane, ethane, propane, and butane. In certain aspects, the lower hydrocarbon is methane.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, titanium dioxide, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$ based on about 0.1 gram catalyst loading (all gas flow rate given in this application is based on 0.1 g catalyst loading unless otherwise indicated); wherein the flow of the first inert gas is in contact with the catalyst bed; terminating the flow of the first inert gas through the inlet end; providing a flow of a reactant gas through to the inlet end at a reactant gas flow rate equivalent to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises two 3d transition metals and a support material, wherein the composition comprising the two 3d transition metals is represented by the formula xM:yN, wherein each of M and N is independently selected from Ni, Fe, Co, Mn, Cr, Mo, and combinations thereof provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, titanium dioxide, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$ based on about 0.1 gram catalyst loading (all gas flow rate given in this application is based on 0.1 g catalyst loading unless otherwise indicated); wherein the flow of the first inert gas is in contact with the catalyst bed; terminating the flow of the first inert gas through the inlet end; providing a flow of a reactant gas through to the inlet end at a reactant gas flow rate equivalent to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises a 3d transition metal and a support material, wherein the 3d transition metal is selected from Ni, Fe, Co, Mn, Cr, Mo, and combinations thereof; wherein the support material is selected from a silica, an alumina, a zeolite, a titanium dioxide, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; wherein the support material is selected from a silica, an alumina, a zeolite, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$; wherein the flow of the first inert gas is in contact with the catalyst bed; terminating the flow of the first inert gas through the inlet end; providing a flow of a reactant gas through to the inlet end at a reactant gas flow rate of equivalent to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Also disclosed are methods of decomposing a lower hydrocarbon, the method comprising the steps of: heating a catalyst bed to a temperature of about 500° C. to about 1000° C. at a heating rate of about 1° C. min$^{-1}$ to about 20° C. min$^{-1}$; wherein the catalyst bed comprises a disclosed composition; wherein the disclosed composition comprises a 3d transition metal and a support material, wherein the 3d transition metal is selected from Ni, Fe, and Co; wherein the support material is selected from a silica, an alumina, a zeolite, or a mixturing thereof; wherein the 3d transition metal is present in an amount from about 40 wt % to about 70 wt % based on the total weight of the 3d transition metal and the support material; and wherein the support material is present in an amount from about 60 wt % to about 30 wt % based on the total weight of the 3d transition metal and the support material; wherein the support material is selected from a silica, an alumina, a zeolite, or a mixture thereof; wherein the catalyst bed is positioned within a reactor bed of a fixed flow reactor; wherein the fixed flow reactor comprises an inlet end and an outlet end for gas flow; providing a flow of a first inert gas through the inlet end at an inert gas flow rate of about 25 ml min$^{-1}$ to about 200 ml min$^{-1}$; wherein the flow of the first inert gas is in contact with the catalyst bed; terminating the flow of the first inert gas through the inlet end; providing a flow of a reactant gas through to the inlet end at a reactant gas flow rate of about 25 ml min$^{-1}$ to about 200 ml min$^{-1}$ and a space velocity of about 20,000 h$^{-1}$ to about 60,000 h$^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

As used herein, "carbon nanotubes," unless otherwise specified, refers to collectively to a variety of carbon nanotubes, including helical carbon nanotubes, multi-wall carbon nanotubes, double-wall carbon nanotubes and single-wall carbon nanotubes. It is to be understood that a material or composition referred to as carbon nanotubes can contain, unless otherwise specified, varying proportions of these sub-types of carbon nanotubes. In some aspects, the carbon nanotubes referred to comprise essentially all a particular sub-type, e.g., multi-wall carbon nanotubes.

As used herein, "carbon material" refers to carbon nanotubes, carbon fibers, carbon nanoparticles, amorphous carbon, pyrolytic carbon and soot in variable weight ratios.

Aspects

The following listing of exemplary aspects supports and is supported by the disclosure provided herein.

Aspect 1. A composition comprising two 3d transition metals and a support material, wherein the composition comprising the two 3d transition metals is represented by the formula xM:yN, wherein each of M and N is independently selected from a 3d transition metal provided that M and N are not the same; wherein x and y represent the molar ratio of M:N, wherein x is a number with a value between about 1 to about 20, y is a number with a value between about 1 to about 10; and wherein the support material is selected from a silica, an alumina, a zeolite, titanium dioxide, or a mixture thereof.

Aspect 2. The composition of Aspect 1, wherein M and N are independently selected from Ni, Fe, Co, Mn, Cr, and Mo, provided that M and N are not the same.

Aspect 3. The composition of Aspect 1, wherein M is Ni; and wherein N is Fe or Co.

Aspect 4. The composition of Aspect 1, wherein M is Fe; and wherein N is Co.

Aspect 5. The composition of any one of Aspect 1 to Aspect 4, wherein x is a number with a value between about 1 and about 10.

Aspect 6. The composition of anyone of Aspect 1 to Aspect 4, wherein x is a number with a value between about 4 and about 9.

Aspect 7. The composition of anyone of Aspect 1 to Aspect 4, wherein x is a number with a value of about 9.

Aspect 8. The composition of anyone of Aspect 1 to Aspect 7, wherein y is a number with a value between about 1 and about 5.

Aspect 9. The composition of anyone of Aspect 1 to Aspect 7, wherein y is a number with a value between about 1 and about 3.

Aspect 10. The composition of any one of Aspect 1 to Aspect 7, wherein y is a number with a value of about 1.

Aspect 11. The composition of any one of Aspect 1 to Aspect 4, wherein x and y are integers.

Aspect 12. The composition of Aspect 11, wherein x is a number with an integer value between 1 and 10.

Aspect 13. The composition of Aspect 11, wherein x is a number with an integer value between 4 and 9.

Aspect 14. The composition of Aspect 11, wherein x is a number with an integer value of 9.

Aspect 15. The composition of any one of Aspect 11 to Aspect 14, wherein y is a number with an integer value between 1 and 5.

Aspect 16. The composition of any one of Aspect 11 to Aspect 14, wherein y is a number with an integer value between 1 and 3.

Aspect 17. The composition of any one of Aspect 11 to Aspect 14, wherein y is a number with an integer value 1.

Aspect 18. The composition of anyone of Aspect 1 to Aspect 17, wherein the support material is a zeolite.

Aspect 19. The composition of Aspect 18, wherein the zeolite is selected from a ZSM-5, Zeolite β and USY zeolite.

Aspect 20. The composition of Aspect 18 or Aspect 19, wherein the zeolite has a $SiO_2/Al_2O_3$ mole ratio from about 5 to about 25.

Aspect 21. The composition of Aspect 18 or Aspect 19, wherein the zeolite has a $SiO_2/Al_2O_3$ mole ratio from about 7.5 to about 15.

Aspect 22. The composition of Aspect 18 or Aspect 19, wherein the zeolite has a $SiO_2/Al_2O_3$ mole ratio from about 10 to about 15.

Aspect 23. The composition of Aspect 18 or Aspect 19, wherein the zeolite has a $SiO_2/Al_2O_3$ mole ratio of about 11.5.

Aspect 24. The composition of anyone of Aspect 18 to Aspect 28, wherein the zeolite has a surface area from about 250 $m^2 \cdot g^{-1}$ to about 600 $m^2 \cdot g^{-1}$.

Aspect 25. The composition of anyone of Aspect 18 to Aspect 28, wherein the zeolite has a surface area from about 350 $m^2 \cdot g^{-1}$ to about 500 $m^2 \cdot g^{-1}$.

Aspect 26. The composition of anyone of Aspect 18 to Aspect 28, wherein the zeolite has a surface area of about 400 $m^2 \cdot g^{-1}$ to about 450 $m^2 \cdot g^{-1}$.

Aspect 27. The composition of anyone of Aspect 18 to Aspect 28, wherein the zeolite has a surface area of about 425 $m^2 \cdot g^{-1}$.

Aspect 28. The composition of any one of Aspect 1 to Aspect 17, wherein support material is an alumina.

Aspect 29. The composition of Aspect 28, wherein the alumina is $\gamma$-$Al_2O_3$ or a fumed alumina.

Aspect 30. The composition of Aspect 28, wherein the alumina is $\gamma$-$Al_2O_3$.

Aspect 31. The composition of any one of Aspect 28 to Aspect 30, wherein surface area of the alumina is from about 50 $m^2 \cdot g^{-1}$ to about 500 $m^2 \cdot g^{-1}$.

Aspect 32. The composition of any one of Aspect 28 to Aspect 30, wherein surface area of the alumina is from about 75 $m^2 \cdot g^{-1}$ to about 250 $m^2 \cdot g^{-1}$.

Aspect 33. The composition of any one of Aspect 28 to Aspect 30, wherein surface area of the alumina is from about 100 $m^2 \cdot g^{-1}$ to about 200 $m^2 \cdot g^{-1}$.

Aspect 34. The composition of anyone of Aspect 1 to Aspect 17, wherein the support material is a silica.

Aspect 35. The composition of Aspect 34, wherein the silica is selected from a precipitated silica, a silica gel, and a fumed silica.

Aspect 36. The composition of Aspect 34, wherein the silica is a fumed silica.

Aspect 37. The composition of Aspect 36, wherein the silica has a bulk density of about 50 $kg \cdot m^{-3}$ to about 450 $kg \cdot m^{-3}$.

Aspect 38. The composition of Aspect 36, wherein the silica has a bulk density of about 90 $kg \cdot m^{-3}$ to about 380 $kg \cdot m^{-3}$.

Aspect 39. The composition of Aspect 36, wherein the silica has a bulk density of about 350 $kg \cdot m^{-3}$ to about 450 $kg \cdot m^{-3}$.

Aspect 40. The composition of Aspect 36, wherein the silica has a bulk density of about 380 $kg \cdot m^{-3}$±about 30 $kg \cdot m^{-3}$.

Aspect 41. The composition of anyone of Aspect 36 to Aspect 40, wherein the silica has an average particle size of about 1 nm to about 20 nm.

Aspect 42. The composition of Aspect 41, wherein the silica has an average particle size of about 5 nm to about 15 nm.

Aspect 43. The composition of Aspect 41, wherein the silica has an average particle size of about 5 nm to about 10 nm.

Aspect 44. A method of making the composition of anyone of Aspect 1 to Aspect 43, the method comprising the steps of: contacting a support material with an aqueous solution comprising a first 3d transition metal salt and a second 3d transition metal to form a mixture comprising the support material and the aqueous solution comprising the first 3d transition metal salt and the second 3d transition metal metal; wherein the support material is selected from a silica, an alumina, a zeolite, titanium dioxide, or a mixture thereof; and wherein the first 3d metal salt and the second 3d metal salt are not the same; drying the mixture to form a dried mixture; calcining the dried mixture to form a calcined mixture; and reducing the calcined mixture, thereby providing the composition of any one of Aspect 1 to Aspect 43.

Aspect 45. The method of Aspect 44, wherein the support material is a silica.

Aspect 46. The method of Aspect 45, wherein the silica is selected from a precipitated silica, a silica gel, and a fumed silica.

Aspect 47. The method of Aspect 45, wherein the silica is a fumed silica.

Aspect 48. The method of Aspect 47, wherein the silica has a bulk density of about 50 $kg \cdot m^{-3}$ to about 450 $kg \cdot m^{-3}$.

Aspect 49. The method of Aspect 47, wherein the silica has a bulk density of about 90 $kg \cdot m^{-3}$ to about 380 $kg \cdot m^{-3}$.

Aspect 50. The method of Aspect 47, wherein the silica has a bulk density of about 350 $kg \cdot m^{-3}$ to about 450 $kg \cdot m^{-3}$.

Aspect 51. The method of Aspect 47, wherein the silica has a bulk density of about 380 $kg \cdot m^{-3}$ about 30 $kg \cdot m^{-3}$.

Aspect 52. The method of anyone of Aspect 47 to Aspect 51, wherein the silica has an average particle size of about 1 nm to about 20 nm.

Aspect 53. The method of Aspect 52, wherein the silica has an average particle size of about 5 nm to about 15 nm.

Aspect 54. The method of Aspect 52, wherein the silica has an average particle size of about 5 nm to about 10 nm.

Aspect 55. The method of any one of Aspect 44 to Aspect 54, wherein the first 3d metal salt and the second 3d metal salt are independently selected from a nickel salt, an iron salt, a cobalt salt, a molybdenum salt, a chromium salt, a manganese salt, and combinations thereof; provided that the first 3d metal salt and the second 3d metal salt are not the same.

Aspect 56. The method of Aspect 55, the first 3d metal salt is a nickel salt and the second 3d metal salt is an iron salt or a cobalt salt.

Aspect 57. The method of Aspect 55, the first 3d metal salt is an iron salt and the second 3d metal salt is a cobalt salt.

Aspect 58. The method of anyone of Aspect 55 to Aspect 57, wherein the nickel salt is $Ni(NO_3)_2 \cdot 6H_2O$.

Aspect 59. The method of anyone of Aspect 55 to Aspect 57, wherein the iron salt is $Fe(NO_3)_2 \cdot 9H_2O$.

Aspect 60. The method of anyone of Aspect 55 to Aspect 57, wherein the cobalt salt is $Co(NO_3)_2 \cdot 6H_2O$.

Aspect 61. The method of anyone of Aspect 44 to Aspect 60, wherein the drying the mixture comprises heating the mixture at a temperature of greater than 100° C. to about 200° C.

Aspect 62. The method of anyone of Aspect 44 to Aspect 60, wherein the drying the mixture comprises heating the mixture at a temperature of about 120° C. to about 150° C.

Aspect 63. The method of anyone of Aspect 44 to Aspect 60, wherein the drying the mixture comprises heating the mixture at a temperature of about 120° C. to about 140° C.

Aspect 64. The method of any one of Aspect 44 to Aspect 63, wherein the drying comprises heating them mixture in an oven.

Aspect 65. The method of Aspect 64, wherein the drying comprises heating in the oven for a period of about 4 hours to about 36 hours.

Aspect 66. The method of Aspect 64, wherein the drying comprises heating in the oven for a period of about 12 hours to about 24 hours.

Aspect 67. The method of anyone of Aspect 44 to Aspect 66, wherein the calcining occurs at a temperature of about 400° C. to about 900° C. with a heating rate of about 1° $C. \cdot min^{-1}$ to about 10° $C. \cdot min^{-1}$.

Aspect 68. The method of Aspect 67, wherein the temperature is about 450° C. to about 550° C. and the heating rate is about 3° $C. \cdot min^{-1}$ to about 7° $C. \cdot min^{-1}$ when the first 3d metal salt is a nickel salt and the second 3d metal salt is an iron salt.

Aspect 69. The method of Aspect 68, wherein the temperature is about 500° C. and the heating rate is about 5° $C. \cdot min^{-1}$.

Aspect 70. The method of Aspect 67, wherein the temperature is about 700° C. to about 800° C. and the heating rate is about 3° $C. \cdot min^{-1}$ to about 7° $C. \cdot min^{-1}$ when the first 3d metal salt is a nickel salt and the second 3d metal salt is a cobalt salt.

Aspect 71. The method of Aspect 70, wherein the temperature is about 750° C. and the heating rate is about 5° $C. \cdot min^{-1}$.

Aspect 72. The method of Aspect 67, wherein the temperature is about 400° C. to about 500° C. and the heating rate is about 3° $C. \cdot min^{-1}$ to about 7° $C. \cdot min^{-1}$ when the first 3d metal salt is an iron salt and the second 3d metal salt is a cobalt salt.

Aspect 73. The method of Aspect 72, wherein the temperature is about 450° C. and the heating rate is about 5° $C. \cdot min^{-1}$.

Aspect 74. The method of anyone of Aspect 44 to Aspect 73, wherein the calcining occurs a Muffle furnace.

Aspect 75. The method of anyone of Aspect 44 to Aspect 74, wherein the reducing occurs by providing a reducing gas mixture at a flow rate of about 50 $ml \cdot min^{-1}$ to about 150 $ml \cdot min^{-1}$ and heating at a temperature of about 400° C. to about 900° C. with a heating rate of about 1° C. to about 20° C. for about 1 hour to about 12 hours; wherein the reducing gas mixture comprises about 5% to about 20% hydrogen and about 95% to about 80% argon.

Aspect 76. The method of Aspect 75, wherein the flow rate is about 50 $ml \cdot min^{-1}$ to about 100 $ml \cdot min^{-1}$; and wherein the reducing gas mixture comprises about 5% to about 15% hydrogen.

Aspect 77. The method of Aspect 75, wherein the flow rate is about 70 $ml \cdot min^{-1}$; and wherein the reducing gas mixture comprises about 10% hydrogen.

Aspect 78. The method of any one of Aspect 44 to Aspect 77, wherein reducing occurs the temperature is about 650° C. to about 750° C. and the heating rate is about 7° $C. \cdot min^{-1}$ to about 12° $C. \cdot min^{-1}$ for about 3 hours to about 5 hours when the first 3d metal salt is a nickel salt and the second 3d metal salt is an iron salt.

Aspect 79. The method of 62, wherein the temperature is about 700° C. and the heating rate is about 10° $C. \cdot min^{-1}$ for about 4 hours.

Aspect 80. The method of any one of Aspect 44 to Aspect 77, wherein reducing occurs the temperature is about 650° C. to about 750° C. and the heating rate is about 7° $C. \cdot min^{-1}$ to about 12° $C. \cdot min^{-1}$ for about 1 hours to about 3 hours when the first 3d metal salt is a nickel salt and the second 3d metal salt is cobalt salt.

Aspect 81. The method of Aspect 80, wherein the temperature is about 700° C. and the heating rate is about 10° $C. \cdot min^{-1}$ for about 2 hours.

Aspect 82. The method of any one of Aspect 44 to Aspect 77, wherein reducing occurs the temperature is about 450° C. to about 550° C. and the heating rate is about 7° $C. \cdot min^{-1}$ to about 12° $C. \cdot min^{-1}$ for about 3 hours to about 5 hours when the first 3d metal salt is an iron salt and the second 3d metal salt is cobalt salt.

Aspect 83. The method of Aspect 80, wherein the temperature is about 580° C. and the heating rate is about 10° $C. \cdot min^{-1}$ for about 4 hours.

Aspect 84. A composition made by the method of anyone of Aspect 44-Aspect 83.

Aspect 85. A method of decomposing a lower hydrocarbon, the method comprising the steps of: heating a catalyst to a temperature of about 500° C. to about 1000° C. at a heating rate of about 1° $C. \cdot min^{-1}$ to about 20° $C. \cdot min^{-1}$; wherein the catalyst bed comprises a composition of any one of Aspect 1 to Aspect 43 or a composition made by the method of any one of Aspect 44-Aspect 83; wherein the catalyst is positioned within a reactor; wherein the reactor is fixed-bed reactor or a moving bed flow reactor configuration; wherein the reactor comprises an inlet end and an outlet end for gas flow; optionally (a) providing a flow of a first inert gas through the inlet end at an inert gas flow rate of about 25 $ml \cdot min^{-1}$ to about 200 $ml \cdot min^{-1}$; wherein the flow of the first inert gas is in contact with the catalyst; and (b) terminating the flow of the first inert gas through the inlet end; providing a flow of a reactant gas through to the inlet end at a reactant gas flow equivalent to a space velocity of about 5,000 $h^{-1}$ to about 60,000 $h^{-1}$, and a time-on-stream (TOS) from about 0 minutes to about 240 minutes; wherein the flow of the reactant gas is in contact with the catalyst bed; and wherein the reactant gas comprises a lower hydrocarbon and a second inert gas; collecting a outflow gas at the outlet; wherein the outflow gas comprises hydrogen.

Aspect 86. The method of Aspect 85, wherein the first inert gas comprises nitrogen, argon, or a mixture thereof.

Aspect 87. The method of Aspect 85, wherein the first inert gas comprises nitrogen.

Aspect 88. The method of any one of Aspect 85 to Aspect 87, wherein the inert gas flow rate is about 50 ml·min$^{-1}$ to about 150 ml·min$^{-1}$.

Aspect 89. The method of any one of Aspect 85 to Aspect 87, wherein the inert gas flow rate is about 50 ml·min$^{-1}$ to about 100 ml·min$^{-1}$.

Aspect 90. The method of any one of Aspect 85 to Aspect 87, wherein the inert gas flow rate is about 60 ml·min$^{-1}$ to about 80 ml·min$^{-1}$.

Aspect 91. The method of any one of Aspect 85 to Aspect 87, wherein the inert gas flow rate is about 70 ml·min$^{-1}$.

Aspect 92. The method of any one of Aspect 85 to Aspect 91, wherein reactant gas comprises from about 10% to about 60% of the lower hydrocarbon and from about 90% to about 40% of the second inert gas.

Aspect 93. The method of Aspect 92, wherein reactant gas comprises from about 20% to about 50% of the lower hydrocarbon and from about 80% to about 50% of the second inert gas.

Aspect 94. The method of any one of Aspect 85 to Aspect 93, wherein the lower hydrocarbon is methane.

Aspect 95. The method of any one of Aspect 85 to Aspect 94, wherein the second inert gas is selected from nitrogen, argon, or a mixture thereof.

Aspect 96. The method of any one of Aspect 85 to Aspect 95, wherein the second inert gas is nitrogen.

Aspect 97. The method of any one of Aspect 85 to Aspect 96, wherein the reactant gas flow rate is about 50 ml·min$^{-1}$ to about 150 ml·min$^{-1}$.

Aspect 98. The method of any one of Aspect 85 to Aspect 96, wherein the reactant gas flow rate is about 50 ml·min$^{-1}$ to about 100 ml·min$^{-1}$.

Aspect 99. The method of any one of Aspect 85 to Aspect 96, wherein the reactant gas flow rate is about 60 ml·min$^{-1}$ to about 80 ml·min$^{-1}$.

Aspect 100. The method of anyone of Aspect 85 to Aspect 96, wherein the reactant gas flow rate is about 70 ml·min$^{-1}$.

Aspect 101. The method of any one of Aspect 85 to Aspect 100, wherein the space velocity is about 35,000 h$^{-1}$ to about 50,000 h$^{-1}$.

Aspect 102. The method of any one of Aspect 85 to Aspect 100, wherein the space velocity is about 40,000 h$^{-1}$ to about 45,000 h$^{-1}$.

Aspect 103. The method of any one of Aspect 85 to Aspect 100, wherein the space velocity is about 42,000 h$^{-1}$.

Aspect 104. The method of any one of Aspect 85 to Aspect 103, wherein the time-on-stream is from about 0 minutes to about 90 minutes.

Aspect 105. The method of any one of Aspect 85 to Aspect 103, wherein the time-on-stream is from about 0 minutes to about 75 minutes.

Aspect 106. The method of any one of Aspect 85 to Aspect 103, wherein the time-on-stream from about 0 minutes to about 60 minutes.

Aspect 107. The method of any one of Aspect 85 to Aspect 106, wherein the decomposition of the lower hydrocarbon yields hydrogen at a conversion efficiency of at about 10% to at about 90%.

Aspect 108. The method of any one of Aspect 85 to Aspect 106, wherein the decomposition of the lower hydrocarbon yields hydrogen at a conversion efficiency of at about 30% to at about 90%.

Aspect 109. The method of any one of Aspect 85 to Aspect 106, wherein the decomposition of the lower hydrocarbon yields hydrogen at a conversion efficiency of at least about 35% to at least about 70%.

Aspect 110. The method of any one of Aspect 85 to Aspect 109, wherein the decomposition of the lower hydrocarbon yields carbon.

Aspect 111. The method of Aspect 110, wherein the carbon is essentially free of amorphous carbon.

Aspect 112. The method of 90 or Aspect 111, wherein the carbon accumulates in contact with the catalyst bed.

Aspect 113. The method of anyone of Aspect 110 to Aspect 112, wherein the carbon comprises carbon nanotubes.

Aspect 114. The method of Aspect 113, wherein the carbon nanotubes have an ID/IG value of about 0.600 to about 0.880.

Aspect 115. The method of Aspect 113, wherein the carbon nanotubes have an ID/IG value of about 0.760 to about 0.875.

Aspect 116. The method of anyone of Aspect 113 to Aspect 115, wherein the carbon nanotubes comprise multi-walled carbon nanotubes.

Aspect 117. The method of anyone of Aspect 113 to Aspect 116, wherein the carbon nanotubes have a mean diameter of about 1 nm to about 150 nm.

Aspect 118. The method of anyone of Aspect 113 to Aspect 116, wherein the carbon nanotubes have a mean diameter of about 5 nm to about 70 nm.

Aspect 119. The method of anyone of Aspect 113 to Aspect 116, wherein the carbon nanotubes have a mean diameter of about 5 nm to about 30 nm.

Aspect 120. The method of anyone of Aspect 113 to Aspect 116, wherein the carbon nanotubes have a mean diameter of about 40 nm to about 150 nm.

Aspect 121. The method of anyone of Aspect 113 to Aspect 116, wherein the carbon nanotubes have a mean diameter of about 40 nm to about 70 nm.

Aspect 122. The method of anyone of Aspect 113 to Aspect 116, wherein the carbon nanotubes have a mean diameter of about 100 nm to about 140 nm.

Aspect 123. The method of anyone of Aspect 113 to Aspect 122, wherein the carbon nanotubes comprise graphene layers stacked obliquely with respect to a tubular axis of the carbon nanotubes.

Aspect 124. The method of anyone of Aspect 113 to Aspect 122, wherein the carbon nanotubes comprise graphene layers stacked parallel with respect to a tubular axis of the carbon nanotubes Aspect 125. The method of anyone of Aspect 113 to Aspect 124, wherein the carbon nanotubes comprise tip growth carbon nanotubes, base growth carbon nanotubes, and mixtures thereof.

Aspect 126. The method of anyone of Aspect 113 to Aspect 125, further comprising purifying the carbon nanotubes from the catalyst bed.

Aspect 127. The method of anyone of Aspect 113 to Aspect 126, further comprising a regeneration cycle comprising terminating the flow of reactant gas and providing a regeneration gas to the catalyst bed; wherein the regeneration gas is in contact with the catalyst bed for a contact period from about 5 minutes to about 240 minutes; wherein the temperature of the catalyst bed is from about 250° C. to about 750° C.; and wherein the regeneration gas comprises oxygen.

Aspect 128. The method of Aspect 127, wherein the regeneration gas comprises from about 5% to about 25% oxygen.

Aspect 129. The method of Aspect 127, wherein the regeneration gas comprises from about 7.5% to about 15% oxygen.

Aspect 130. The method of Aspect 127, wherein the regeneration gas comprises about 10%.

Aspect 131. The method of anyone of Aspect 127 to Aspect 130, wherein the contact period is from about 15 minutes to about 60 minutes.

Aspect 132. The method of anyone of Aspect 127 to Aspect 130, wherein the contact period is from about 20 minutes to about 40 minutes.

Aspect 133. The method of anyone of Aspect 127 to Aspect 130, wherein the contact period is about 30 minutes.

Aspect 134. The method of any one of Aspect 127 to Aspect 133, wherein the catalyst bed is at a temperature from about 400° C. to about 600° C.

Aspect 135. The method of any one of Aspect 127 to Aspect 133, wherein the catalyst bed is at a temperature from about 450° C. to about 550° C.

Aspect 136. The method of any one of Aspect 127 to Aspect 135, wherein the catalyst bed is at a temperature of about 500° C.

Aspect 137. The method of any one of Aspect 127 to Aspect 136, further comprising a further reaction cycle comprising terminating contact of the catalyst bed with the regeneration gas; optionally providing a flow of a first inert gas through the inlet end at an inert gas flow rate of about 25 ml·min$^{-1}$ to about 200 ml·min$^{-1}$; wherein the flow of the first inert gas is in contact with the catalyst bed; terminating the flow of the first inert gas through the inlet end; providing a flow of a reactant gas through to the inlet end at a reactant gas flow rate of about 25 ml·min$^{-1}$ to a space velocity of about 20,000 h$^{-1}$ to about 60,000 h$^{-1}$, and a time-on-stream (TOS) from about 10 minutes to about 240 minutes.

Aspect 138. The method of Aspect 137, wherein the efficiency of lower hydrocarbon conversion does not change by more than 10% with each further reaction cycle.

Aspect 139. The method of any one of Aspect 127 to Aspect 138, further comprising repeating the regeneration cycle and further reaction cycles for 1 to 10 cycles.

Aspect 140. A carbon nanotube made by the method of any one of Aspect 85 to Aspect 139.

Aspect 141. A composition comprising a 3d transition metal and a support material,
wherein the 3d transition metal is selected from Ni, Fe, Co, Mn, Cr and Mo;
wherein the support material is selected from a silica, an alumina, a zeolite, a titanium dioxide, and mixtures thereof;
wherein the 3d transition metal is present in an amount from about 5 wt % to about 70 wt % based on the total weight of the 3d transition metal and the support material; and
wherein the support material is present in an amount from about 95 wt % to about 30 wt % based on the total weight of the 3d transition metal and the support material.

Aspect 142. The composition of Aspect 141, wherein support material is a zeolite.

Aspect 143. The composition of Aspect 142, wherein the zeolite is selected from a ZSM-5, Zeolite β and USY zeolite.

Aspect 144. The composition of Aspect 142 or Aspect 143, wherein the zeolite has a SiO$_2$/Al$_2$O$_3$ mole ratio from about 5 to about 25.

Aspect 145. The composition of Aspect 142 or Aspect 143, wherein the zeolite has a SiO$_2$/Al$_2$O$_3$ mole ratio from about 7.5 to about 15.

Aspect 146. The composition of Aspect 142 or Aspect 143, wherein the zeolite has a SiO$_2$/Al$_2$O$_3$ mole ratio from about 10 to about 15.

Aspect 147. The composition of Aspect 142 or Aspect 143, wherein the zeolite has a SiO$_2$/Al$_2$O$_3$ mole ratio of about 11.5.

Aspect 148. The composition of any one of Aspect 142 to Aspect 147, wherein the zeolite has a surface area from about 250 m$^2$·g$^{-1}$ to about 600 m$^2$·g$^{-1}$.

Aspect 149. The composition of any one of Aspect 142 to Aspect 147, wherein the zeolite has a surface area from about 350 m$^2$·g$^{-1}$ to about 500 m$^2$·g$^{-1}$.

Aspect 150. The composition of any one of Aspect 142 to Aspect 147, wherein the zeolite has a surface area of about 400 m$^2$·g$^{-1}$ to about 450 m$^2$·g$^{-1}$.

Aspect 151. The composition of any one of Aspect 142 to Aspect 147, wherein the zeolite has a surface area of about 425 m$^2$·g$^{-1}$.

Aspect 152. The composition of Aspect 141, wherein support material is an alumina.

Aspect 153. The composition of Aspect 152, wherein the alumina is γ-Al$_2$O$_3$ or a fumed alumina.

Aspect 154. The composition of Aspect 152, wherein the alumina is γ-Al$_2$O$_3$.

Aspect 155. The composition of any one of Aspect 141 or Aspect 152 to Aspect 154, wherein surface area of the alumina is from about 50 m$^2$·g$^{-1}$ to about 500 m$^2$·g$^{-1}$.

Aspect 156. The composition of any one of Aspect 141 or Aspect 152 to Aspect 154, wherein surface area of the alumina is from about 75 m$^2$·g$^{-1}$ to about 250 m$^2$·g$^{-1}$.

Aspect 157. The composition of any one of Aspect 141 or Aspect 152 to Aspect 154, wherein surface area of the alumina is from about 100 m$^2$·g$^{-1}$ to about 200 m$^2$·g$^{-1}$.

Aspect 158. The composition of Aspect 141, wherein the support material is a silica.

Aspect 159. The composition of Aspect 158, wherein the silica is selected from a precipitated silica, a silica gel, and a fumed silica.

Aspect 160. The composition of Aspect 159, wherein the silica is a fumed silica.

Aspect 161. The composition of Aspect 160, wherein the silica has a bulk density of about 50 kg·m$^{-3}$ to about 450 kg·m$^{-3}$.

Aspect 162. The composition of Aspect 160, wherein the silica has a bulk density of about 90 kg·m$^{-3}$ to about 380 kg·m$^{-3}$.

Aspect 163. The composition of Aspect 160, wherein the silica has a bulk density of about 350 kg·m$^{-3}$ to about 450 kg·m$^{-3}$.

Aspect 164. The composition of Aspect 160, wherein the silica has a bulk density of about 380 kg·m$^{-3}$±about 30 kg·m$^{-3}$.

Aspect 165. The composition of any one of Aspect 141 to Aspect 164, wherein the silica has an average particle size of about 1 nm to about 200 nm.

Aspect 166. The composition of Aspect 165, wherein the silica has an average particle size of about 5 nm to about 150 nm.

Aspect 167. The composition of Aspect 165, wherein the silica has an average particle size of about 5 nm to about 100 nm.

Aspect 168. The composition of Aspect 165, wherein the silica has an average particle size of about 5 nm to about 50 nm.

Aspect 169. The composition of Aspect 165, wherein the silica has an average particle size of about 5 nm to about 40 nm.

Aspect 170. The composition of Aspect 165, wherein the silica has an average particle size of about 5 nm to about 30 nm.

Aspect 171. The composition of Aspect 165, wherein the silica has an average particle size of about 5 nm to about 20 nm.

Aspect 172. The composition of Aspect 165, wherein the silica has an average particle size of about 5 nm to about 15 nm.

Aspect 173. The composition of Aspect 165, wherein the silica has an average particle size of about 5 nm to about 10 nm.

Aspect 174. The composition of any one of Aspect 141 to Aspect 173, wherein the composition comprises about 55% to about 65% Fe and about 45% to about 35% support material.

Aspect 175. The composition of any one of Aspect 141 to Aspect 173, wherein the composition comprises about 5% to about 65% Ni and about 95% to about 35% support material Aspect 176. The composition of any one of Aspect 141 to Aspect 173, wherein the composition comprises about 25% to about 65% Co and about 75% to about 35% support material Aspect 177. The composition of any one of Aspect 141 to Aspect 173, wherein the composition comprises about 35% to about 65% Ni and about 65% to about 35% support material.

Aspect 178. The composition of any one of Aspect 141 to Aspect 173, wherein the composition comprises about 35% to about 65% Co and about 65% to about 35% support material.

Aspect 179. The composition of any one of Aspect 141 to Aspect 178, wherein the composition has a aerogel structure.

Aspect 180. The composition of any one of Aspect 141 to Aspect 179, wherein the composition has a mesoporous structure.

Aspect 181. The composition of any one of Aspect 141 to Aspect 180, wherein the composition has a BET surface area of from about 50 $m^2 \cdot g^{-1}$ to about 500 $m^2 \cdot g^{-1}$.

Aspect 182. The composition of Aspect 181, wherein the composition has a BET surface area of from about 100 $m^2 \cdot g^{-1}$ to about 400 $m^2 \cdot g^{-1}$.

Aspect 183. The composition of Aspect 181, wherein the composition has a BET surface area of from about 150 $m^2 \cdot g^{-1}$ to about 350 $m^2 \cdot g^{-1}$.

Aspect 184. The composition of Aspect 181, wherein the composition has a BET surface area of from about 220 $m^2 \cdot g^{-1}$ to about 380 $m^2 \cdot g^{-1}$.

Aspect 185. The composition of Aspect 181, wherein the composition has a BET surface area of from about 230 $m^2 \cdot g^{-1}$ to about 370 $m^2 \cdot g^{-1}$.

Aspect 186. The composition of Aspect 181, wherein the composition has a BET surface area of from about 240 $m^2 \cdot g^{-1}$ to about 360 $m^2 \cdot g^{-1}$.

Aspect 187. The composition of Aspect 181, wherein the composition has a BET surface area of from about 250 $m^2 \cdot g^{-1}$ to about 350 $m^2 \cdot g^{-1}$.

Aspect 188. The composition of Aspect 181, wherein the composition has a BET surface area of from about 260 $m^2 \cdot g^{-1}$ to about 340 $m^2 \cdot g^{-1}$.

Aspect 189. The composition of Aspect 181, wherein the composition has a BET surface area of from about 265 $m^2 \cdot g^{-1}$ to about 335 $m^2 \cdot g^{-1}$.

Aspect 190. The composition of any one of Aspect 141 to Aspect 180, wherein the composition has a Barrett-Joyner-Halenda (BJH) pore size of from about 1 nm to about 50 nm.

Aspect 191. The composition of Aspect 190, wherein the composition has a Barrett-Joyner-Halenda (BJH) pore size of from about 5 nm to about 45 nm.

Aspect 192. The composition of Aspect 190, wherein the composition has a Barrett-Joyner-Halenda (BJH) pore size of from about 5 nm to about 40 nm.

Aspect 193. The composition of Aspect 190, wherein the composition has a Barrett-Joyner-Halenda (BJH) pore size of from about 5 nm to about 35 nm.

Aspect 194. The composition of Aspect 190, wherein the composition has a Barrett-Joyner-Halenda (BJH) pore size of from about 5 nm to about 30 nm.

Aspect 195. The composition of Aspect 190, wherein the composition has a Barrett-Joyner-Halenda (BJH) pore size of from about 5 nm to about 25 nm.

Aspect 196. The composition of Aspect 190, wherein the composition has a Barrett-Joyner-Halenda (BJH) pore size of from about 5 nm to about 20 nm.

Aspect 197. The composition of Aspect 190, wherein the composition has a Barrett-Joyner-Halenda (BJH) pore size of from about 5 nm to about 15 nm.

Aspect 198. The composition of Aspect 190, wherein the composition has a Barrett-Joyner-Halenda (BJH) pore size of from about 5 nm to about 10 nm.

Aspect 199. The composition of Aspect 190, wherein the composition has a Barrett-Joyner-Halenda (BJH) pore size of from about 10 nm to about 50 nm.

Aspect 200. The composition of Aspect 190, wherein the composition has a Barrett-Joyner-Halenda (BJH) pore size of from about 10 nm to about 45 nm.

Aspect 201. The composition of Aspect 190, wherein the composition has a Barrett-Joyner-Halenda (BJH) pore size of from about 10 nm to about 40 nm.

Aspect 202. The composition of Aspect 190, wherein the composition has a Barrett-Joyner-Halenda (BJH) pore size of from about 10 nm to about 35 nm.

Aspect 203. The composition of Aspect 190, wherein the composition has a Barrett-Joyner-Halenda (BJH) pore size of from about 10 nm to about 30 nm.

Aspect 204. The composition of Aspect 190, wherein the composition has a Barrett-Joyner-Halenda (BJH) pore size of from about 10 nm to about 25 nm.

Aspect 205. The composition of Aspect 190, wherein the composition has a Barrett-Joyner-Halenda (BJH) pore size of from about 10 nm to about 20 nm.

Aspect 206. The composition of Aspect 190, wherein the composition has a Barrett-Joyner-Halenda (BJH) pore size of from about 10 nm to about 15 nm.

Aspect 207. The composition of any one of Aspect 141 to Aspect 206, wherein the composition has a pore volume of from about 0.3 $cm^3/g$ to about 1.6 $cm^3/g$.

Aspect 208. The composition of Aspect 207, wherein the composition has a pore volume of from about 0.4 $cm^3/g$ to about 1.4 $cm^3/g$.

Aspect 209. The composition of Aspect 207, wherein the composition has a pore volume of from about 0.5 $cm^3/g$ to about 1.4 $cm^3/g$.

Aspect 210. The composition of Aspect 207, wherein the composition has a pore volume of from about 0.6 $cm^3/g$ to about 1.4 $cm^3/g$.

Aspect 211. The composition of Aspect 207, wherein the composition has a pore volume of from about 0.7 $cm^3/g$ to about 1.4 $cm^3/g$.

Aspect 212. The composition of Aspect 207, wherein the composition has a pore volume of from about 0.8 cm$^3$/g to about 1.4 cm$^3$/g.

Aspect 213. The composition of Aspect 207, wherein the composition has a pore volume of from about 0.9 cm$^3$/g to about 1.4 cm$^3$/g.

Aspect 214. The composition of Aspect 207, wherein the composition has a pore volume of from about 1.0 cm$^3$/g to about 1.4 cm$^3$/g.

Aspect 215. The composition of Aspect 207, wherein the composition has a pore volume of from about 0.3 cm$^3$/g to about 1.2 cm$^3$/g.

Aspect 216. The composition of Aspect 207, wherein the composition has a pore volume of from about 0.4 cm$^3$/g to about 1.2 cm$^3$/g.

Aspect 217. The composition of Aspect 207, wherein the composition has a pore volume of from about 0.5 cm$^3$/g to about 1.2 cm$^3$/g.

Aspect 218. The composition of Aspect 207, wherein the composition has a pore volume of from about 0.6 cm$^3$/g to about 1.2 cm$^3$/g.

Aspect 219. The composition of Aspect 207, wherein the composition has a pore volume of from about 0.7 cm$^3$/g to about 1.2 cm$^3$/g.

Aspect 220. The composition of Aspect 207, wherein the composition has a pore volume of from about 0.8 cm$^3$/g to about 1.2 cm$^3$/g.

Aspect 221. The composition of Aspect 207, wherein the composition has a pore volume of from about 0.9 cm$^3$/g to about 1.2 cm$^3$/g.

Aspect 222. The composition of Aspect 207, wherein the composition has a pore volume of from about 1.0 cm$^3$/g to about 1.2 cm$^3$/g.

Aspect 223. The composition of any one of Aspect 141 to Aspect 222, wherein the 3d transition metal is distributed within the support material, on an external surface of the support material, on an internal surface of the support material, or combinations thereof.

Aspect 224. A method of making the composition of any one of Aspect 141 to Aspect 223, the method comprising the steps of: contacting a support material with an aqueous solution comprising 3d transition metal salt selected from a nickel salt, an iron salt, a cobalt salt, a manganese salt, a chromium salt, a molybdenum salt, or a combination thereof, thereby forming a mixture comprising the support material and the aqueous solution comprising the 3d transition metal salt; wherein the support material is selected from a silica, an alumina, a zeolite, titanium dioxide or a mixture thereof; wherein the 3d transition metal salt is present in an amount from about 5 wt % to about 70 wt % based on the total weight of the 3d transition metal and the support material; and wherein the support material is present in an amount from about 95 wt % to about 30 wt % based on the total weight of the 3d transition metal and the support material. drying the mixture to form a dried mixture; calcining the dried mixture to form a calcined mixture; and reducing the calcined mixture, thereby providing the composition of any one of Aspect 141 to Aspect 223.

Aspect 225. The method of Aspect 224, wherein the 3d transition metal salt is an iron salt.

Aspect 226. The method of Aspect 224, wherein the iron salt is Fe(NO$_3$)$_2$.9H$_2$O.

Aspect 227. A composition made by the method of any one of Aspect 224-Aspect 226.

Aspect 228. A method of making the composition of any one of Aspect 141 to Aspect 223, the method comprising the steps of: providing an aerogel precursor solution comprising at least one 3d transition metal salt selected from a nickel salt, an iron salt, a cobalt salt, a manganese salt, a chromium salt, a molybdenum salt, or a combination thereof; an aerogel support salt selected from an aluminum salt, a titanium salt, a silicon salt, or a combination thereof; water; and an organic solvent; heating the aerogel precursor solution; mixing the aerogel precursor with a gelation agent, thereby forming an aerogel sol-gel mixture; drying the aerogel sol-gel mixture; and calcining to form a calcined aerogel sol-gel mixture; reducing the calcined aerogel sol-gel mixture, thereby providing the composition of any one of Aspect 141 to Aspect 223.

Aspect 229. The method of Aspect 228, wherein the 3d transition metal salt is a nickel salt.

Aspect 230. The method of Aspect 229, wherein the nickel salt comprises a nickel halide salt, a nickel nitrate salt, a nickel sulfate salt, or combinations thereof.

Aspect 231. The method of Aspect 229 or Aspect 230, wherein the nickel salt comprises Ni(II).

Aspect 232. The method of Aspect 228, wherein the 3d transition metal salt is a cobalt salt.

Aspect 233. The method of Aspect 232, wherein the cobalt salt comprises a cobalt halide salt, a cobalt nitrate salt, a cobalt sulfate salt, or combinations thereof.

Aspect 234. The method of Aspect 232 or Aspect 233, wherein the nickel salt comprises Co(II).

Aspect 235. The method of any one of Aspect 228-Aspect 234, wherein the aerogel support salt is an aluminum salt.

Aspect 236. The method of Aspect 229, wherein the aluminum salt comprises an aluminum chloride salt.

Aspect 237. The method of Aspect 236, wherein the aluminum salt comprises AlCl3.

Aspect 238. The method of any one of Aspect 228-Aspect 237, wherein the organic solvent is a C1-C6 alcohol.

Aspect 239. The method of Aspect 238, wherein the organic solvent is methanol, ethanol, propanol, or combinations thereof.

Aspect 240. The method of any one of Aspect 228-Aspect 239, wherein the gelation agent is propylene oxide.

Aspect 241. The method of any one of Aspect 228-Aspect 240, wherein calcining comprises heating at an aerogel calcining temperature for an aerogel calcining period of time; wherein the aerogel calcining temperature is from about 300° C. to about 1000° C.; and wherein the aerogel calcining period of time is from about 1 minute to about 48 hours.

Aspect 242. The method of Aspect 241, wherein the aerogel calcining temperature is from about 300° C. to about 900° C.

Aspect 243. The method of Aspect 241, wherein the aerogel calcining temperature is from about 300° C. to about 800° C.

Aspect 244. The method of Aspect 241, wherein the aerogel calcining temperature is from about 300° C. to about 700° C.

Aspect 245. The method of Aspect 241, wherein the aerogel calcining temperature is from about 300° C. to about 600° C.

Aspect 246. The method of Aspect 241, wherein the aerogel calcining temperature is from about 300° C. to about 500° C.

Aspect 247. The method of Aspect 241, wherein the aerogel calcining temperature is from about 400° C. to about 1000° C.

Aspect 248. The method of Aspect 241, wherein the aerogel calcining temperature is from about 400° C. to about 900° C.

Aspect 249. The method of Aspect 241, wherein the aerogel calcining temperature is from about 400° C. to about 800° C.

Aspect 250. The method of Aspect 241, wherein the aerogel calcining temperature is from about 400° C. to about 700° C.

Aspect 251. The method of Aspect 241, wherein the aerogel calcining temperature is from about 400° C. to about 600° C.

Aspect 252. The method of Aspect 241, wherein the aerogel calcining temperature is from about 400° C. to about 500° C.

Aspect 253. The method of anyone of Aspect 241-Aspect 252, wherein the aerogel calcining period of time is from about 30 minutes to about 24 hours.

Aspect 254. The method of Aspect 253, wherein the aerogel calcining period of time is from about 1 hour to about 18 hours.

Aspect 255. The method of Aspect 253, wherein the aerogel calcining period of time is from about 1 hour to about 16 hours.

Aspect 256. The method of Aspect 253, wherein the aerogel calcining period of time is from about 1 hour to about 14 hours.

Aspect 257. The method of Aspect 253, wherein the aerogel calcining period of time is from about 1 hour to about 12 hours.

Aspect 258. The method of Aspect 253, wherein the aerogel calcining period of time is from about 1 hour to about 10 hours.

Aspect 259. The method of Aspect 253, wherein the aerogel calcining period of time is from about 1 hour to about 9 hours.

Aspect 260. The method of Aspect 253, wherein the aerogel calcining period of time is from about 1 hour to about 8 hours.

Aspect 261. The method of Aspect 253, wherein the aerogel calcining period of time is from about 1 hour to about 7 hours.

Aspect 262. The method of Aspect 253, wherein the aerogel calcining period of time is from about 1 hour to about 6 hours.

Aspect 263. The method of Aspect 253, wherein the aerogel calcining period of time is from about 1 hour to about 5 hours.

Aspect 264. The method of Aspect 253, wherein the aerogel calcining period of time is from about 1 hour to about 4 hours.

Aspect 265. The method of Aspect 253, wherein the aerogel calcining period of time is from about 1 hour to about 3 hours.

Aspect 266. The method of Aspect 253, wherein the aerogel calcining period of time is from about 1 hour to about 2 hours.

Aspect 267. A composition made by the method of any one of Aspect 228 to Aspect 266.

Aspect 268. A method of decomposing a lower hydrocarbon, the method comprising the steps of: heating a catalyst bed to a temperature of about 500° C. to about 1000° C. at a heating rate of about 1° C.·min$^{-1}$ to about 20° C.·min$^{-1}$; wherein the catalyst bed comprises a composition of any one of Aspect 141 to Aspect 223, a composition made by the method of any one of Aspect 224 to Aspect 226; a composition made by the method of any one of Aspect 228 to Aspect 266; wherein the catalyst is positioned within a reactor; wherein the reactor is a fixed-bed or a moving bed flow reactor configuration; wherein the reactor comprises an inlet end and an outlet end for gas flow; optionally: (a) providing a flow of a first inert gas through the inlet end at an inert gas flow rate of about 25 ml·min$^{-1}$ to about 200 ml·min$^{-1}$; wherein the flow of the first inert gas is in contact with the catalyst bed; and (b) terminating the flow of the first inert gas through the inlet end, if present; providing a flow of a reactant gas through to the inlet end at a reactant gas flow rate of about 25 ml·min$^{-1}$ to a space velocity of about 5,000 h$^{-1}$ to about 60,000 h$^{-1}$, and a time-on-stream (TOS) from about 0 minutes to about 240 minutes; wherein the flow of the reactant gas is in contact with the catalyst; and wherein the reactant gas comprises a lower hydrocarbon and a second inert gas; collecting an outflow gas at the outlet; wherein the outflow gas comprises hydrogen.

Aspect 269. The method of Aspect 268, wherein the first inert gas comprises nitrogen, argon, or a mixture thereof.

Aspect 270. The method of Aspect 268, wherein the first inert gas comprises nitrogen.

Aspect 271. The method of any one of Aspect 268 to Aspect 271, wherein the inert gas flow rate is about 50 ml·min$^{-1}$ to about 150 ml·min$^{-1}$.

Aspect 272. The method of any one of Aspect 268 to Aspect 271, wherein the inert gas flow rate is about 50 ml·min$^{-1}$ to about 100 ml·min$^{-1}$.

Aspect 273. The method of any one of Aspect 268 to Aspect 271, wherein the inert gas flow rate is about 60 ml·min$^{-1}$ to about 80 ml·min$^{-1}$.

Aspect 274. The method of any one of Aspect 268 to Aspect 271, wherein the inert gas flow rate is about 70 ml·min$^{-1}$.

Aspect 275. The method of any one of Aspect 268 to Aspect 274, wherein reactant gas comprises from about 10% to about 60% of the lower hydrocarbon and from about 90% to about 40% of the second inert gas.

Aspect 276. The method of Aspect 275, wherein reactant gas comprises from about 20% to about 50% of the lower hydrocarbon and from about 80% to about 50% of the second inert gas.

Aspect 277. The method of any one of Aspect 268 to Aspect 276, wherein the lower hydrocarbon is methane.

Aspect 278. The method of anyone of Aspect 268 to Aspect 277, wherein the second inert gas is selected from nitrogen, argon, or a mixture thereof.

Aspect 279. The method of anyone of Aspect 268 to Aspect 277, wherein the second inert gas is nitrogen.

Aspect 280. The method of any one of Aspect 268 to Aspect 279, wherein the reactant gas flow rate is about 50 ml·min$^{-1}$ to about 150 ml·min$^{-1}$.

Aspect 281. The method of any one of Aspect 268 to Aspect 279, wherein the reactant gas flow rate is about 50 ml·min$^{-1}$ to about 100 ml·min$^{-1}$.

Aspect 282. The method of any one of Aspect 268 to Aspect 279, wherein the reactant gas flow rate is about 60 ml·min$^{-1}$ to about 80 ml·min$^{-1}$.

Aspect 283. The method of any one of Aspect 268 to Aspect 279, wherein the reactant gas flow rate is about 70 ml·min$^{-1}$.

Aspect 284. The method of any one of Aspect 268 to Aspect 283, wherein the space velocity is about 35,000 h$^{-1}$ to about 50,000 h$^{-1}$.

Aspect 285. The method of any one of Aspect 268 to Aspect 283, wherein the space velocity is about 40,000 h$^{-1}$ to about 45,000 h$^{-1}$.

Aspect 286. The method of any one of Aspect 268 to Aspect 283, wherein the space velocity is about 42,000 h 1.

Aspect 287. The method of any one of Aspect 268 to Aspect 286, wherein the time-on-stream is from about 0 minutes to about 90 minutes.

Aspect 288. The method of any one of Aspect 268 to Aspect 103, wherein the time-on-stream is from about 0 minutes to about 75 minutes.

Aspect 289. The method of any one of Aspect 268 to Aspect 103, wherein the time-on-stream is from about 0 minutes to about 60 minutes.

Aspect 290. The method of any one of Aspect 268 to Aspect 106, wherein the decomposition of the lower hydrocarbon yields hydrogen at a conversion efficiency of at about 10% to at about 90%.

Aspect 291. The method of any one of Aspect 268 to Aspect 106, wherein the decomposition of the lower hydrocarbon yields hydrogen at a conversion efficiency of at about 30% to at about 90%.

Aspect 292. The method of any one of Aspect 268 to Aspect 106, wherein the decomposition of the lower hydrocarbon yields hydrogen at a conversion efficiency of at least about 35% to at least about 70%.

Aspect 293. The method of any one of Aspect 268 to Aspect 292, wherein the catalyst bed comprises a composition of about 55% to about 65% Fe and about 45% to about 35% support material.

Aspect 294. The method of any one of Aspect 268 to Aspect 293, wherein the lower hydrocarbon comprises methane.

Aspect 295. The method of any one of Aspect 268 to Aspect 294, wherein the decomposition of the lower hydrocarbon yields a carbon material.

Aspect 296. The method of Aspect 295, wherein the carbon material is essentially free of amorphous carbon.

Aspect 297. The method of Aspect 295 or Aspect 296, wherein the carbon accumulates in contact with the catalyst bed.

Aspect 298. The method of anyone of Aspect 295 to Aspect 297, wherein the carbon comprises carbon nanotubes.

Aspect 299. The method of Aspect 298, wherein the carbon nanotubes have a mean diameter of about 40 nm to about 150 nm.

Aspect 300. The method of Aspect 298, wherein the carbon nanotubes have a mean diameter of about 40 nm to about 70 nm.

Aspect 301. The method of Aspect 298, wherein the carbon nanotubes have a mean diameter of about 100 nm to about 140 nm.

Aspect 302. The method of anyone of Aspect 298 to Aspect 301, wherein the carbon nanotubes comprise tip growth carbon nanotubes, base growth carbon nanotubes, and mixtures thereof.

Aspect 303. The method of Aspect 302, wherein greater than 50% of the carbon nanotubes comprise base growth carbon nanotubes.

Aspect 304. The method of any one of Aspect 268 to Aspect 303, further comprising a regeneration cycle comprising terminating the flow of reactant gas and providing a regeneration gas to the catalyst bed; wherein the regeneration gas is in contact with the catalyst bed for a contact period from about 5 minutes to about 240 minutes; wherein the temperature of the catalyst bed is from about 250° C. to about 750° C.; and wherein the regeneration gas comprises oxygen.

Aspect 305. The method of Aspect 304, wherein the regeneration gas comprises from about 5% to about 25% oxygen.

Aspect 306. The method of Aspect 304, wherein the regeneration gas comprises from about 7.5% to about 15% oxygen.

Aspect 307. The method of Aspect 304, wherein the regeneration gas comprises about 10%.

Aspect 308. The method of any one of Aspect 304 to Aspect 307, wherein the contact period is from about 15 minutes to about 60 minutes.

Aspect 309. The method of anyone of Aspect 304 to Aspect 307, wherein the contact period is from about 20 minutes to about 40 minutes.

Aspect 310. The method of anyone of Aspect 304 to Aspect 307, wherein the contact period is about 30 minutes.

Aspect 311. The method of any one of Aspect 304 to Aspect 310, wherein the catalyst bed is at a temperature from about 400° C. to about 600° C.

Aspect 312. The method of any one of Aspect 304 to Aspect 310, wherein the catalyst bed is at a temperature from about 450° C. to about 550° C.

Aspect 313. The method of any one of Aspect 304 to Aspect 310, wherein the catalyst bed is at a temperature of about 500° C.

Aspect 314. The method of any one of Aspect 304 to Aspect 313, further comprising a further reaction cycle comprising terminating contact of the catalyst bed with the regeneration gas; optionally providing a flow of a first inert gas through the inlet end at an inert gas flow rate of about 25 ml·min$^{-1}$ to about 200 ml·min$^{-1}$; wherein the flow of the first inert gas is in contact with the catalyst bed; terminating the flow of the first inert gas through the inlet end; providing a flow of a reactant gas through to the inlet end at a reactant gas flow rate of about 25 ml·min$^{-1}$ to a space velocity of about 20,000 h$^{-1}$ to about 60,000 h$^{-1}$, and a time-on-stream (TOS) from about 10 minutes to about 240 minutes.

Aspect 315. The method of Aspect 314, wherein the efficiency of lower hydrocarbon conversion does not change by more than 10% with a further reaction cycle.

Aspect 316. The method of any one of Aspect 304 to Aspect 314, further comprising repeating the regeneration cycle and further reaction cycles for 1 to 10 cycles.

Aspect 317. A carbon nanotube made by the method of any one of Aspect 268 to Aspect 316.

Aspect 318. A method for producing multi-walled carbon nanotubes comprising the steps of: decomposing methane in the presence of a metal-based catalyst wherein the metal-based catalyst is regenerated at least once; growing the multi-walled carbon nanotubes, having a tip and a base, wherein the base of the nanotubes are attached to the metal-based catalyst and grow outward from the base; and separating the grown multi-walled carbon nanotubes from the metal-based catalyst near the base of the grown nanotubes leaving behind the metal-based catalyst to grow new nanotubes.

Aspect 319. The method of Aspect 318, further comprising producing substantially COx-free hydrogen gas as a by-product of producing the multi-walled, carbon nanotubes.

Aspect 320. A carbon nanotube made by the method of Aspect 318 or Aspect 319.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Catalyst preparation. Mono and bimetallic Ni, Fe, Co catalysts were prepared by dry impregnation or incipient wetness impregnation method. $Ni(NO_3)_2 \cdot 6H_2O$ (Acros Organics), $Fe(NO_3)_2 \cdot 9H_2O$ (Alfa-Aesar) and $Co(NO_3)_2 \cdot 6H_2O$ (Acros Organics) were used as precursors. Fumed silica (CAB-O-SIL-EH-5 untreated $SiO_2$; CABOT), alumina ($Al_2O_3$ γ phase with surface area=100-200 $m^2/g$; Alfa Aesar); and zeolite (either CBV 2314 or H-ZSM-5 with $SiO_2/Al_2O_3$ mole ratio=11.5 and surface area of about 425 m2/g; Zeolyst international) were used as support materials. An aqueous solution of metal precursor (corresponding to 60 wt % metal loading) was impregnated on to the support. The sample was dried in oven at 130° C. for overnight (16 h). This as-synthesized catalyst was subjected for calcination in a Muffle furnace and then reduced in 10% $H_2$ in Ar flow (70 mlmin.$^{-1}$). Monometallic $Ni/SiO_2$ was calcined at 500° C., 5° C. min.$^{-1}$ for 10 h and reduced at 450° C., 10° C. min.$^{-1}$ for 4 h; $Fe/SiO_2$ was calcined at 500° C., 5° C. min.$^{-1}$ for 10 h and reduced at 700° C., 10° C. min.$^{-1}$ for 4 h; $Co/SiO_2$ was calcined at 450° C., 5° C. min.$^{-1}$ for 3 h and reduced at 580° C., 10° C. min.$^{-1}$ for 4 h. Bimetallic Ni—Fe/$SiO_2$ was calcined at 500° C., 5° C. min.$^{-1}$ for 10 h and reduced at 700° C., 10° C. min.$^{-1}$ for 4 h; Ni—Co/$SiO_2$ was calcined at 750° C., 5° C. min.$^{-1}$ for 5 h and reduced at 700° C., 10° C. min.$^{-1}$ for 2 h; Fe—Co/$SiO_2$ was calcined at 450° C., 5° C. min.$^{-1}$ for 3 h, and reduced at 580° C., 10° C. min.$^{-1}$ for 4 h. The present work concerns monometallic Ni, Fe, Co and bimetallic Ni—Fe, Ni—Co and Fe—Co catalysts. Bimetallic catalysts were prepared by co-impregnation method with different mole ratios such as 1:1, 1:2, 2:1, 9:1, 4:1, 1:9. Catalysts are noted as xM-yN where, M, N and x, y stands for metal and mole number respectively.

Reactor apparatus. Catalytic methane decomposition was performed in a fixed-bed flow reactor (10 mm i.d. and 44.5 cm long quartz tube) at atmospheric pressure. In a typical test, 0.1 g catalyst was placed in the reactor bed and the reaction temperature was measured with a K-type thermocouple fixed at the catalyst bed. Prior to activity tests, the catalyst was subjected to a reduction at their respective temperatures and was later purged with $N_2$ for 30 min. Then the temperature was increased to the indicated temperature, e.g., typically about 650° C. to about 750° C. (10° C. min.$^{-1}$) in $N_2$ (70 mlmin.$^{-1}$) and the feed was switched to reactant gas (30% $CH_4/N_2$, 70 mlmin.$^{-1}$) and a space velocity of 42000 $h^{-1}$ was achieved here. The composition of the outlet gas was determined by online gas chromatography (Perkin ElmerARNEL, Clarus 500) equipped with a thermal conductivity detector with HayeSep N 60/80, HayeSep T 60/80, Molecular Sieve 5A 45/60, and Molecular Sieve 13×45/60 packed columns. The GC data were processed using TotalChrom Workstation software. GC was well calibrated with standard gases before analysis. Catalyst reproducibility was tested and the results were with ±5% error. After the methane decomposition reaction (1 h), the used catalysts were dried at 120° C. for 2 h and characterized. The carbon nanotube formed was deposited on the catalyst and were also characterized using several characterization techniques.

Analytical Methods. Temperature programmed reduction (TPR) was performed for the catalysts using Micromeritics AutoChem HP chemisorption analyser equipped with TCD detector. The catalysts were degassed in Heat 200° C. for 1 h. After cooling to RT, temperature was ramped to 850° C. in 10 vol % $H_2$/Ar (50 ml•min.$^{-1}$) with a linear heating rate of 10° C./min. and the TCD signal was recorded. Catalysts with carbon deposition obtained after reaction at 700° C. were characterized by X-Ray Diffraction (XRD). XRD measurements were performed on PANalytical X'pert Pro using Cu Kα radiation. The step scans were taken over the range of 10-90° and the scan rate was 5° min$^{-1}$. The morphologies and microstructures of the carbon materials were characterized by Jeol TEM-2100 transmission electron microscopy (TEM). The samples were prepared by sonication of the spent catalyst in isopropanol and the suspension was dropped onto a Cu-TEM grid for analysis. Raman experiments were performed in Renishaw Invia Raman spectrometer at ambient atmosphere and room temperature. Spectra were recorded using a green excitation line 532 nm. Thermogravimetric analysis was performed using TA_SDT-650_Discovery model instrument in 5% $O_2$/He atmosphere, from 150-700° C., at a heating rate of 2° C. min$^{-1}$.

Properties of Fresh and Spent Mono and Bimetallic Supported Metal Catalysts.

Figure 15B:
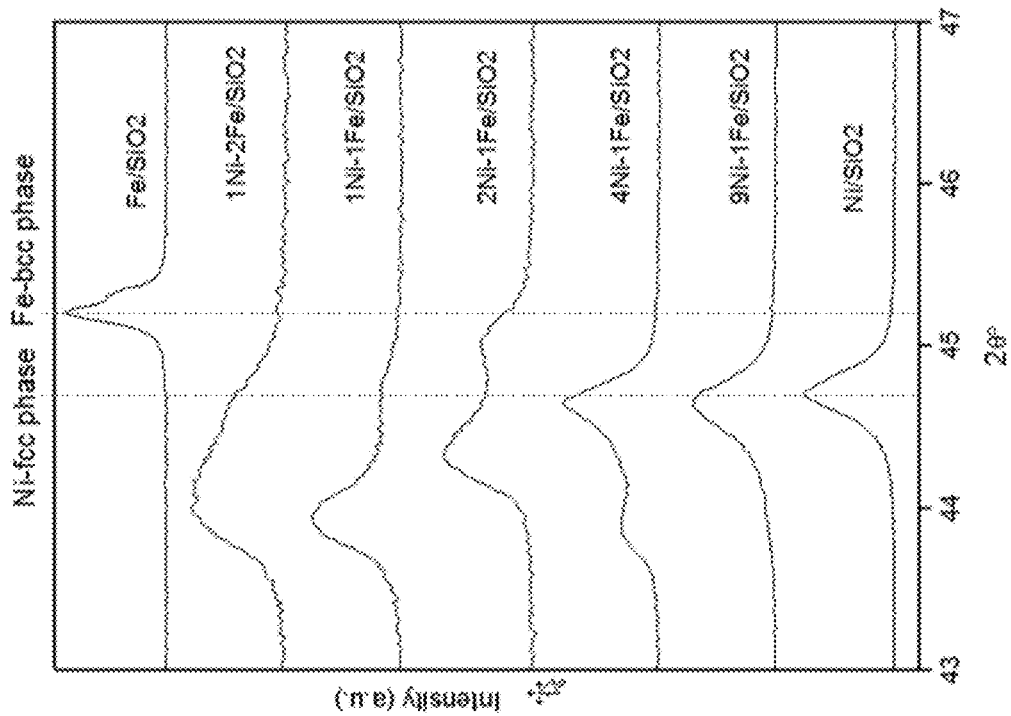
FIGS. 15A and 15B show representative x-ray diffraction data of fresh representative disclosed mono and bimetallic Ni—Fe catalysts as indicated.

Catalyst properties were investigated using XRD and TPR techniques as described herein. The characteristic peaks for all the metals (Ni, Fe and Co) were identified using the XRD analysis (FIGS. 15-21). The amorphous peak of $SiO_2$ support was not visible in the diffractogram due to high intense peaks for the metal loaded (60% metal on 40% $SiO_2$ support). The sharp peaks for metals confirmed the crystalline phase of the active element (Ni/Fe/Co) and the corresponding 2 θ values represented their metallic state. The Ni characteristic peaks were observed at 2θ°=44.6°, 52.0°, 76.6° (JCPDS No. 04-850); Fe characteristic peaks were at 2θ=45.1°, 65.5°, 82.8° (JCPDS No. 65-4899) and for Co the peaks were at 2θ°=44.4°, 51.6°, 76° (JCPDS No. 15-0806). For bimetallic Ni—Fe catalysts with different ratios, the data show a peak shifting which signified the alloy formation (FIG. 15B). The transformation from fcc to bcc phase as a function of Fe content was observed in Ni—Fe bulk alloys (L.-H. Zhu, et al., *J. Mater. Sci.,* 2001, 36, 5571-5574; J. F. Valderruten, et al., *J. Phys. Condens. Matter,* 2008, 20, 485204). For monometallic Ni catalyst (111) plane represents the fcc phase and for monometallic Fe catalyst (110) plane represents the bcc phase. In the bimetallic catalyst when the Fe is introduced to Ni rich system (9Ni-1Fe) a single set of diffraction pattern corresponding to the fcc phase of Ni—Fe alloy was observed. This peak was also found to be shifted towards a lower 2θ value, converging to the diffraction pattern of the Ni fcc phase. For 4Ni-1Fe catalysts the fcc alloy phase (111) was more dominant, with a higher intensity than bcc alloy phase (110). With further increasing the Fe content, 2Ni-1Fe and 1Ni-1Fe, the fcc alloy phase was found to shift to lower 2θ value. For 1Ni-2Fe, Ni atom was introduced to Fe lattice with a shift to a lower 2θ value, indicated the lattice expansion as a result of alloy formation in bcc phase of Ni—Fe alloy (N. Moghimi, et al., *J. Phys. Chem. C,* 2013, 117, 4852-4858). Similarly for Ni—Co bimetallic catalyst, alloy formation was confirmed using XRD analysis (FIG. 17). The fcc phase (111) of monometallic Co was observed at 2θ°=44.4°, which was slightly shifted towards higher 2θ value (Ni phase) represently the Ni—Co alloy formation. Also for the Fe—Co metallic system, alloy formation was observed where the bcc phase for Fe was shifted towards the lower 2θ values, representing the fcc phase of Co and the Fe—Co alloy formation (FIG. 19). Except 1Fe-2Co and 1Fe-9Co, all other catalysts showed only a single alloy phase. But for 1Fe-2Co and 1Fe-9Co the data show both fcc phase of Co and bcc phase of Fe. XRD analysis can confirm the formation of alloy in the bimetallic Ni/Fe/Co catalysts prepared, which thereby increases the stability of the catalyst under the reaction conditions.

Figure 16:
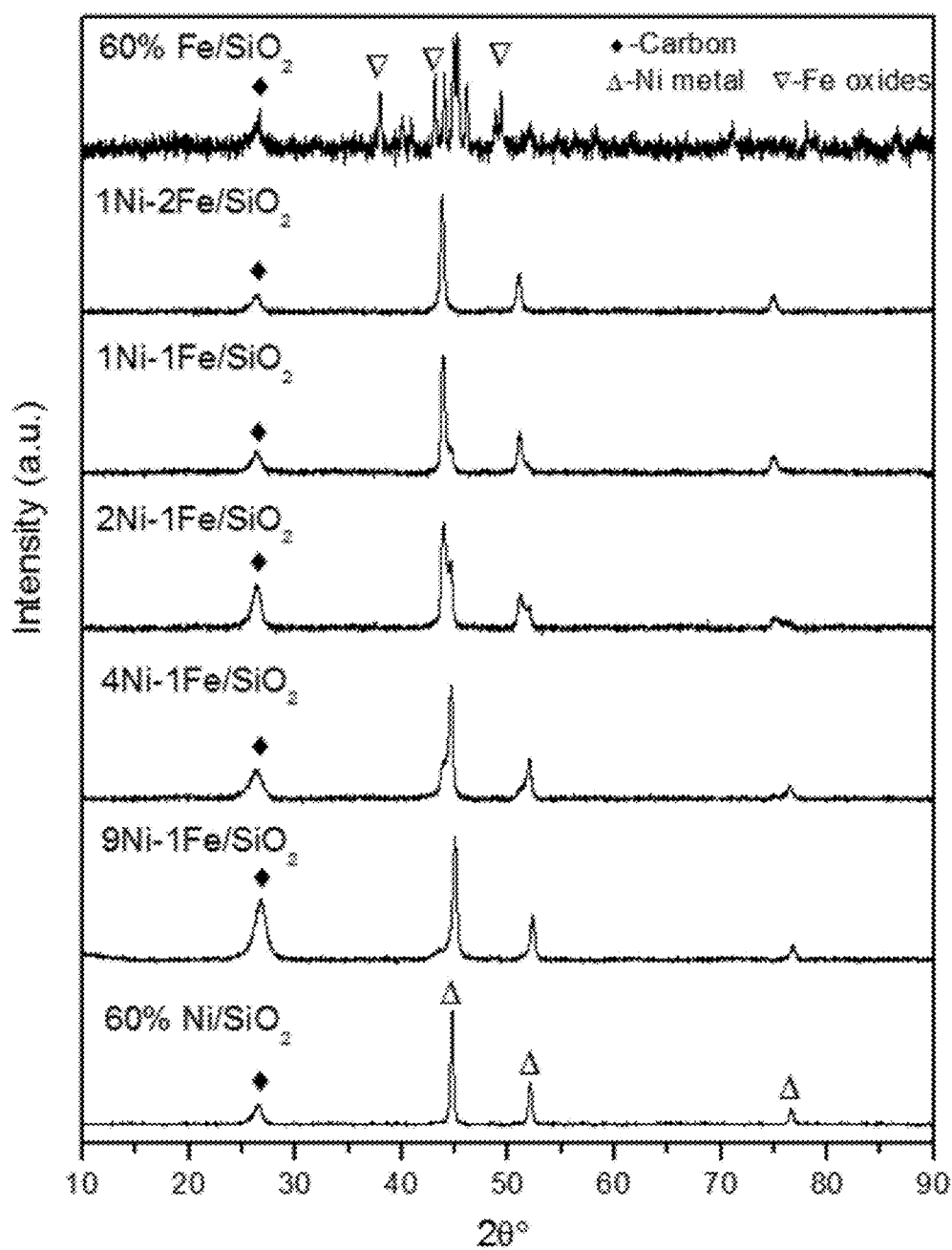
FIG. 16 shows representative x-ray diffraction data of spent representative disclosed mono and bimetallic Ni—Fe catalysts as indicated.
Figure 17B:
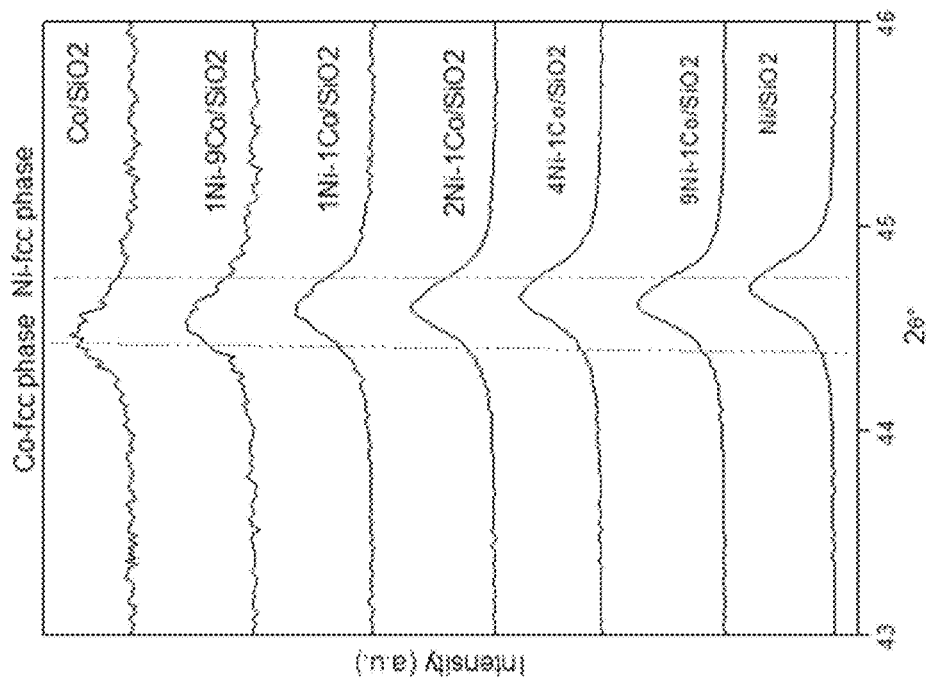
FIGS. 17A and 17B show representative x-ray diffraction data of fresh representative disclosed mono and bimetallic Ni—Co catalysts as indicated.
Figure 17A:
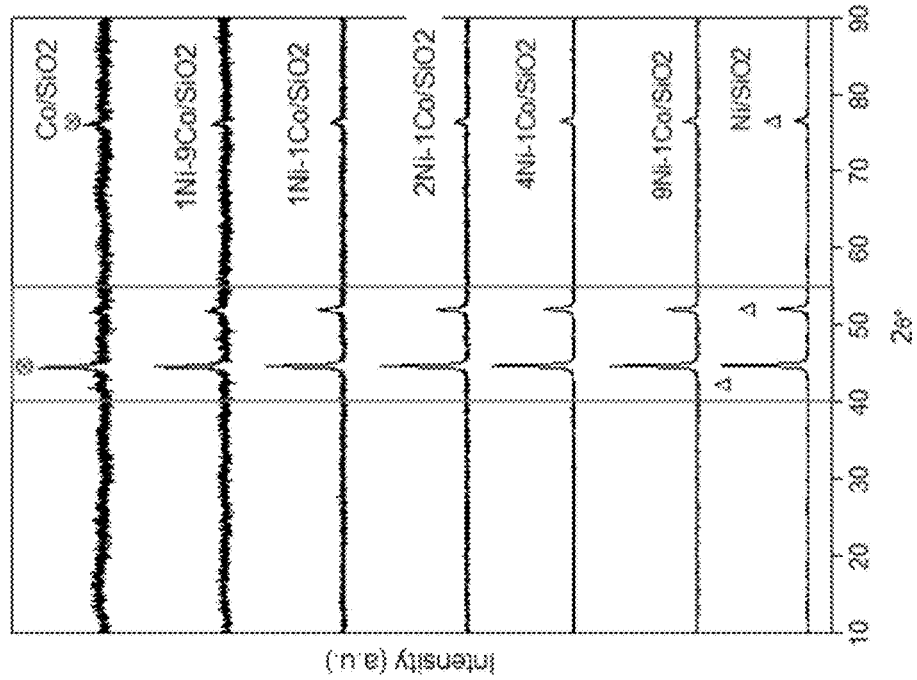
Figure 18:
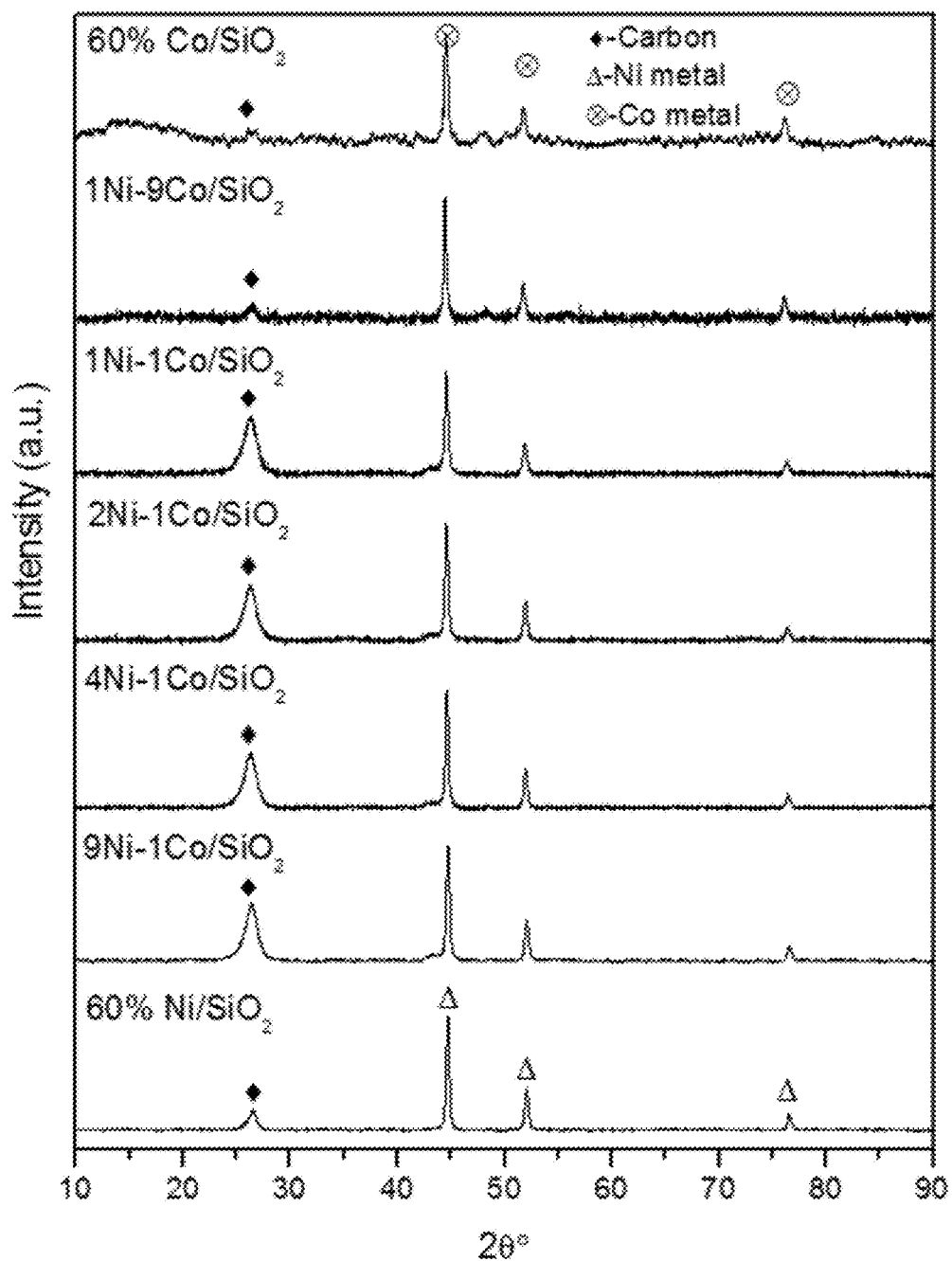
FIG. 18 shows representative x-ray diffraction data of spent representative disclosed mono and bimetallic Ni—Co catalysts as indicated.
Figure 19:
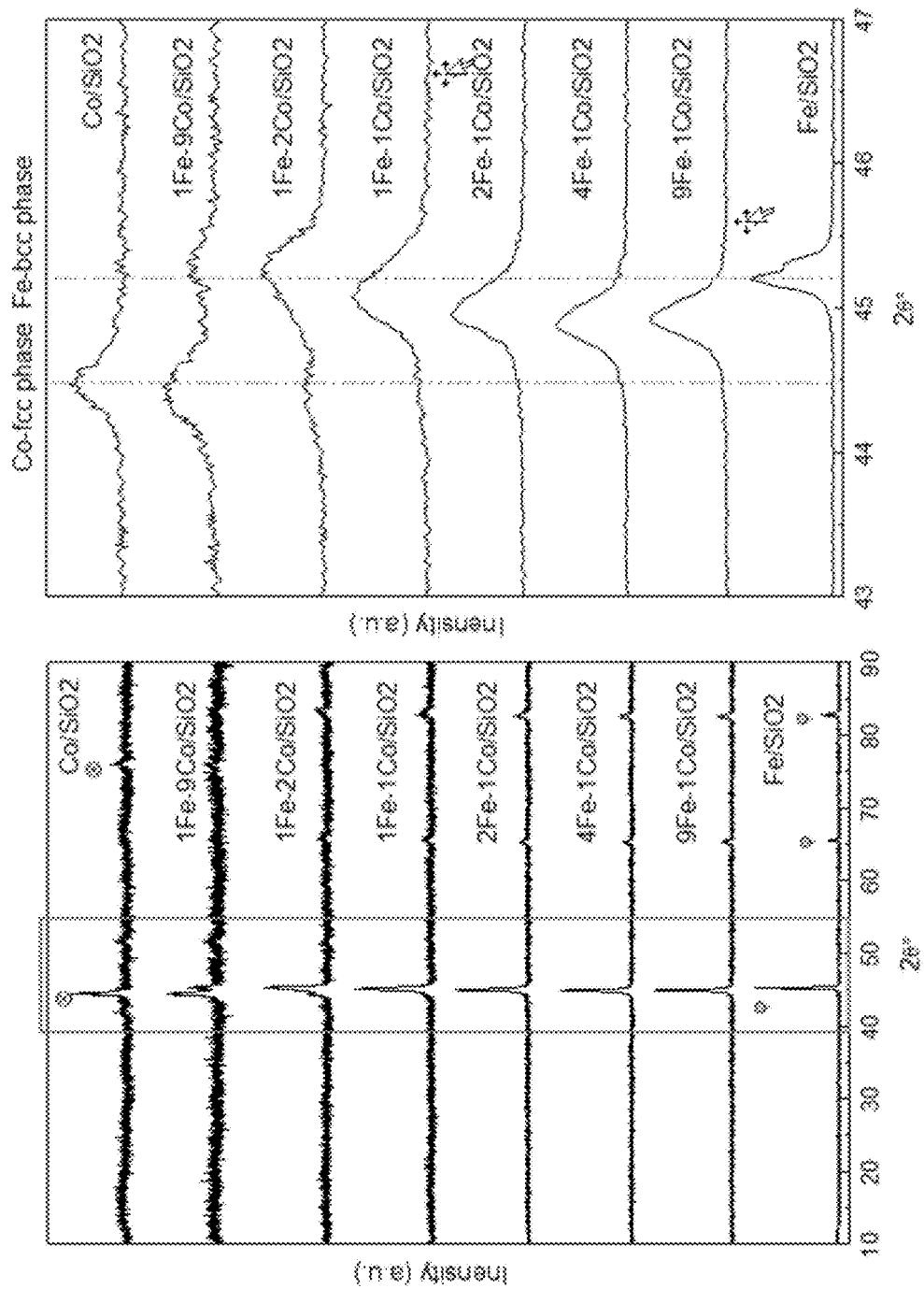
FIGS. 19A and 19B show representative x-ray diffraction data of fresh representative disclosed monometallic and bimetallic Fe—Co catalysts as indicated.
Figure 20:
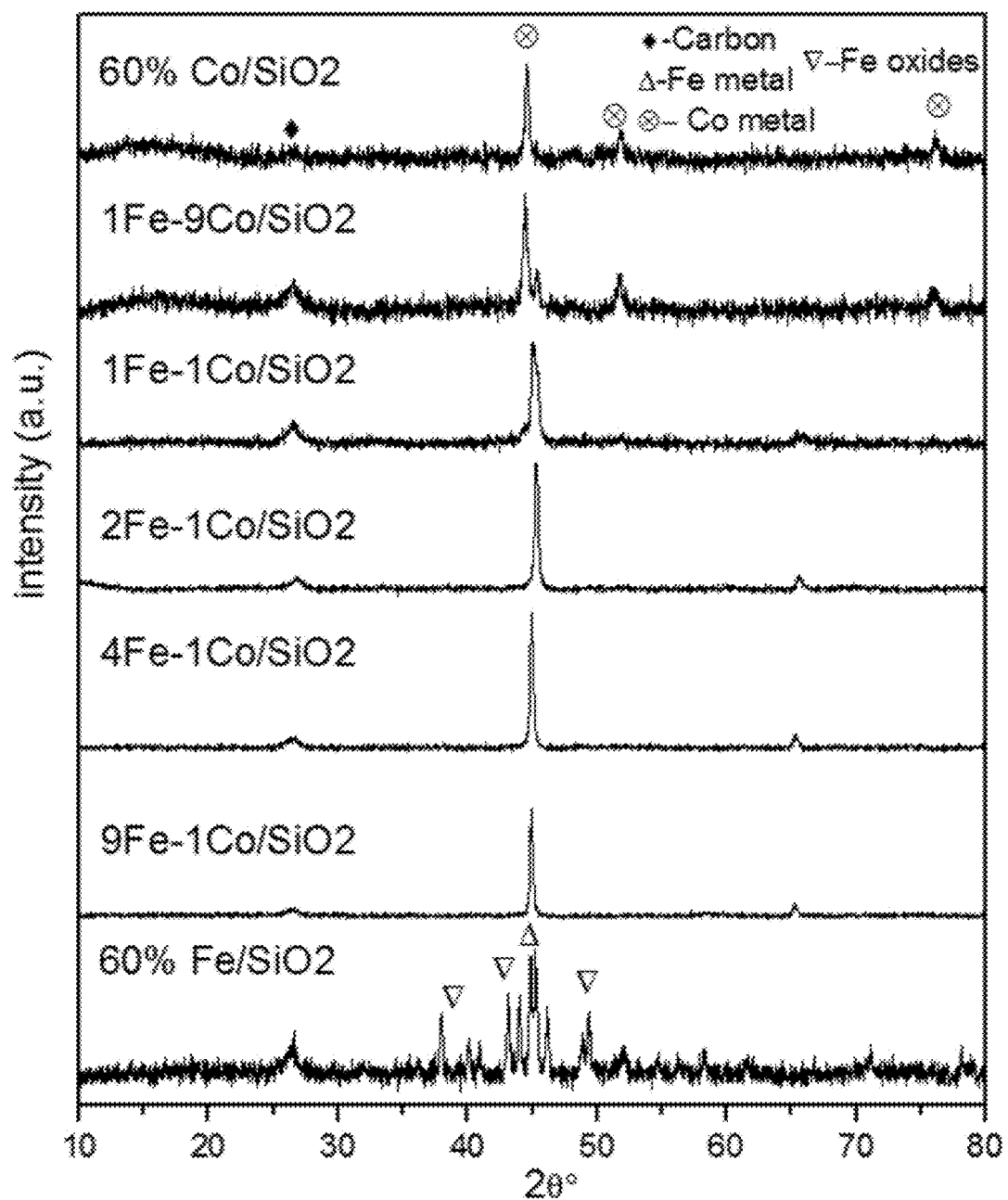
FIG. 20 shows representative x-ray diffraction data of spent representative disclosed mono and bimetallic Fe—Co catalysts as indicated.

After the reaction the used catalysts were once again characterized by XRD analysis (FIGS. 16, 18, 20). Majority of the catalyst was stable in their metallic form but monometallic Fe catalyst (FIG. 16), has undergone oxidation, which was very obvious that Fe was prone to oxidation when exposed to air. But for the bimetallic catalysts, it was observed that the alloy formation has helped to prevent the oxidation of the metals and thereby increasing its lifetime or stability. From the XRD data the average crystallite size of metal nanoparticles before and after the reaction was calculated, using the Scherrer equation (Tables 1, 2 and 3). The average crystallite size of fresh Ni catalyst was found to be 25 nm, while for fresh Fe catalyst it was 29 nm. When Ni—Fe bimetallic catalysts were prepared, the data show a significant decrease in the crystallite size, which even reduced up to 9 nm for 2Ni-1Fe catalyst. In the case of fresh Co catalyst the crystallite size was found to be 21 nm. For fresh Ni—Co bimetallic catalysts, the crystallite size was found to be in between that of Ni and Co catalysts, 22-25 nm. Also for Fe—Co catalyst, the data show a crystallite size of 17-28 nm, which is in the range of Fe and Co monometallic ones. Even after the methane decomposition, there was a very little increase in the crystallite size of spent Ni—Fe/ Ni—Co and Fe—Co catalysts. Hence there is not much agglomeration of the nanoparticles, which signifies the stable nature of the catalyst. Strangely for monometallic Fe catalyst, the crystallite size was decreased from 29 nm to 13 nm, which can be because a portion of Fe sites were getting oxidised to iron oxides when exposed to air.

Figure 21:
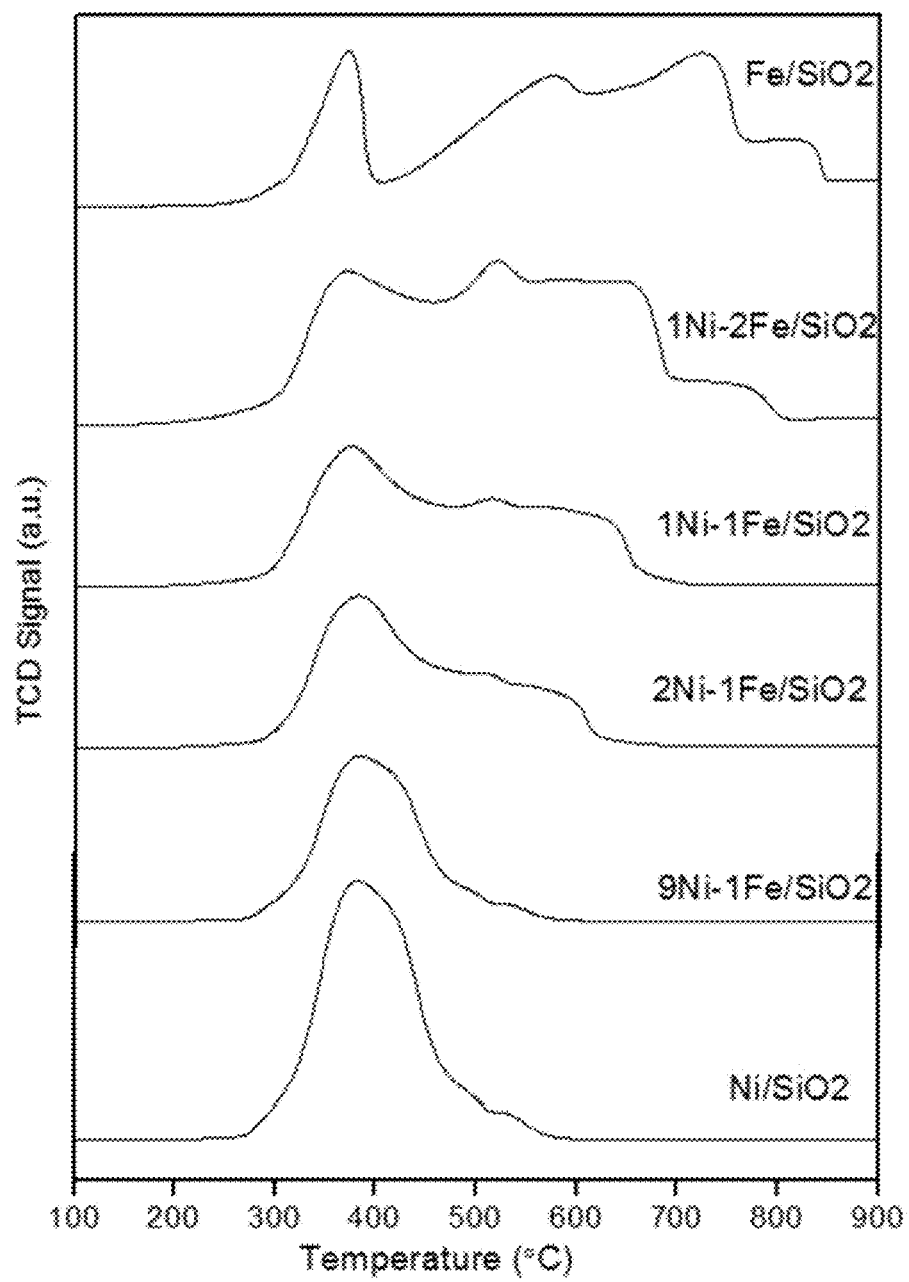
FIG. 21 shows representative data obtained from temperature-programmed reduction analysis of fresh Ni—Fe catalysts as indicated.
Figure 22:
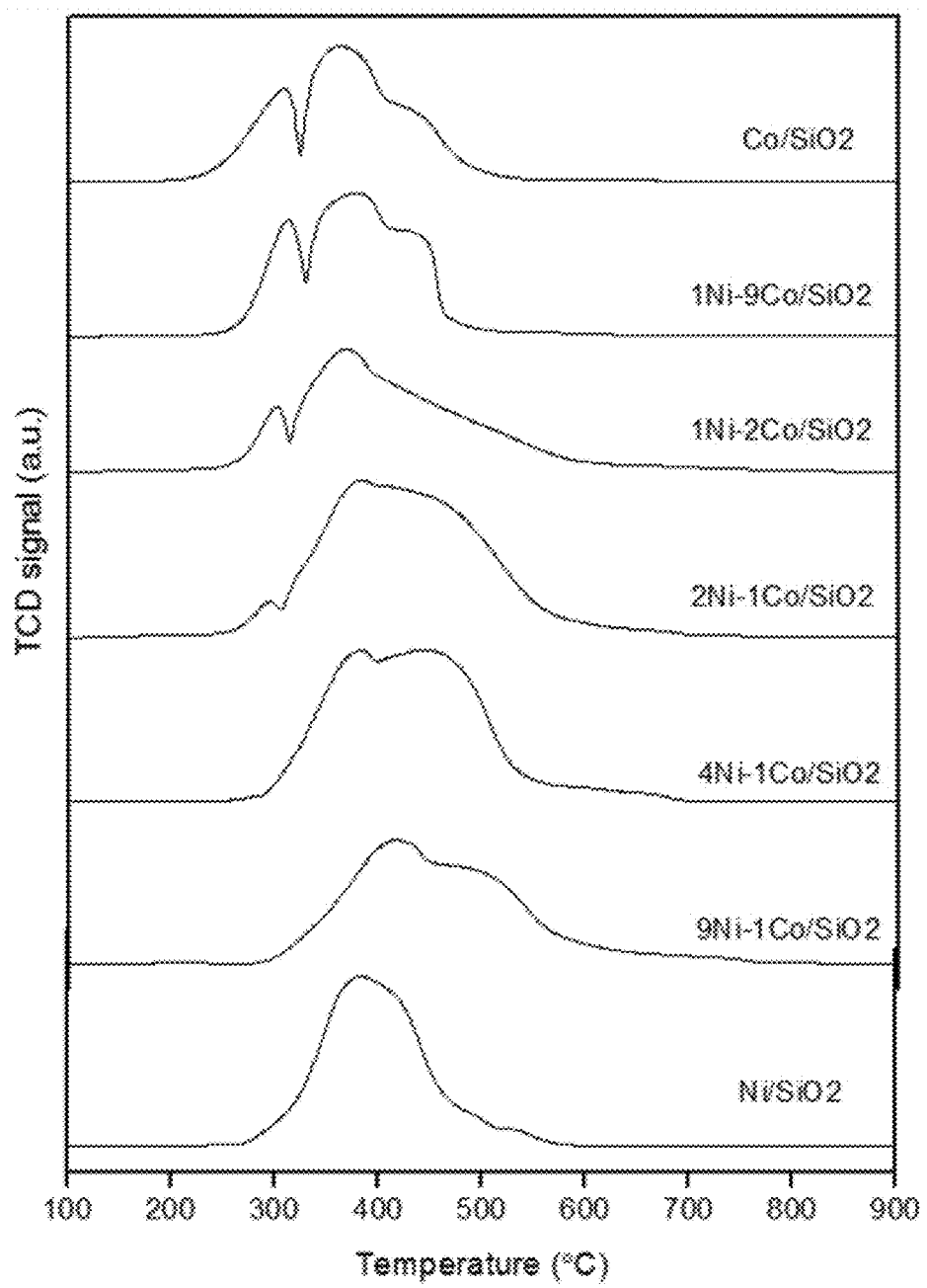
FIG. 22 shows representative data obtained from temperature-programmed reduction analysis of fresh Ni—Co catalysts as indicated.
Figure 23:
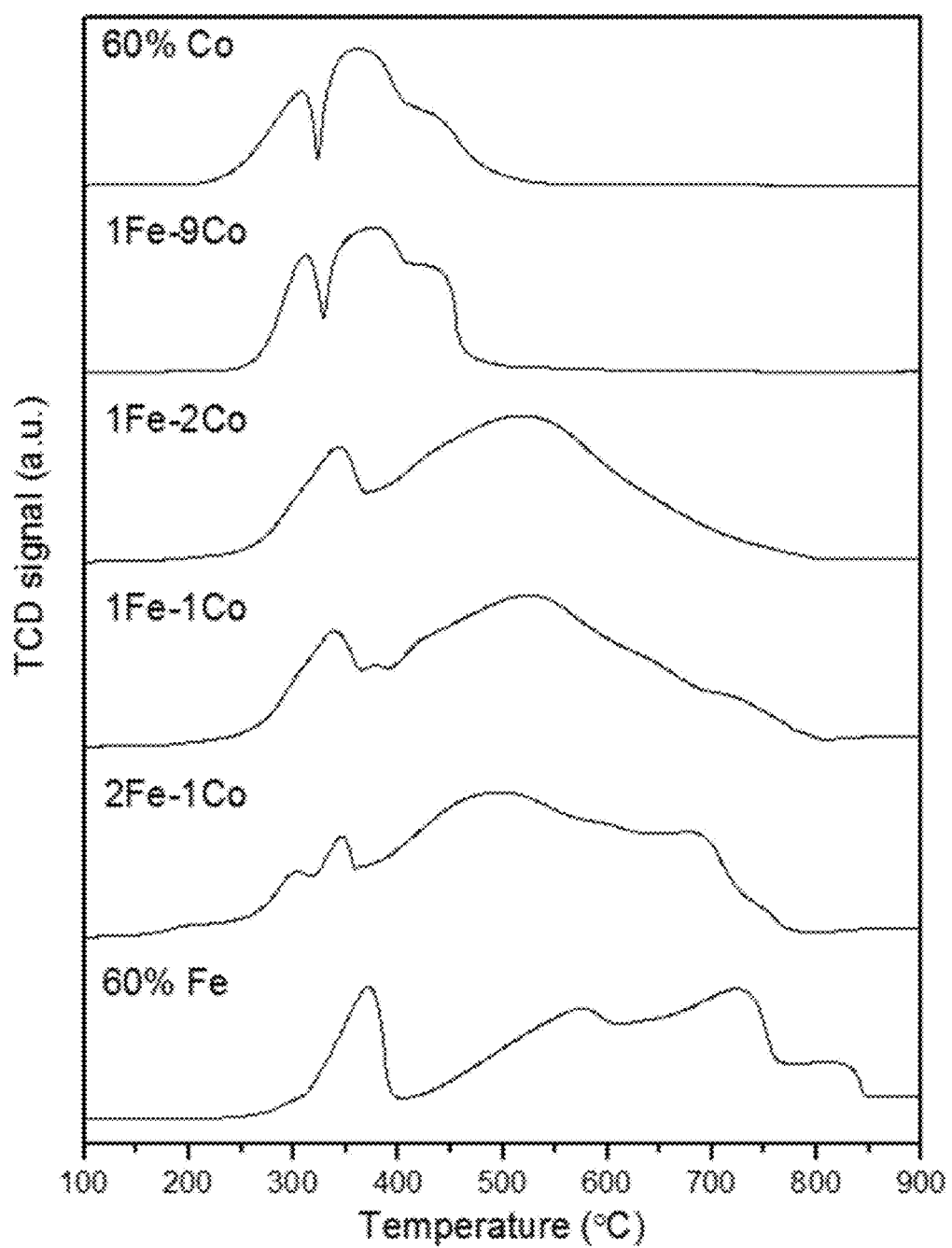
FIG. 23 shows representative data obtained from temperature-programmed reduction analysis of fresh Fe—Co catalysts as indicated.

To investigate the reducibility of the synthesized catalysts, $H_2$-TPR experiments were conducted and the results are shown in FIGS. 21-23. The TPR results also supports XRD data for the alloy formation in the bimetallic catalysts. In the monometallic Ni catalyst, two reduction peaks were observed, one at around 367° C. and other at 470° C. (FIG. 20). First peak corresponds to the reduction of bulk NiO, which was weakly interacted with the $SiO_2$ support and the second weak reduction peak was for the reduction of NiO species, which had a very strong interaction with the $SiO_2$ support (N. Wang, et al., *Int. J. Hydrogen Energy,* 2012, 37, 19-30). For monometallic Fe catalyst typical TPR profiles has three peaks at around 470, 576 and 727° C., respectively (FIG. 21). These corresponds to the three consecutive reduction steps, $\alpha\text{-}Fe_2O_3 \rightarrow Fe_3O_4 \rightarrow FeO \rightarrow Fe$ (P. Ubilla, et al., *J. Chil. Chem. Soc.,* 2010, 55, 35-38; J. Yang, et al., *J. Mol. Catal. A Chem.,* 2006, 245, 26-36). In the monometallic Co catalyst the low temperature reduction peak centered at 306° C. and the second peak at 360° C., was assigned to the two step reduction of spinel, i.e., $Co_3O_4 \rightarrow CoO \rightarrow Co$ (FIG. 23). An additional shoulder peak was also observed at around 433° C. (P. Jana, et al., *Int. J. Hydrogen Energy,* 2012, 37, 7034-7041). However, the absence of high reduction temperature peaks shows that interaction of cobalt with $SiO_2$ support was not strong. TPR studies of bimetallic Ni—Fe catalysts showed that with the increase in Ni content the high temperature reduction peaks of Fe was shifted towards the reduction temperature of Ni species (FIG. 21). For Fe—Co catalysts showed the increase in Co content lowered the reduction temperature of the catalyst or Co facilitates the reduction of Fe (FIG. 23). When Fe was present in high concentrations, the catalyst exhibits the properties of Fe. Hence an increase in the Co reduction temperature was observed (D. J. Duvenhage and N. J. Coville, *Appl. Catal. A Gen.,* 1997, 153, 43-67; R. J. Kaleńczuk, *Catal. Letters,* 1995, 33, 255-268). TPR profiles of Ni—Co catalysts (FIG. 22) indicated that $Co_3O_4$ was easier to reduce than NiO, while increase in Ni content retards the reduction of $Co_3O_4$. Hence the incorporation of Co should improve the reducibility of NiO.

Figure 1:
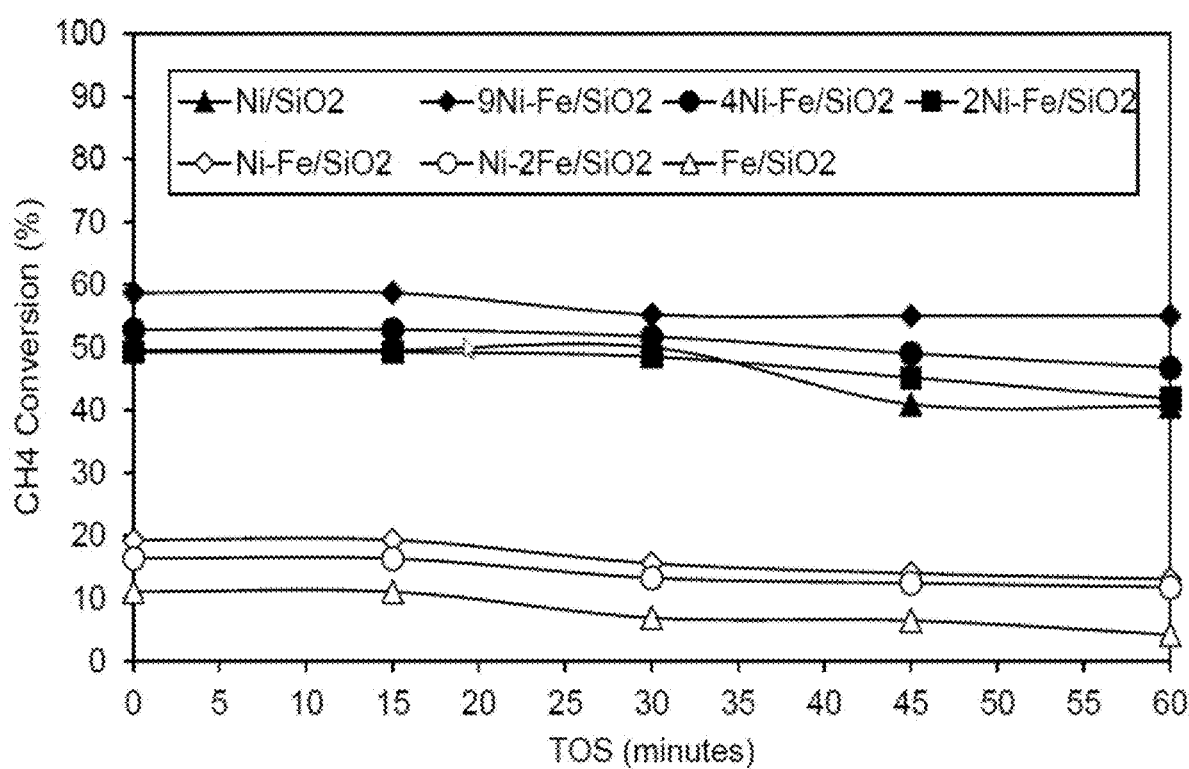
FIG. 1 shows representative data for methane decomposition over representative disclosed Ni—Fe/SiO$_2$ catalysts with various mole ratios carried out as described in the examples under conditions of T=650° C., TOS=0-60 minutes, GHSV=42000 h$^{-1}$.
Figure 32:
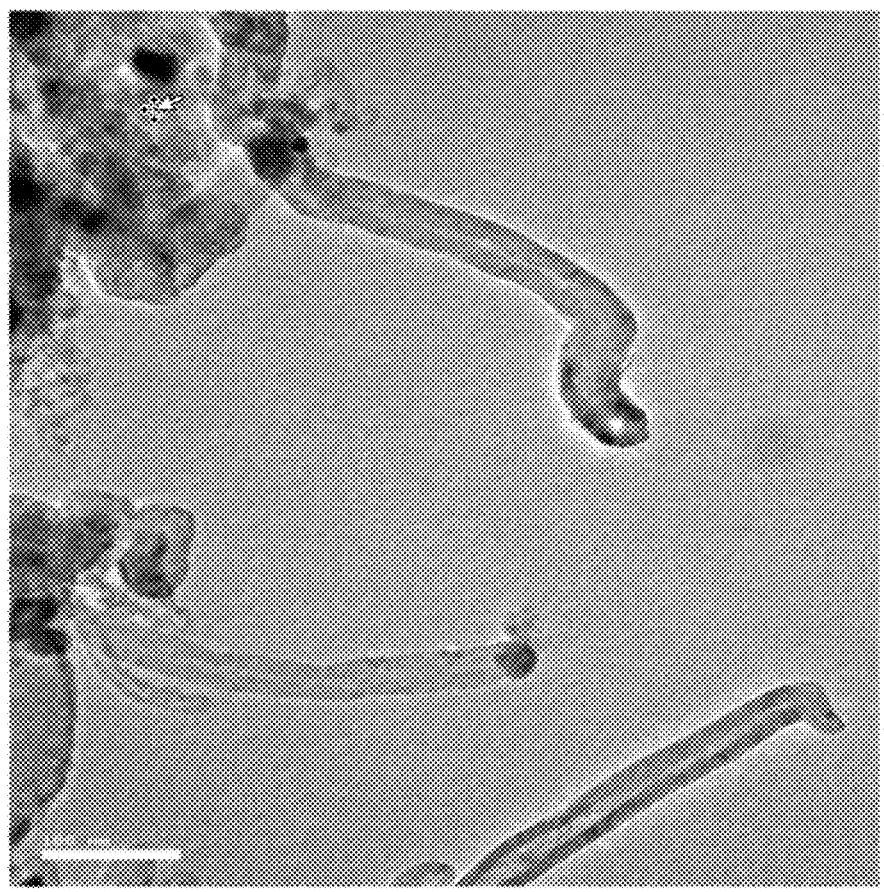
FIG. 32 shows a representative image of tip and base grown carbon nanotubes over a representative disclosed 1Fe-2Co/$SiO_2$ catalyst carried out as described in the examples under conditions of T=650° C., P=1 bar, TOS=60 minutes, GHSV=42000 $h^{-1}$. A scale bar is indicated in the figure.
Figure 33A:
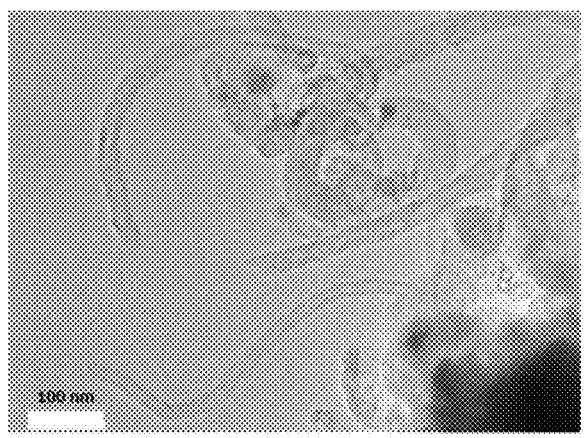
FIGS. 33A and 33B show representative images of carbon nanotubes over a representative disclosed Fe/$Al_2O_3$ catalyst (60 wt % Fe/40 wt % $Al_2O_3$) carried out as described in the examples under conditions of T=650° C., P=1 bar, TOS=0-60 minutes, GHSV=42000 $h^{-1}$. A scale bar is indicated in the figure.
Figure 33B:
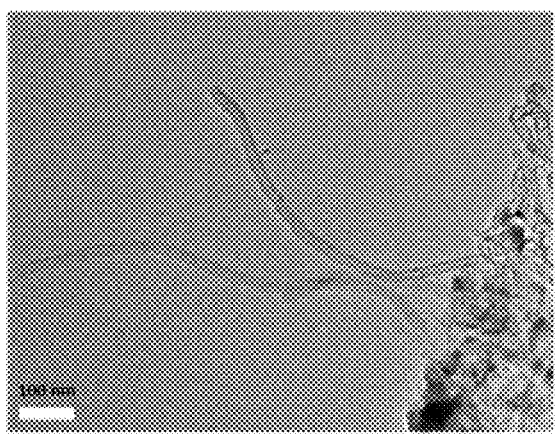
Figure 34:
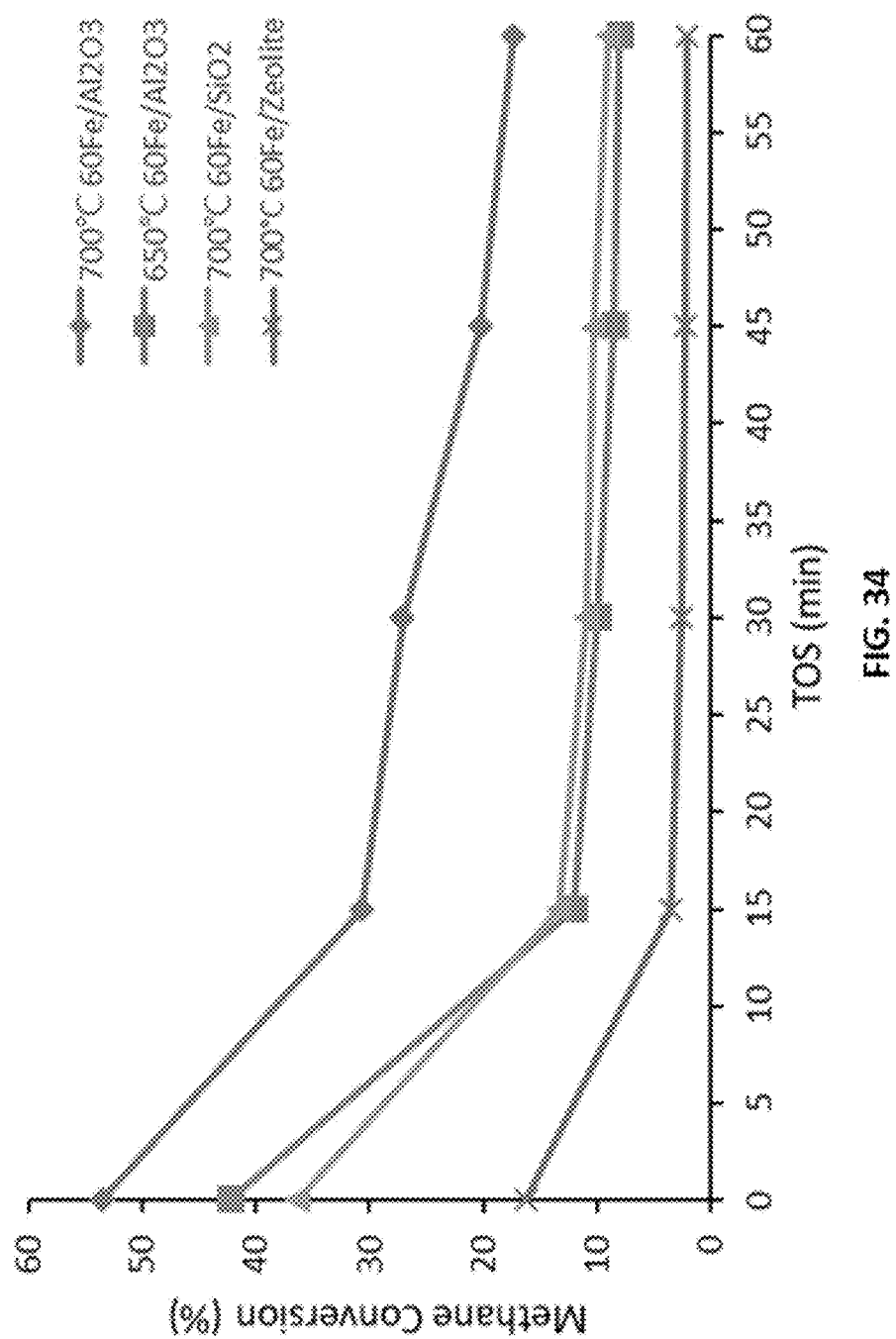
FIG. 34 shows representative data for efficiency of methane conversion for the indicated representative catalyst/support samples. "700° C. 60Fe/AL2O3" indicates that the catalyst/support system was 60 wt % Fe/40 wt % $Al_2O_3$ with the decomposition of methane carried out in the examples under conditions of T=700° C., P=1 bar, TOS=0-60 minutes, GHSV=42000 $h^{-1}$. "650° C. 60Fe/AL2O3" indicates that the catalyst/support system was 60 wt % Fe/40 wt % $Al_2O_3$ with the decomposition of methane carried out as described in the examples under conditions of T=650° C., P=1 bar, TOS=0-60 minutes, GHSV=42000 $h^{-1}$. "700° C. 60Fe/SiO2" indicates that the catalyst/support system was 60 wt % Fe/40 wt % $SiO_2$ with the decomposition of methane carried out as described in the examples under conditions of T=700° C., P=1 bar, TOS=0-60 minutes, GHSV=42000 $h^{-1}$. "700° C. 60Fe/Zeolite" indicates that the catalyst/support system was 60 wt % Fe/40 wt % zeolite with the decomposition of methane carried out as described in the examples under conditions of T=700° C., P=1 bar, TOS=0-60 minutes, GHSV=42000 $h^{-1}$.

Effect of catalyst composition on the methane decomposition and monometallic catalysts. Studies were performed using monometallic catalysts prepared as described herein. The data showed that even though Ni/$SiO_2$ showed a high $CH_4$ conversion of 50%, it started deactivating and reached a conversion of 40% in 60 min. of reaction (FIG. 1). Similarly monometallic Fe/$SiO_2$ was tested, which showed a very low initial activity of 11% and gradually deactivated to 4% $CH_4$ conversion. Monometallic Ni/$SiO_2$ was a very active catalyst, however, deactivation occurs relatively rapidly very fast. The effect of different support materials on the performance of the monometallic catalysts was test. The efficiency of hydrogen production from Fe-based catalysts on silica ($SiO_2$), alumina ($Al_2O_3$) and a zeolite is shown in FIG. 34 (60 wt % Fe and 40 wt % of the indicated support material). The data show that the support material has a significant effect on the efficiency of hydrogen production, with the most efficient hydrogen production found in the presence of a Fe/$Al_2O_3$ composition. It was also determined that the efficiency of base grown carbon nanotubes could be modified by the type of support material, e.g., base grown carbon nanotubes occurred most efficiently using disclosed monometallic catalyst compositions compared to disclosed bimetallic catalyst compositions. Among the disclosed monometallic catalyst compositions, it was determined that a $Fe/Al_2O_3$ composition provided higher quality base grown carbon nanotubes that a $Fe/SiO_2$ composition. Representative images of carbon nanotubes formed using the $Fe/Al_2O_3$ composition are shown in FIGS. 32A-32B.

Figure 24:
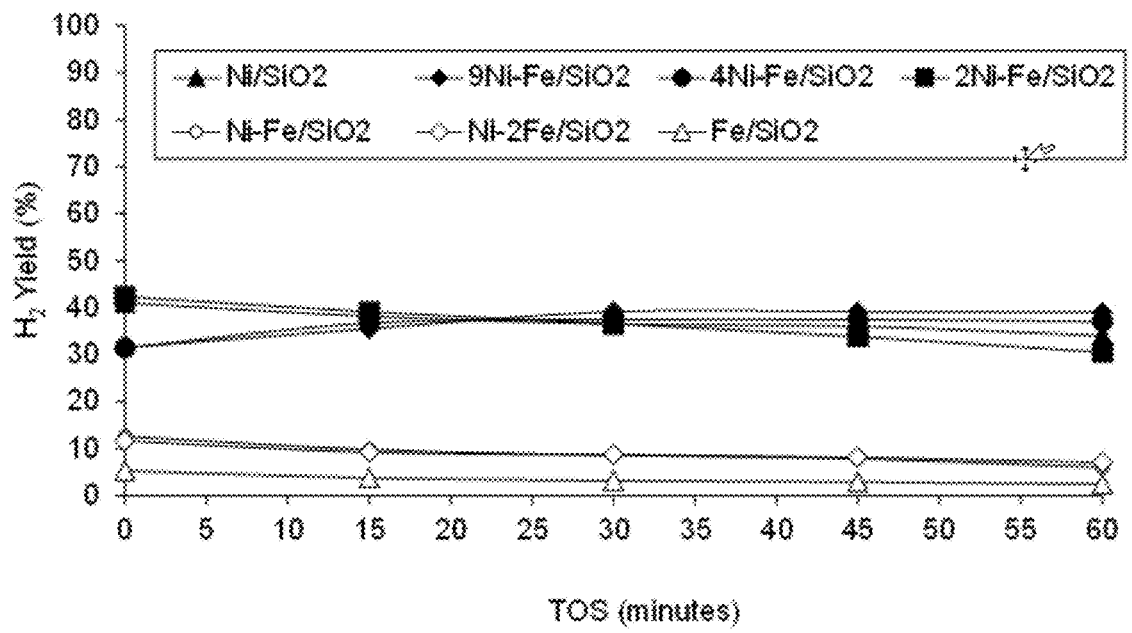
FIG. 24 shows representative data for $H_2$ yield over representative disclosed Ni—Fe/$SiO_2$ catalysts with various mole ratios (as indicated) carried out as described in the examples under conditions of T=650° C., TOS=0-60 minutes, GHSV=42000 $h^{-1}$.
Figure 25:
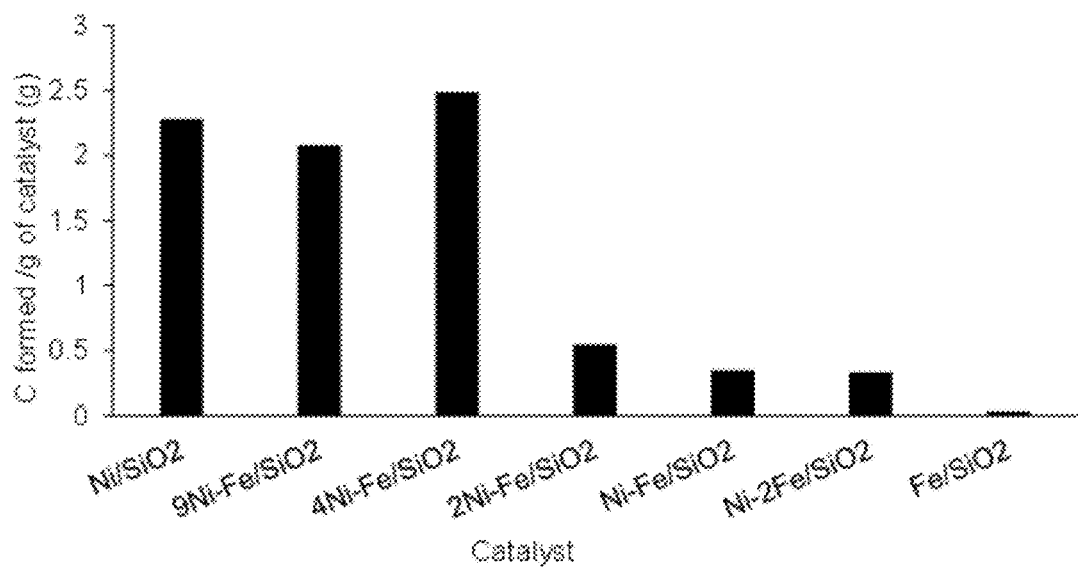
FIG. 25 shows representative data for the amount of carbon formed over representative disclosed Ni—Fe/$SiO_2$ catalysts with various mole ratios (as indicated) carried out as described in the examples under conditions of T=650° C., TOS=0-60 minutes, GHSV=42000 $h^{-1}$.

Effect of catalyst composition on the methane decomposition and carbon nanotube growth—Ni—Fe bimetallic catalysts. Hence the effect of Fe promoter addition on the activity of the $Ni/SiO_2$ catalyst for methane decomposition reaction has been depicted. Several Ni—Fe mole ratios (9:1, 4:1, 2:1, 1:1, 1:2) were studied. $4Ni-1Fe/SiO_2$, $2Ni-1Fe/SiO_2$ exhibited a similar activity (~50% $CH_4$ conversion) to monometallic $Ni/SiO_2$ catalyst at TOS=30 min., but afterwards it was observed that $4Ni-1Fe/SiO_2$ catalyst retained its activity even after TOS=60 min., while $2Ni-1Fe/SiO_2$ deactivated like $Ni/SiO_2$ catalyst. Reactions were also performed with $1Ni-1Fe/SiO_2$ and $1Ni-2Fe/SiO_2$, showed a very low $CH_4$ conversion (16-20%) compared to the above catalysts, but they had maintained the activity throughout the reaction time. So it was concluded that high Ni content in the Ni—Fe bimetallic catalyst exhibits higher conversion, while helps to increase the stability or the lifetime of the catalyst. So $9Ni-1Fe/SiO_2$ was prepared, which showed an excellent rate of conversion of 60%, highest among all the Ni and Fe catalysts studied here and its activity was very stable even at 60 min. of reaction. $H_2$ yield was found to be in the range of 30-40% for catalysts with higher Ni content such as $9Ni-1Fe/SiO_2$, $4Ni-1Fe/SiO_2$, $2Ni-1Fe/SiO_2$, while the rest of the catalysts showed only 5-12% of $H_2$ yield (FIG. 24). Amount of carbon formed per gram of catalyst was calculated, which was found to be approximately 2.3-2.5 g over $9Ni-1Fe/SiO_2$, $4Ni-1Fe/SiO_2$, $2Ni-1Fe/SiO_2$ and was less than 0.4 g for the rest of the catalyst (FIG. 25).

Figure 2:
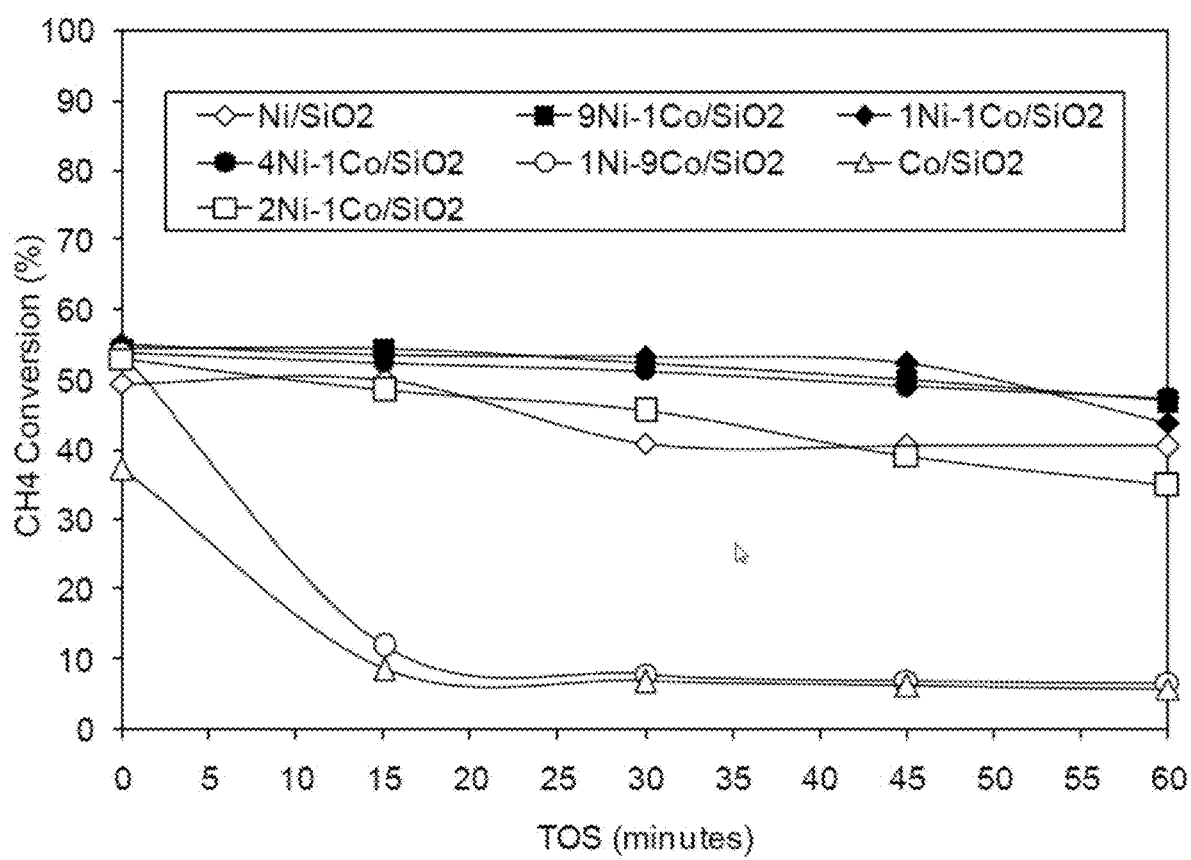
FIG. 2 shows representative data for methane decomposition over representative disclosed Ni—Co/SiO$_2$ catalysts with various mole ratios carried out as described in the examples under conditions of T=650° C., TOS=0-60 minutes, GHSV=42000 h$^{-1}$.

Effect of catalyst composition on the methane decomposition and carbon nanotube growth—Ni—Co bimetallic catalysts. Methane conversion over mono and bimetallic Ni and Co catalysts are studied in this section. Under the reaction conditions $Co/SiO_2$ showed a $CH_4$ conversion of 37%, but deactivated to 9% within 5 min. of reaction (FIG. 2). Ni/SiO2 already showed good initial activity, but had a gradual deactivation during the course of the reaction. Hence to improve the activity of $Co/SiO_2$ to increase the stability of $Ni/SiO_2$ catalysts, disclosed herein are bimetallic combination Ni—Co catalysts with various Ni:Co mole ratios, such as 9Ni-1Co, 4Ni-1Co, 2Ni-1Co, 1Ni-1Co, 2Ni-1Co, 1Ni-9Co on $SiO_2$ support. Similar to Ni—Fe catalysts, Ni—Co combination also showed a maximum conversion of 55%. Ni—Co catalysts such as 9Ni-1Co, 4Ni-1Co, 2Ni-1Co, and 1Ni-1Co showed a similar initial conversion of 50-55% and retained its activity throughout the reaction. A catalyst with higher Co content was also tested, 1Ni-9Co, which showed an initial conversion of 53%, but within 15 minutes of reaction. It was observed that high Ni content in the Ni—Co bimetallic catalyst exhibited higher conversion and the presence of Co as a promotor contributed to increase the catalyst lifetime.

Figure 26:
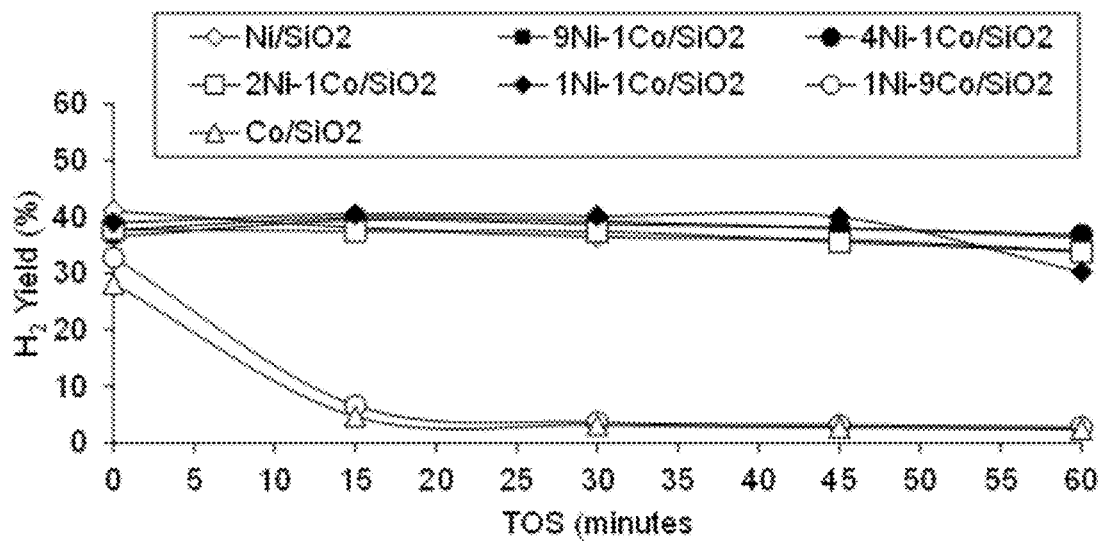
FIG. 26 shows representative data for $H_2$ yield over representative disclosed Ni—Co/$SiO_2$ catalysts with various mole ratios (as indicated) carried out as described in the examples under conditions of T=650° C., TOS=0-60 minutes, GHSV=42000 $h^{-1}$.
Figure 27:
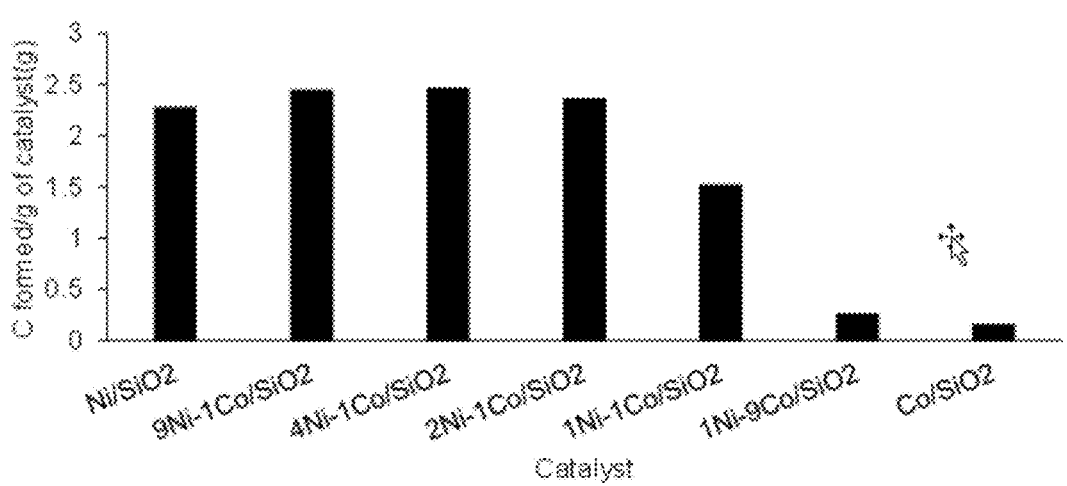
FIG. 27 shows representative data for the amount of carbon formed over representative disclosed Ni—Co/$SiO_2$ catalysts with various mole ratios (as indicated) carried out as described in the examples under conditions of T=650° C., TOS=0-60 minutes, GHSV=42000 $h^{-1}$.

$H_2$ yield was found to be in the range of 38-40% for catalysts with higher Ni content such as $9Ni-1Co/SiO_2$, $4Ni-1Co/SiO_2$, $2Ni-1Co/SiO_2$. While the $Co/SiO_2$ and $1Ni-9Co/SiO_2$ showed only an initial $H_2$ yield of 28-33% which reduced to 6% within 5 min. of reaction (FIG. 26). Amount of carbon formed per gram of catalyst was calculated, which was found to be approximately 2.3-2.5 g over $9Ni-1Co/SiO_2$, $4Ni-1Co/SiO_2$, $2Ni-1Fe/SiO_2$ and was 0.15-0.27 g for $Co/SiO_2$ and $1Ni-9Co/SiO_2$ catalysts. (FIG. 27).

Figure 3:
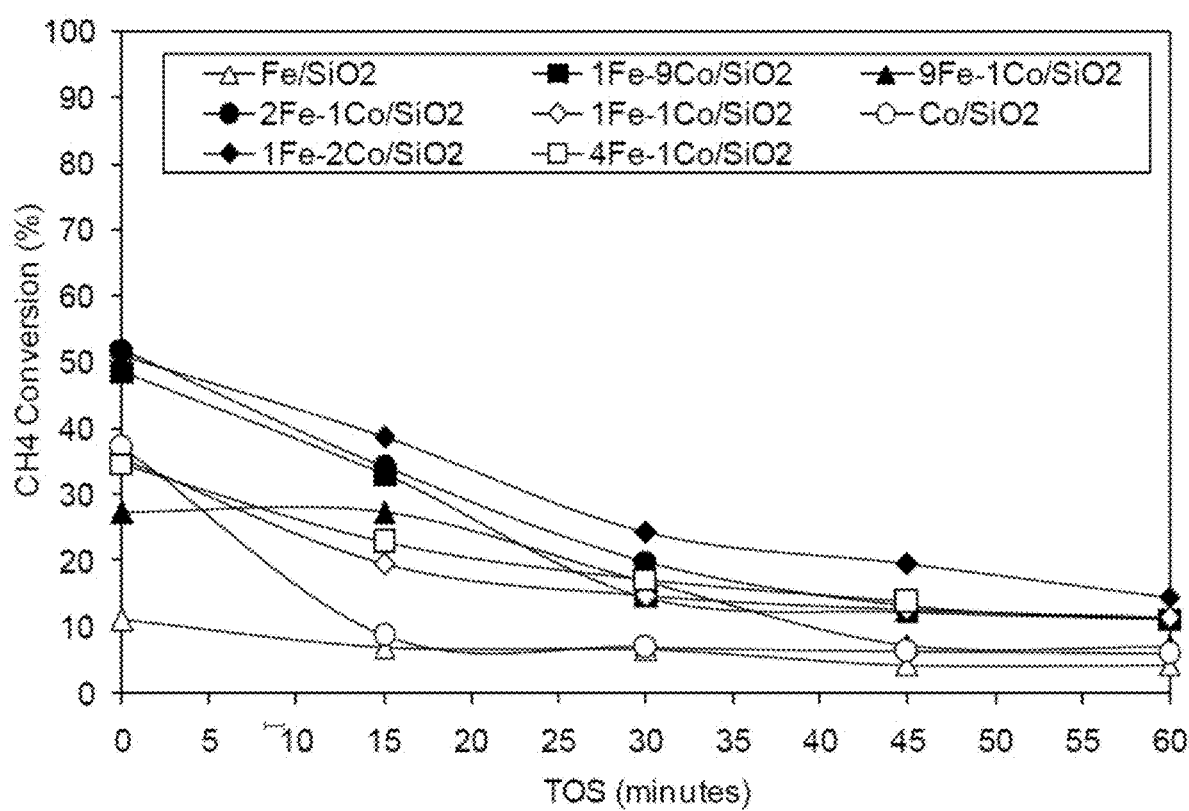
FIG. 3 shows representative data for methane decomposition over representative disclosed Fe—Co/SiO$_2$ catalysts with various mole ratios carried out as described in the examples under conditions of T=650° C., TOS=0-60 minutes, GHSV=42000 h$^{-1}$.
Figure 28:
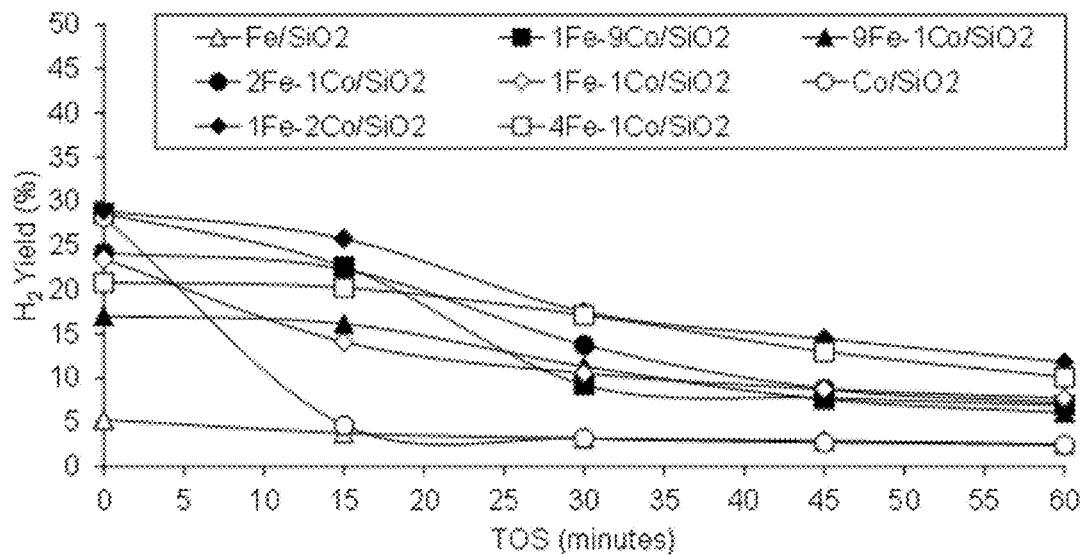
FIG. 28 shows representative data for $H_2$ yield over representative disclosed Fe—Co/$SiO_2$ catalysts with various mole ratios (as indicated) carried out as described in the examples under conditions of T=650° C., P=1 bar, TOS=0-60 minutes, GHSV=42000 $h^{-1}$.
Figure 29:
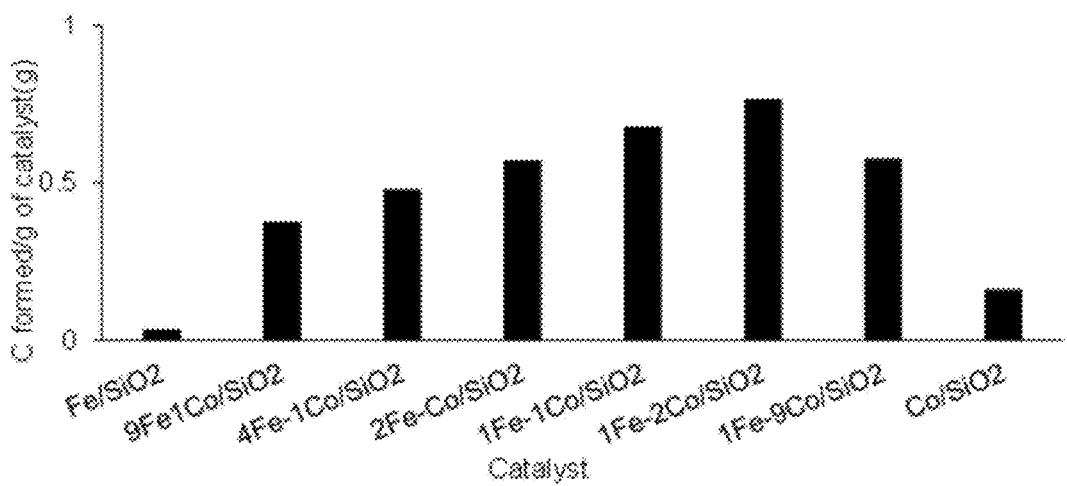
FIG. 29 shows representative data for the amount of carbon formed over representative disclosed Fe—Co/$SiO_2$ catalysts with various mole ratios (as indicated) carried out as described in the examples under conditions of T=650° C., P=1 bar, TOS=0-60 minutes, GHSV=42000 $h^{-1}$.

Effect of catalyst composition on the methane decomposition and carbon nanotube growth—Fe—Co bimetallic catalysts. Methane decomposition reactions over mono and bimetallic Fe—Co catalysts are explained in this section (FIG. 3). Bimetallic $Fe—Co/SiO_2$ catalysts were prepared with various Fe:Co mole ratios such as, 9Fe-1Co, 2Fe-1Co, 1Fe-1Co, 1Fe-2Co, 1Fe-9Co over $SiO_2$ support. It was observed that $1Fe-2Co/SiO_2$ showed highest $CH_4$ conversion of 51%, but has undergone drastic deactivation and showed a conversion of only 15% at 60 min. reaction. Among the catalysts studied here even though the activity is not excellent, stability was better over $9Fe-1Co/SiO_2$ and $4Fe-1Co/SiO_2$. Maximum $H_2$ yield of 29% (FIG. 28, supporting information) and carbon yield of 0.8 g was observed with $1Fe-2Co/SiO_2$ (FIG. 29).

Figure 30:
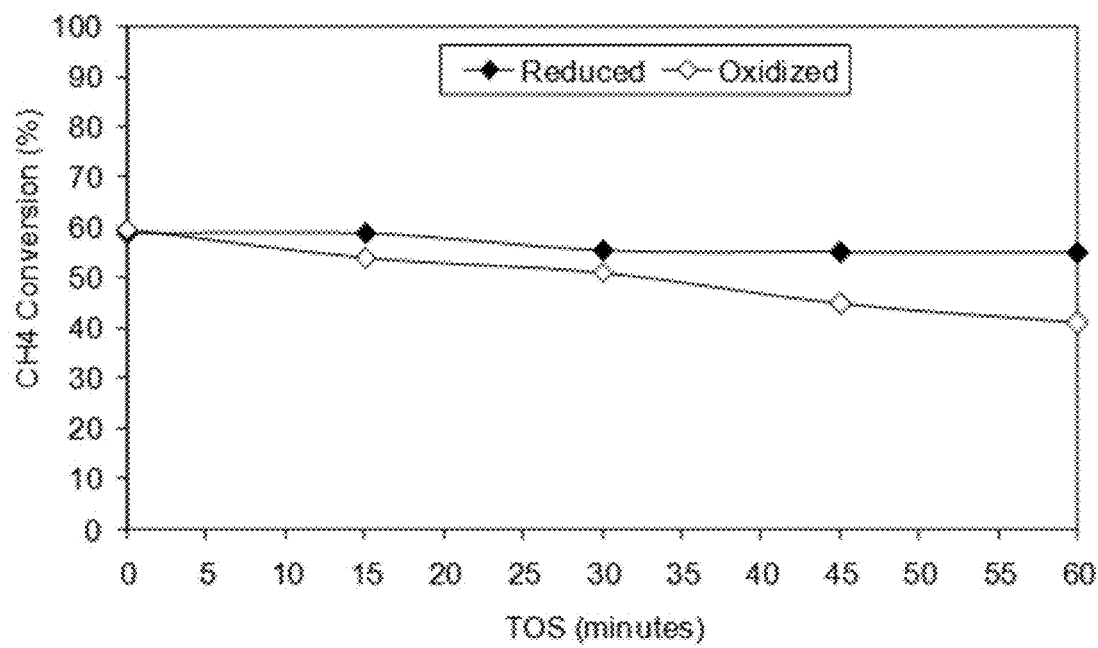
FIG. 30 shows representative data for methane decomposition over reduced and oxidised forms of a representative disclosed 9Ni-1Fe/$SiO_2$ catalyst carried out as described in the examples under conditions of T=650° C., TOS=0-60 minutes, GHSV=42000 h−1.

Comparison of activities of reduced and oxidised catalysts. Generally transition metal catalysts (Ni/Fe/Co) were used in their reduced forms ($Ni^0/Fe^0/Co^0$) for the carbon nanotube synthesis by methane decomposition. However there are some literature reports, where they have shown that it may not be necessary to pre-reduce the catalysts for the reaction (W. Qian, et al., *Appl. Catal. A Gen.*, 2004, 258, 121-124). In the studies disclosed herein, oxidised and reduced forms of $9Ni-1Fe/SiO_2$ catalyst have been used since it has shown a very good activity for methane decomposition reactions (FIG. 30). Both the catalyst showed a similar activity at initial point of the reaction (ca. 60%). The activity shown by the oxidised catalyst can be due to the in-situ reduction of the lattice oxygen which supplied energy for methane decomposition, which is an endothermic process. In addition to that there can be an in-situ consumption of $H_2$ formed, which assisted the shifting of the equilibrium towards methane decomposition step or carbon formation (W. Qian, et al., *Appl. Catal. A Gen.*, 2004, 258, 121-124). As shown in FIG. 1, the activity of reduced $9Ni-1Fe/SiO_2$ catalyst showed a constant activity till the end of the reaction but the oxidised form of the catalyst was gradually getting deactivated from 60% to 41% conversion rate in 60 min. of reaction time. The amount of carbon formed per gram of catalyst was also in the range of 2.2-2.5 g for both the catalysts. Hence in summary in our case even though oxidised form of the catalyst catalysed the methane decomposition to carbon and $H_2$, the stability of the catalysts was lesser compared to their reduced forms. This may be because reduced forms are stabilised due to their alloy phases, which helps to increase their lifetime and stability.

Figure 15A:
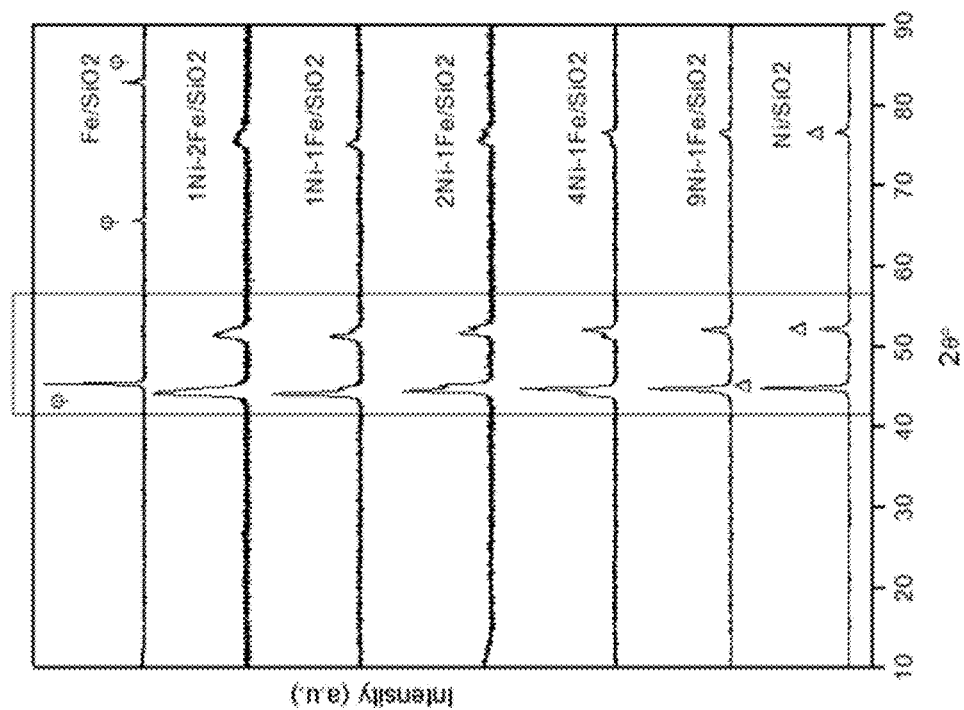

Properties of carbon nanotubes—XRD Analysis. All the XRD patterns of the used catalysts showed the presence of graphitic carbon by a very intense peak (002) at $2\theta=26.2°$ (FIGS. 15, 17, and 19). All characteristic metal and alloy peaks were also identified, there was no apparent evidence of any metal carbide formation in these catalysts. From XRD pattern it is difficult to differentiate the microstructural features between carbon nanotube and similar graphitic structures, since their characteristic peaks are overlapped (W. Z. Zhu, et al., *Mater. Chem. Phys.*, 2003, 82, 638-647). Furthermore, the d-spacing of carbon nanotubes were calculated using Bragg's equation ($d=\lambda/2 \sin \theta$) for the graphitic peak, which was found to be 0.34 nm and it correlates well with distance of two graphite layers (0.3354 nm) implying the high crystallinity of the carbon grown over all the catalysts. The intensity of the (002) diffraction peak is related to the degree of graphtization (FIG. 4). So lower intensity represents the less graphitized material (C.-M. Chen, et al., *Carbon N. Y.*, 2006, 44, 1808-1820). In the case of Ni—Fe bimetallic catalysts, the data show that 9Ni-1Fe/SiO$_2$ or the bimetallic catalyst with highest Ni content produced carbon nanotube with the highest degree of graphitization and its degree decreases with increase in amount of Fe in the catalyst.

The degree of graphitization for Ni—Fe catalyst was in the order 9Ni-1Fe>Ni>4Ni-1Fe>2Ni-1Fe>1Ni-2Fe>Fe. For Ni—Co bimetallic catalyst, 4Ni-1Co/SiO2 produced carbon nanotube with highest graphitization degree and was in the order 4Ni-1Co>2Ni-1Co>Ni>1Ni-1Co=9Ni-1Co>1Ni-9Co>Co. For Fe—Co catalysts the overall intensity of the carbon nanotube peak was very less compared to Ni-based catalysts and the whole set of Fe—Co catalysts produced less graphitized carbon nanotube. Hence in general Ni content in the bimetallic catalyst is influencing the degrees of graphitization of the carbon formed during the methane decomposition reaction.

Figure 5:
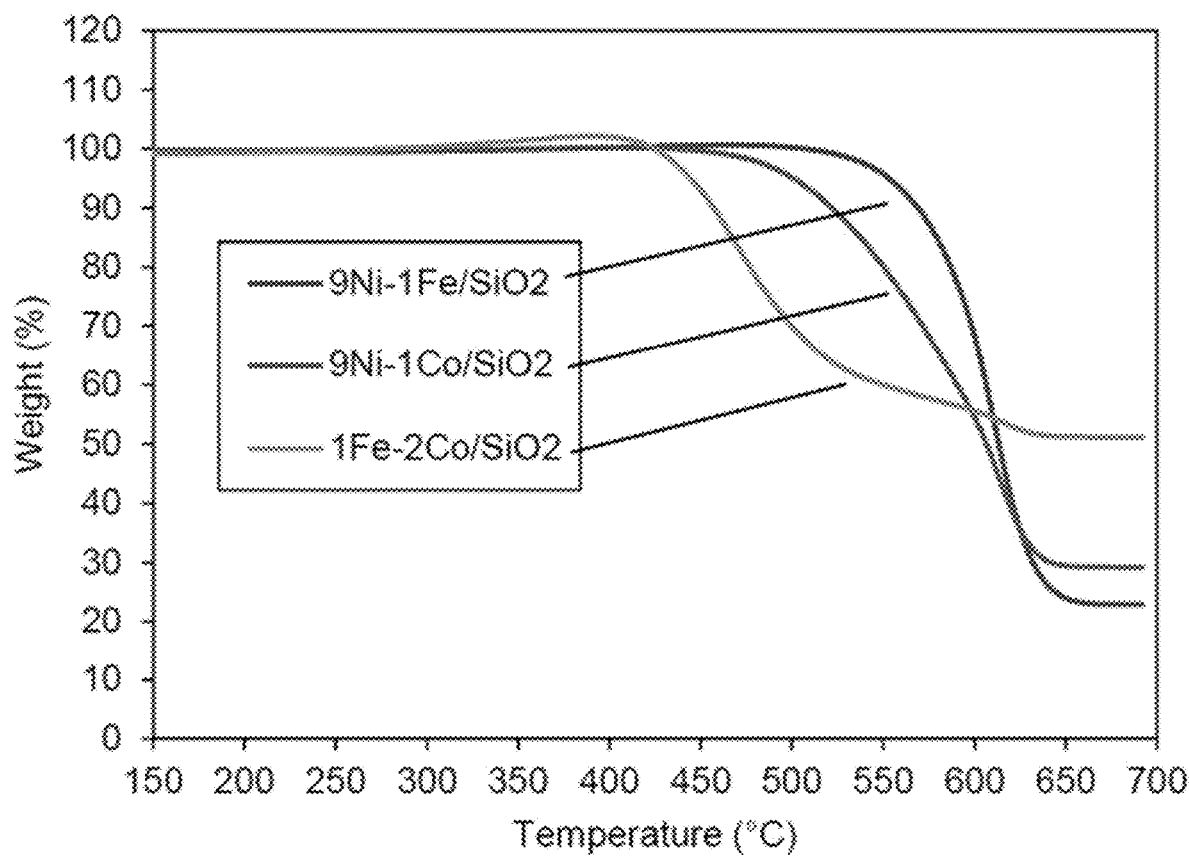
FIG. 5 shows representative thermal stability data of carbon deposited over representative disclosed 9Ni-1Fe/SiO$_2$, 9Ni-1Co/SiO$_2$ and 1Fe-2Co/SiO$_2$ catalysts.

Properties of carbon nanotubes—Themogravimetric analysis (TGA). Thermal stability of carbon nanotube was studied using thermogravimeteric analysis. Used catalysts such as 9Ni-1Fe/SiO$_2$, 9Ni-1Co/SiO$_2$ and 1Fe-2Co/SiO$_2$ were studied, since these catalysts showed better activity than the rest of the catalysts (FIG. 5). These catalysts were analysed in 2% O$_2$/He atmosphere. The carbon deposited on the catalyst, amorphous or carbon nanotube decomposes into CO or CO$_2$ in O$_2$ atmosphere. In certain cases there is a possibility that the catalyst species also get oxidized under these conditions. It was observed that there was no thermal degradation in the temperature range of 200-350° C., which corresponds to the amorphous carbon. Accordingly, it was confirmed that the carbon deposited on these catalysts is not amorphous in nature. The weight loss observed in all these catalyst corresponds to the carbon nanotube deposited on the catalyst. From TGA analysis of carbon nanotubes it is understood that higher the degradation temperature of carbon, the higher its stability. For 9Ni-1Fe/Si$_2$, the thermal degradation started at around 500° C. and there was a weight loss of 75%. For 9Ni-1Co/SiO$_2$ degradation started from 450° C. with a weight loss of 70%. For 1Fe-2Co/SiO$_2$ catalyst, there was slight increase in weight, 2% at temperature around 350° C., which can be due to the oxidation of Fe present in the catalyst. At around 410° C., a weight loss of 45-50% was observed, which was lower than 9Ni-1Fe/SiO$_2$ and 9Ni—Co/SiO$_2$ catalysts. The onset temperatures for 9Ni-1Fe/SiO$_2$, 9Ni—Co/SiO$_2$ and 1Fe-2Co/SiO$_2$ are 500-660° C., 450-650° C. and 410-640° C. respectively, which indicates that the carbon nanotube formed over 9Ni-1Fe/SiO$_2$ catalyst has higher degree of graphitization, as well as lesser defects on the carbon nanotubes. Hence it can be concluded that smaller difference in the onset and end temperature indicates the formation of highly graphitized carbon nanotubes. It is also understood that there is no amorphous carbon formation during methane decomposition over these catalysts and the amount of carbon formed over 1Fe-2Co/SiO$_2$ is the minimum in comparison to 9Ni-1Fe/SiO$_2$ and 9Ni—Co/SiO$_2$ catalysts.

Figure 6:
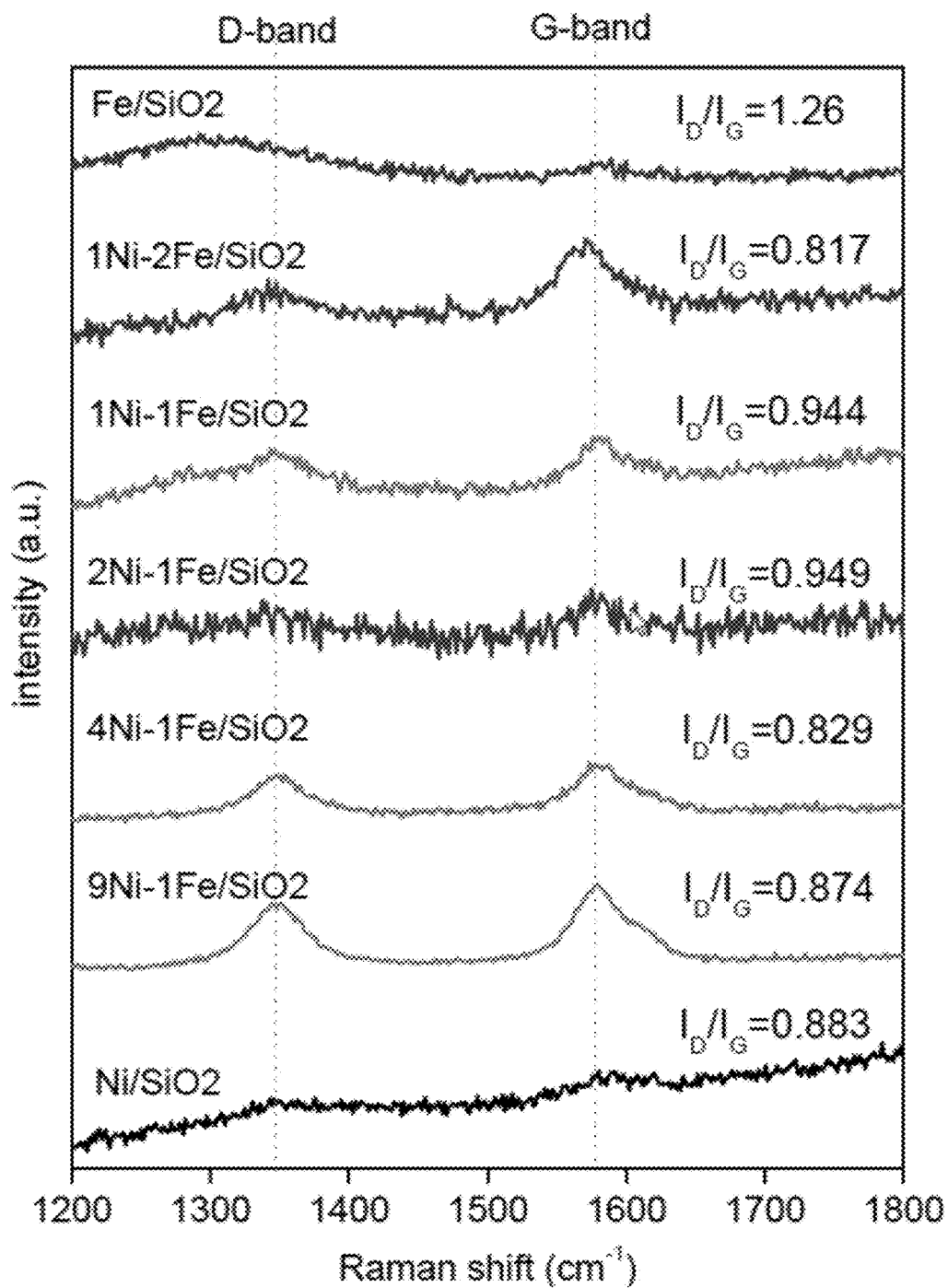
FIG. 6 shows representative Raman spectra data of carbon nanotube over representative disclosed mono and bimetallic Ni—Fe catalysts per the labels in the figure.
Figure 7:
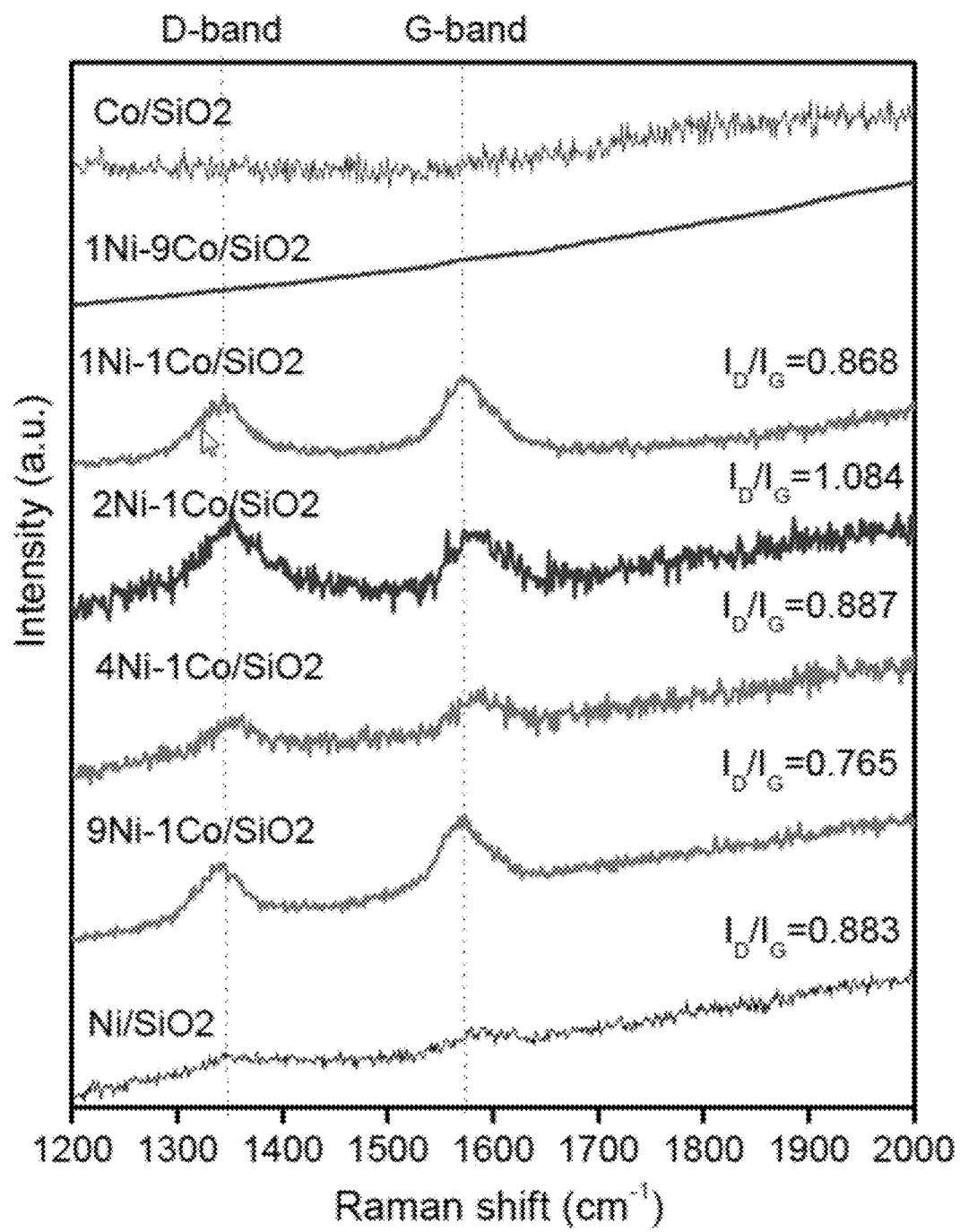
FIG. 7 shows representative Raman spectra data of carbon nanotube over representative disclosed mono and bimetallic Ni—Co catalysts per the labels in the figure.
Figure 8:
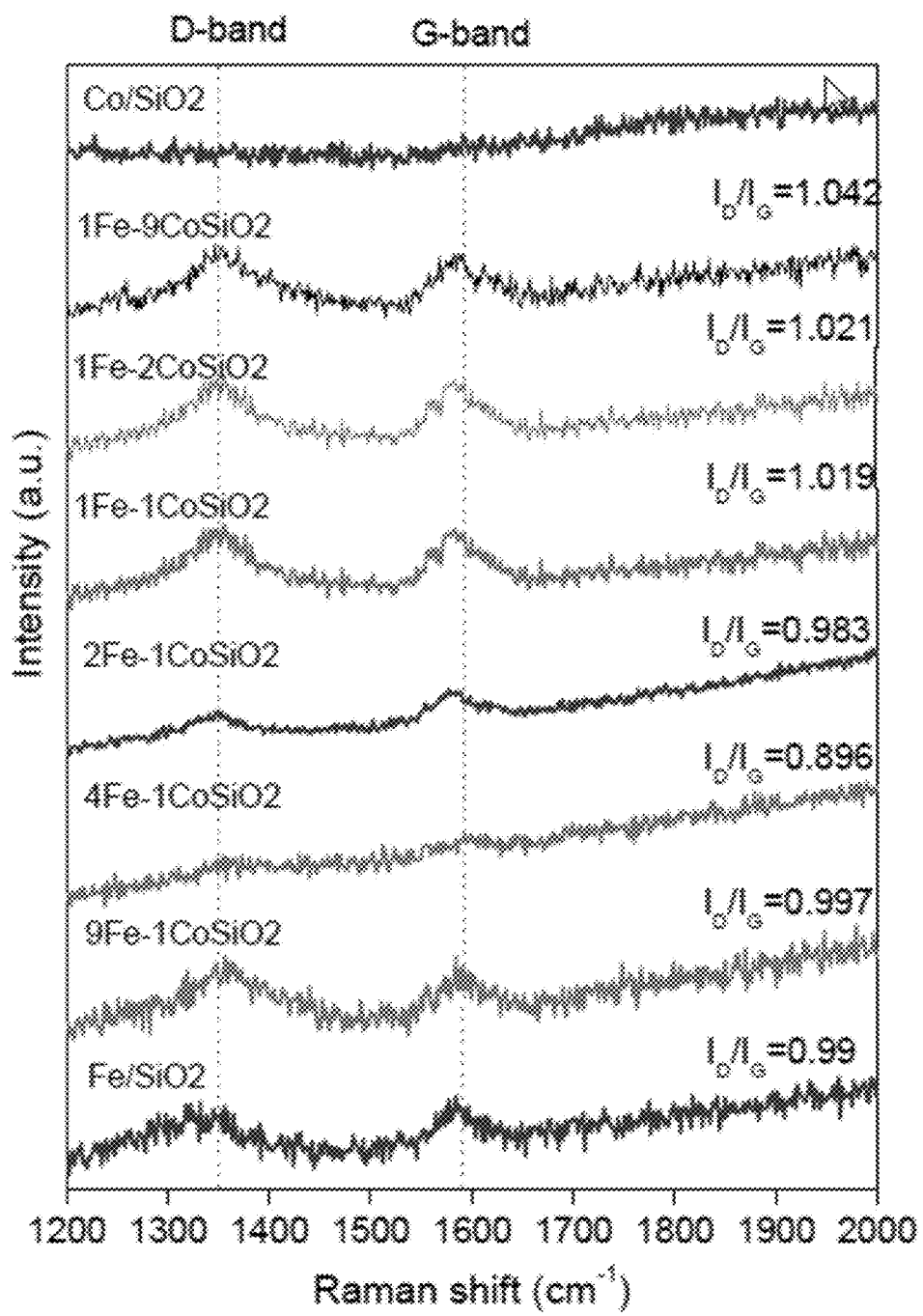
FIG. 8 shows representative Raman spectra data of carbon nanotube over representative disclosed mono and bimetallic Fe—Co catalysts per the labels in the figure.

Properties of carbon nanotubes—Raman analysis. Raman spectroscopic studies were performed to understand the quality and crystallanity of carbon (FIGS. 6, 7, and 8). Two distinct bands were observed for all the catalysts, the D-band at 1336 cm$^{-1}$ and G-band at 1570 cm$^{-1}$. D-band represents either disordered or amorphous carbon and G-band represents the crystalline carbon (Q. Weizhong, et al., *Appl. Catal. A Gen.*, 2004, 260, 223-228). From TGA analysis it was confirmed that there is no amorphous carbon deposited on the catalyst (FIG. 5). Hence the intensity ratio, I$_D$/I$_G$ explains the graphitization degree and the crystallinity of the carbon nanotubes (A. E. Awadallah, et al., *Appl. Surf. Sci.*, 2014, 296, 100-107). The catalyst having lowest I$_D$/I$_G$ carbon with highest crystallinity. For Ni—Fe catalysts (FIG. 6), the data show that I$_D$/I$_G$ value was lowest for 9Ni—Fe, 4Ni-1Fe, Ni, 1Ni-2Fe showed similar I$_D$/I$_G$ value (0.829-0.874), better crystallinity than 2Ni—Fe, 1Ni-1Fe and Fe catalysts with higher I$_D$/I$_G$ value (0.944-1.26).

Raman spectra for Ni—Co catalysts (FIG. 7) shows that 9Ni-1Co gave most crystalline carbon nanotube with lowest I$_D$/I$_G$ (0.765), while Ni, 4Ni—Co, 1Ni-1Co showed similar I$_D$/I$_G$(0.868-0.883). The data did not show any distinct bands for Co and 1Ni-9Co catalysts, since the amount of carbon nanotube formed for these catalysts were lesser than the detection limits. For 4Fe-1Co crystallinity calculated was the highest, (I$_D$/I$_G$=0.896), while Fe, 9Fe-1Co, 2Fe-1Co showed similar I$_D$/I$_G$ (0.983-0.99). Remaining catalyst ratios such as 1Fe-1Co, Fe-2Co Fe—Co catalysts 4Fe-1Co formed carbon nanotube with highest I$_D$/I$_G$ (1.019-1042) due to the low crystallinity of the carbon nanotube formed.

Figure 9:
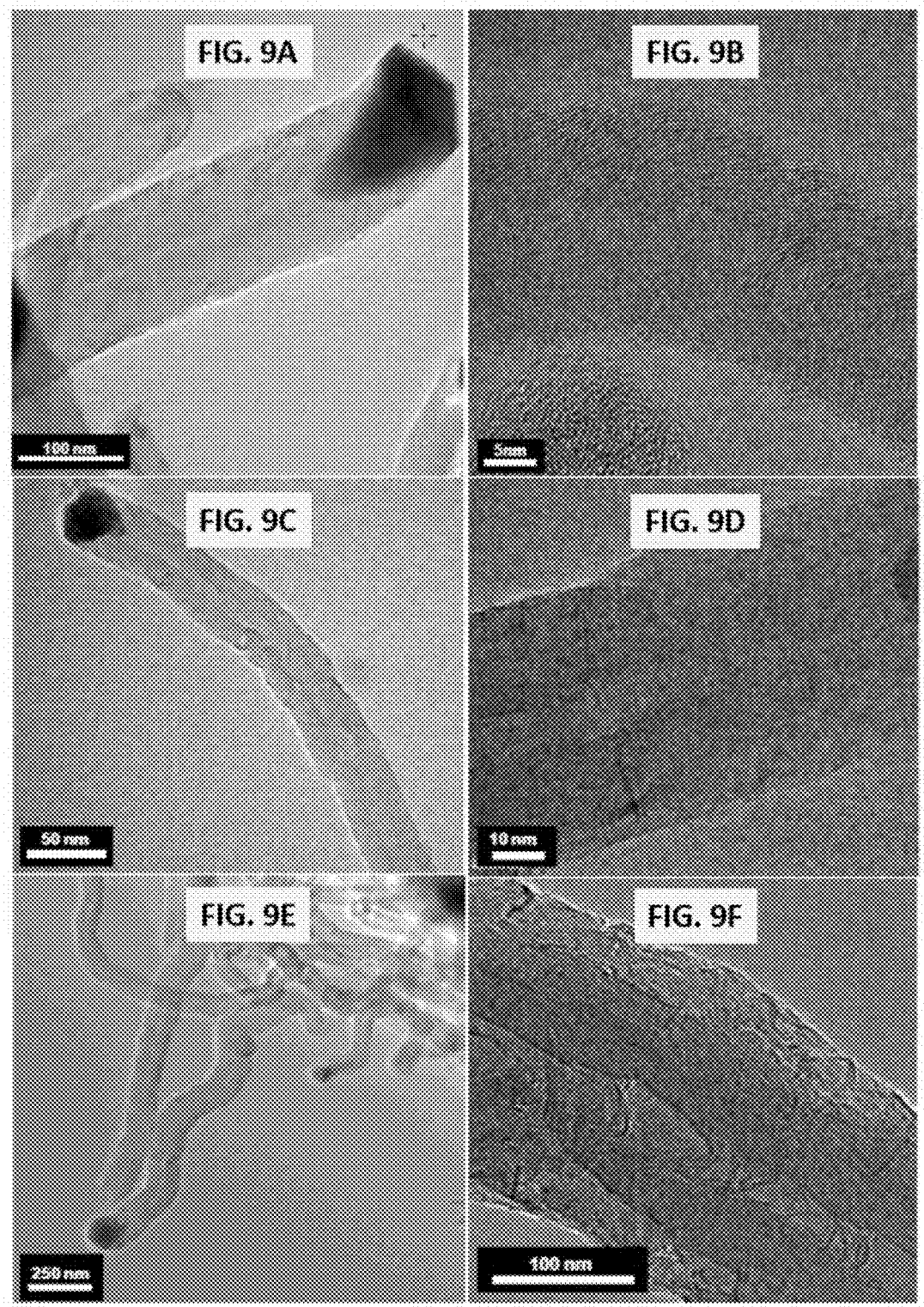
FIGS. 9A-9F shows representative images of growth of carbon filaments over representative disclosed catalysts. Specifically.

Properties of carbon nanotubes—TEM analysis. Structural morphology, particle size, diameter and growth of carbon nanotube was studied using TEM technique. This analysis was limited to the certain catalysts from each set of bimetallic catalysts (Ni—Fe/Ni—Co and Fe—Co) which showed the best performance and stable nature in the methane decomposition reactions (FIG. 9). Hence TEM analysis was performed over the used 9Ni-1Fe/SiO$_2$, 9Ni-1Co/SiO$_2$ and 1Fe-2Co/SiO$_2$ catalysts. It was observed that the carbon nanotube formed in our experiments are found to be MWcarbon nanotube due to large crystallite size of active site metal nanoparticles, confirmed by XRD techniques. The carbon nanotubes formed over all these catalysts showed very crowded dense population with entangled fibres. carbon nanotubes were growing in random directions due to space competition of growth (G. Wang, et al., *Energy & Fuels*, 2013, 27, 4448-4456). Length of the carbon nanotube depends on the duration of the process, hence to obtain longer filaments, duration of the reaction has to be extended.

For 9Ni-1Fe/SiO$_2$ catalyst it was observed that most of the carbon nanotube formed where of 100-120 nm. The wall of the tube was very thick with graphite layer stacked very closely. Surprisingly, Ni—Fe catalyst showed a "tip growth" of carbon nanotube whereas the carbon nanotube grows it takes the metal nanoparticle along with it and is situated at the tip of the carbon nanotube. The shape of the metal nanoparticle was "cone or pear shaped" tapered towards the end and forms an angle with the tubular axis. From HR-TEM it was observed that the wall of carbon nanotube formed were of "fishbone or herringbone" structure in which the graphene layers are stacked obliquely with respect to the fiber axis. In these type of carbon nanotube, the graphite planes are formed at an angle to the axis of the nanotube and hence there is a higher possibility for the edge plane sites/defects in these carbon nanotubes (C. E. Banks and R. G. Compton, *Analyst*, 2006, 131, 15-21). For 9Ni-1Co catalyst, MWcarbon nanotubes with 50-60 nm diameters were formed, also with a metal nanoparticle at the tip. But from HR-TEM it was observed that the wall of these carbon nanotubes had a parallel morphology (graphite planes arranged parallel to the tubular axis). But certain fibres formed in these catalyst didn't have metal nanoparticles at the tip (FIG. 31), the carbon nanotube was growing with metal at its base (base growth). So 9Ni-1Co/SiO$_2$ gave a mixture of tip and base grown carbon nanotubes.

Figure 31:
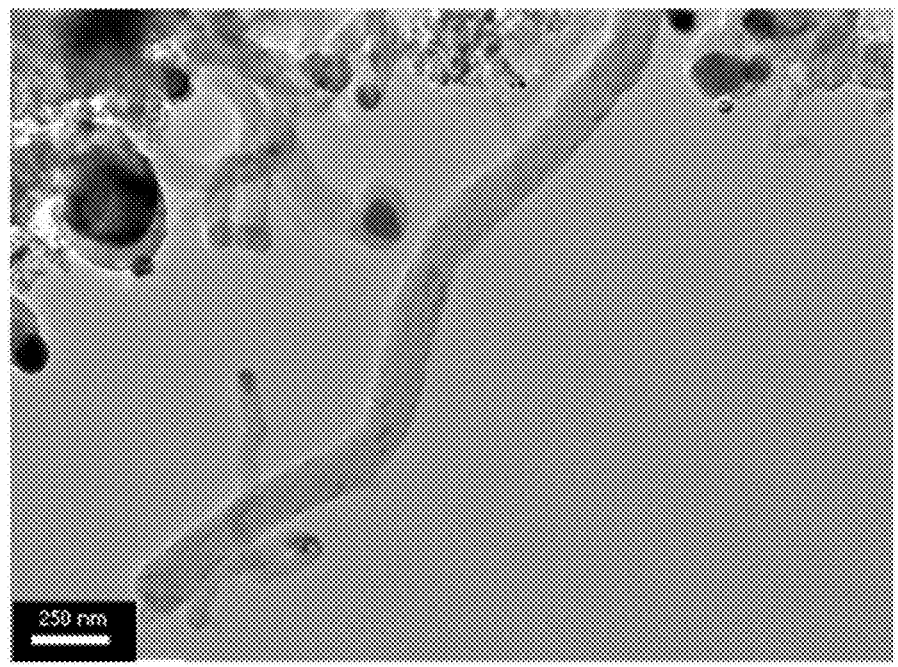
FIG. 31 shows a representative image of tip and base grown carbon nanotubes over a representative disclosed 9Ni-1Co/$SiO_2$ catalyst carried out as described in the examples under conditions of T=650° C., P=1 bar, TOS=0-60 minutes, GHSV=42000 $h^{-1}$. A scale bar is indicated in the figure.

In the case of Fe—Co catalyst, MWcarbon nanotube were formed with 100-125 nm diameter also showing a mixture of tip and base grown carbon nanotubes (FIGS. 9 and 31).

HR-TEM has confirmed the parallel morphology of the carbon nanotube wall for these catalysts.

Synthesis of base grown carbon nanotubes. The data from catalyst screening studies show that using mono and bimetallic Ni/Fe/Co catalysts, a 60% Fe/SiO$_2$ composition provided selectively forming base grown carbon nanotubes during methane decomposition. Accordingly, Fe/SiO$_2$ catalysts were utilized in the next series of studies. The data disclosed herein show that Fe/SiO$_2$ had a very low methane conversion, 11% and eventually got reduced to 4% at T=650° C., TOS=60 minutes, GHSV=42000 h$^{-1}$. Thus, the reaction conditions required inventive modification in order to obtain better conversion and yields of H$_2$ and carbon nanotube.

Effect of temperature on the base growth of carbon nanotube was studied over Fe/SiO$_2$ catalyst at various temperatures, T=650, 700, 750 and 800° C. (FIG. 10). It was observed that at T=750° C. methane conversion was 50%, better than at T=700° C., 47%. But after 15 minutes of reaction methane conversion was similar in both the cases. Hence T=700° C. was preferred for future studies. Base grown carbon nanotube formation was confirmed using TEM analysis. It was observed that metal nanoparticle remained on the support, while the carbon nanotube grew from the base (FIG. 11).

Figure 14:
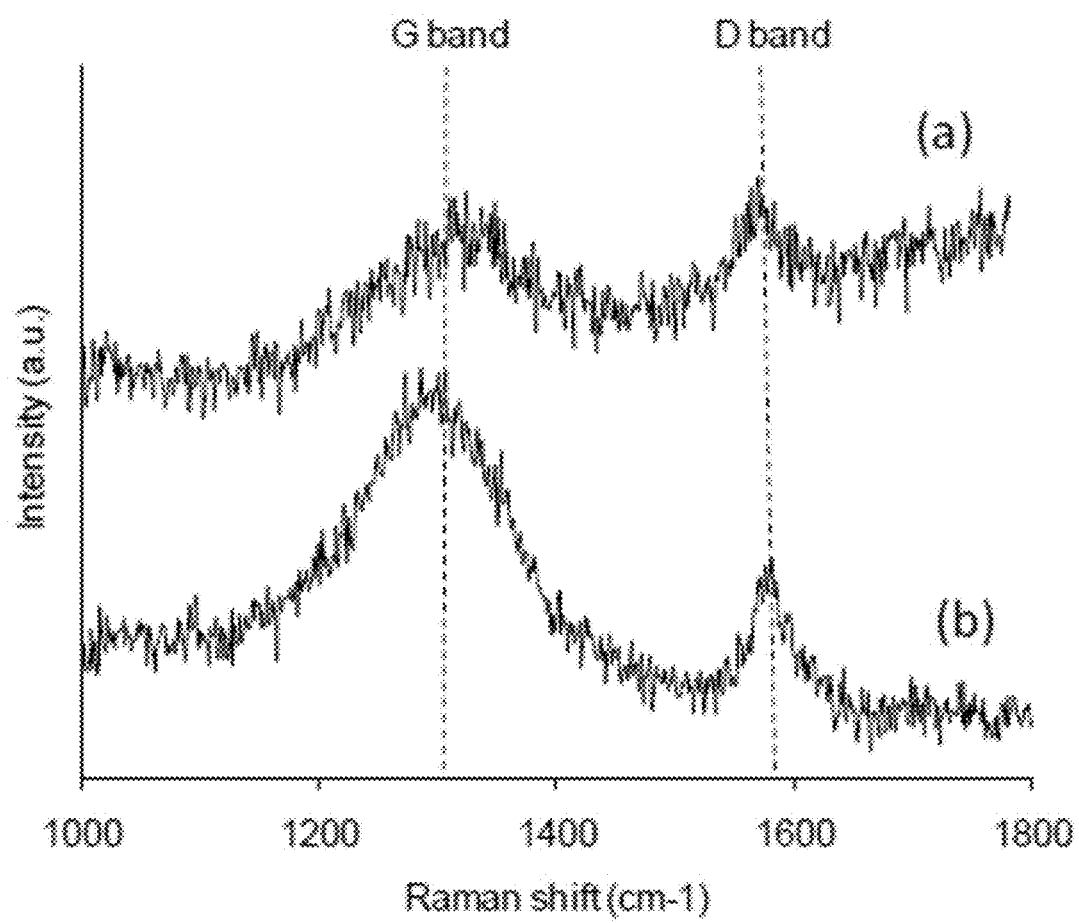
FIG. 14 shows representative Raman spectra data obtained from base grown carbon nanotubes prepared over Fe/SiO2 catalysts. Line (a) shows data obtained from carbon nanotubes prepared during a first reaction cycle; and line (b) shows data obtained form a carbon nanotubes prepared during a second reaction cycle after regeneration. Reaction conditions were T=700° C., TOS=60 minutes, GHSV=42000 h-1.

Hence 60% Fe/SiO$_2$ catalyst was proved to be capable of synthesizing base grown carbon nanotubes by methane decomposition. In order to confirm this property of Fe/SiO$_2$ catalyst a catalyst regeneration study was carried out as disclosed herein. After the first cycle of methane decomposition at T=650° C., TOS=60 min., GHSV=42000 h$^{-1}$ the used catalyst was regenerated using 10% O$_2$ at 500° C. for 30 min. Carbon deposited on the catalyst was burnt off as CO$_2$ which was confirmed using GC analysis. The second cycle of experiments were performed under the same reaction conditions, and the activity was found to be same in both the cycles (FIG. 12). Carbon nanotubes formed in the 2$^{nd}$ cycle were characterized using TEM which confirmed the formation of base growth of carbon nanotube even in the 2$^{nd}$ cycle (FIG. 13). This may be because the particle of Fe nanoparticle, active site was not agglomerated during the course of the reaction. Raman analysis of both 1$^{st}$ and 2$^{nd}$ cycle of carbon nanotubes were performed which showed that in the 2$^{nd}$ cycle the intensity of D-band corresponding to disordered carbon nanotube was higher than G-band, corresponding the crystallinity of carbon nanotube (FIG. 14). So even after a regeneration study the activity of Fe/SiO$_2$ was not reduced, however, the selectivity of this catalyst towards carbon nanotube formation was found to decrease after regeneration.

The central theme of this project is the catalytic decomposition of methane, the major component of shale gas into COx free H$_2$ and valuable carbon such as carbon nanotube. However to attain this goal a thorough investigation of the reaction conditions, catalyst properties and the carbon generated by the process has to be performed.

In summary, the catalytic activity, selectivity and stability of mono and bimetallic Ni/Fe/Co based catalysts was demonstrated for the methane decomposition study. Disclosed herein are transition metal catalysts (Ni/Fe/Co) that provide synthesis of both tip and base grown carbon nanotubes by methane decomposition. Disclosed herein are novel synthesized mono and bimetallic Ni/Fe/Co catalysts prepared by dry impregnation over SiO$_2$ support. The XRD and H$_2$-TPR analysis confirmed the formation of the alloy in the bimetallic catalysts. The effect of catalyst composition on methane decomposition and carbon nanotube growth was studied over various mole ratios of Ni, Fe and Co based catalysts. High Ni content in the Ni—Fe bimetallic catalyst exhibited higher methane conversion and also contributed to increase in the stability of the catalyst. In the case of Ni—Co bimetallic catalyst also higher Ni content exhibited higher conversion and Co present in the catalyst contributed to increase the catalyst lifetime. Among Fe—Co catalysts the activity towards methane conversion was comparatively lower than Ni—Fe and Ni—Co catalysts. The quality of the carbon nanotubes formed over these catalysts were analysed using XRD, TGA, Raman and TEM techniques. From XRD analysis it was understood that Ni content in the bimetallic catalyst controls the degrees of graphitization of the carbon formed. From TGA analysis it was concluded that there was no amorphous carbon formation during methane decomposition over these catalysts. The quality of the carbon, i.e., the degree of crystallinity, was calculated using Raman analysis. TEM analysis helped to understand the different morphologies of the carbon nanotube, diameter, wall type (parallel or fish bone type) and also the growth mechanism such as tip and base growth on different catalysts. It was understood that Ni—Fe catalyst selectively produced tip grown carbon nanotubes with fishbone wall pattern, while Ni—Co and Fe—Co catalysts formed a mixture of tip and base grown carbon nanotubes with parallel wall pattern.

The previous catalytic studies on methane decomposition were mainly focused on these metals individually as catalysts for carbon nanotube formation and hydrogen production. Also there was a lack in information about the relation between the type of metal and the properties of carbon nanotubes formed during methane decomposition. Our work is indeed significantly more general using a variety of combination of Ni/Fe/Co catalyst under the same reaction conditions for methane decomposition. Further disclosed herein are synthesis of selectively base grown carbon nanotubes over Fe/SiO$_2$, which is considered to be easy to be harvested without sacrificing the catalyst sites. The disclosed compositions and methods provide novel synthesis of carbon nanotubes and COx free H$_2$ by the catalytic decomposition of methane.

Example 2

Catalyst preparation. Fe-based catalysts were prepared by dry impregnation or incipient wetness impregnation method. Fe(NO$_3$)$_2$.9H2O (Alfa Aesar) was used as a metal precursor. Gamma (γ) Al$_2$O$_3$ (Alfa Aesar), fumed SiO$_2$ (CAB-O-SIL-EH-5 untreated SiO$_2$, CABOT), and H-ZSM-5 zeolite (CBV-5524G, SiO$_2$/Al$_2$O$_3$ mole ratio=50, Zeolyst International) are used as catalyst supports. An aqueous solution of metal precursor (60 wt % metal loading) was impregnated on the support (40 wt %) and dried at 130° C. for overnight (16 h) in a drying oven. Further, the as-synthesized sample was calcined at 500° C. for 10 h and then reduced in 10% H$_2$ in an Ar flow (70 ml min$^{-1}$). The obtained catalysts were designated as Fe/Al$_2$O$_3$, Fe/SiO$_2$, and Fe/H-ZSM-5. Besides the 60 wt % Fe/Al$_2$O$_3$, 10 and 30 wt % Fe/Al$_2$O$_3$ were also prepared. These catalysts were denoted as xFe/support (x means weight % loading of Fe).

Reactor apparatus. Catalytic methane decomposition reactions were performed in a fixed-bed flow reactor (44.5 cm long quartz tube with 10 mm i.d.) at atmospheric pressure (1 Bar). Experiments were performed with 0.1 g catalyst placed in the reactor bed and were purged a with N$_2$ for 30 min. Prior to the activity test the calcined catalysts were reduced in 10% H$_2$/N$_2$ stream (70 ml/min) at 700° C. (10° C./min) for 4 h. Catalyst was purged with N$_2$ for 30 min and the temperature was increased to 700° C. (10° C./m) in $N_2$ (70 ml/min). Further, the feed was switched to reactant gas (30% $CH_4/N_2$, 70 ml/min) with a space velocity of 42000 $h^{-1}$. The composition of outlet gas was analyzed by online gas chromatograph (Perkin ElmerARNEL, Clarus 500) equipped with a thermal conductivity detector and a series of packed columns (HayeSep N 60/80, HayeSep T 60/80, Molecular Sieve 5A 45/60, and Molecular Sieve 13×45/60). The GC data were processed using TotalChrom Workstation software. GC was well calibrated with standard gases before analysis. Catalyst reproducibility was tested, and the results were with ±5% error. The CNT formed over the catalyst was quantified by weighing it.

Characterization techniques. Catalyst samples were characterized by several instruments. Catalysts with carbon deposition obtained after reaction at 700° C. were characterized by X-Ray Diffraction (XRD). XRD measurements were performed on PANalyticalX'pert Pro using Cu Kα radiation. Raman spectra of carbon nanotubes were using a Raman spectroscopy by a Renishaw InVia Raman Microscope with 532 nm excitation wavelengths at a 5 mW laser power and three scans were accumulated for each spectrum. Scanning electron microscopy (SEM) images were observed through a JEOL JSM-7600F SEM equipped with an Oxford INCA EDS. Transmission electron microscopy (TEM) studies were taken with a JEOL JEM-2100 TEM and operating voltage was 200 kV. The thermogravimetric analysis (TGA) of the spent and purified catalysts was carried out in the SDT 650 instrument (TA Instruments). Samples were heated in 5% $O2/N2$ up to 900° C. at a constant heating rate of 5° C./min. Meanwhile, weight loss and oxidation temperature were recorded. The X-ray photoelectron spectroscopy (XPS).

Figure 35:
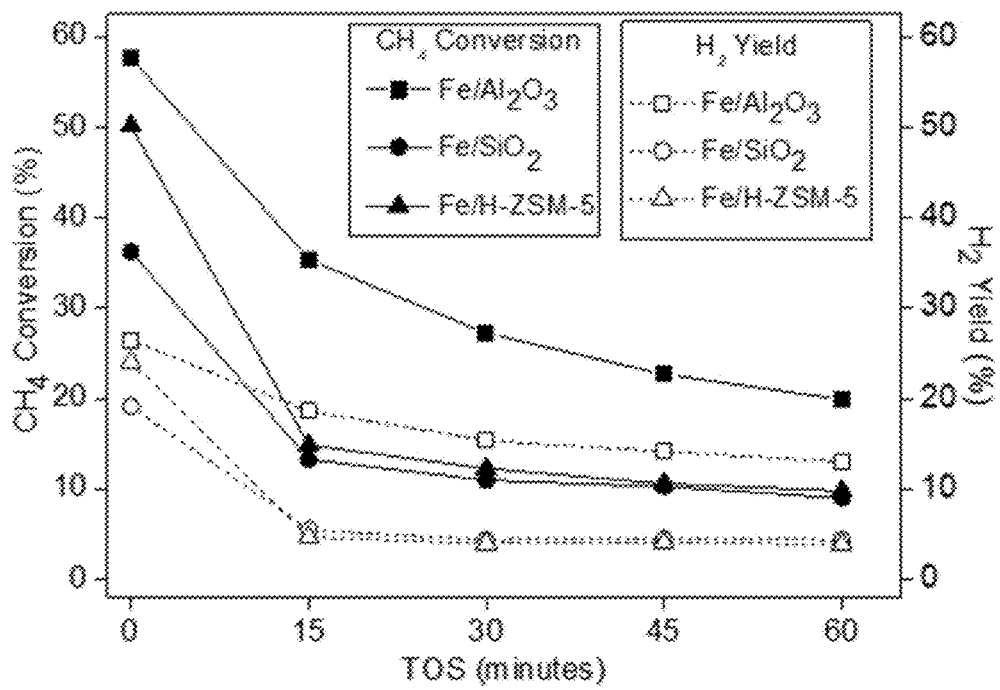
FIG. 35 shows representative data for methane decomposition over disclosed Fe catalysts on various supports at T=700° C., TOS=0-60 minutes.

Effect of supports. The catalytic activity of Fe-catalysts on various supports ($Fe/Al_2O_3$, Fe/H-ZSM-5, and $Fe/SiO_2$) for methane decomposition at 700° C. were studied. The main products from methane decomposition are hydrogen gas and carbon CNT. Quantification of $H_2$ was performed using GC analysis while carbon deposited on the catalyst was calculated based on the weight gain of the catalyst after the reaction and was characterized using different techniques. Growth rates of CNT on two supports suggest that the catalyst morphology can greatly affect the activity of the catalysts, because in CCVD the rate determining step is the adsorption and decomposition of hydrocarbons by catalyst particles. In this study, it was observed that the conversion of $CH_4$ depends on types of support, such as $Al_2O_3$, $SiO_2$, and H-ZSM-5. For Fe/ZSM-5 and $Fe/SiO_2$ initial conversions were 50% and 36% respectively (see FIG. 35). Even though $Fe/Al_2O_3$ had a higher initial conversion (58%) the activity reduced (20%) within 1 h of reaction. On Fe/H-ZSM-5 catalyst the initial conversion was also high (50%) but there was a decrease in its activity to 15% in 15 min, but it maintained this conversion rate throughout the reaction time. Similarly $Fe/SiO_2$ with an initial conversion of 36% was reduced to 9%. The hydrogen yield for each catalyst was similar to the methane conversion which followed the similar trend. $Fe/Al_2O_3$ indicate the highest initial yield of hydrogen at about 26% and for Fe/ZSM-5 and $Fe/SiO_2$ were 24% and 20%, respectively, as shown in FIG. 35. Amount of carbon formed per gram of catalyst was calculated, which was found to be approximately 0.785 g/g of catalyst for $Fe/Al_2O_3$ catalyst while for Fe/ZSM-5 and $Fe/SiO_2$ it was only 0.1 g/g of catalyst.

Figure 36:
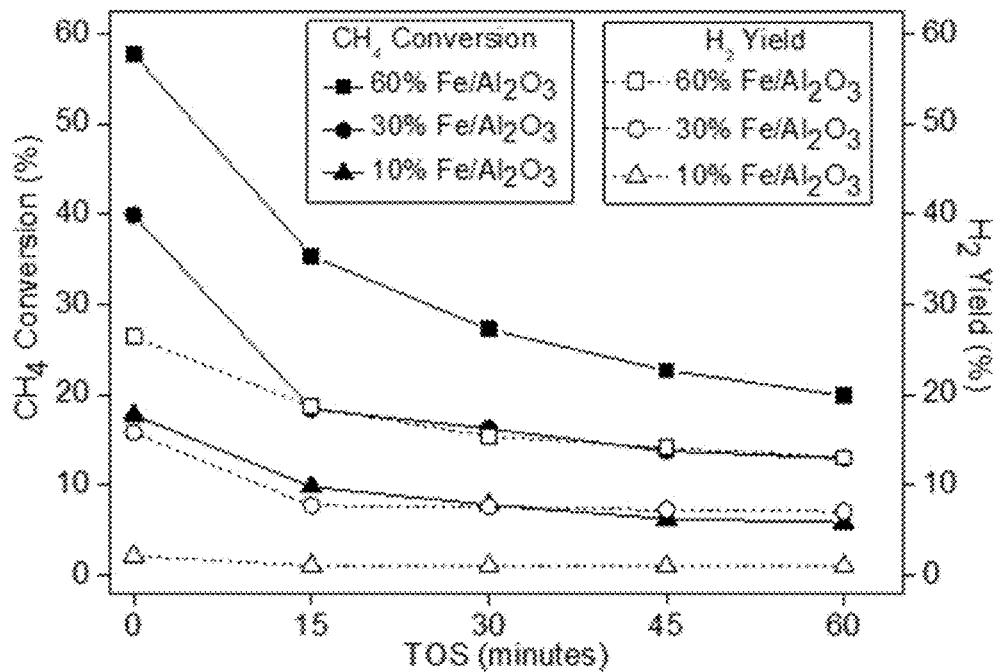
FIG. 36 shows representative data for methane decomposition over disclosed Fe/$Al_2O_3$ catalysts with various Fe loadings at T=700° C., TOS=0-60 minutes.

Effect of Fe loading on $Al_2O_3$ support. Catalytic activity for methane conversions of $Fe/Al_2O_3$ was studied with time on stream over various Fe loading. The Fe loading were 10 wt %, 30 wt %, and 60 wt % which were associated with initial conversion were 18%, 40%, and 58%, respectively. The conversion increased as the loading of Fe increased but after 15 min, all catalysts began to be deactivated gradually. The conversion of 30% $Fe/Al_2O_3$ catalyst dropped from 40% to 18% and 10% $Fe/Al_2O_3$ decreased to 10%. In addition, 60% $Fe/SiO_2$ and 30% $Fe/Al_2O_3$ had similar methane conversion and hence supports clearly affect activity of catalysts. Moreover, different loading of Fe, 30% $Fe/Al_2O_3$ and 10% $Fe/Al_2O_3$ were 16% and 2%, respectively, as shown in FIG. 36). In addition, in other studies it was determined that the carbon yield of 30% $Fe/Al_2O_3$ and 10% $Fe/Al_2O_3$ were about 0.38 and 0.07 g/g of catalyst.

Acid Reflux Isolation and Purification of CNT using Mineral Acids. Among the various purification methods that have been reported, refluxing with various kinds of mineral acids is the most employed treatment.[35,45,46] For our experiments we have collected the CNT formed over Ni—Fe bimetallic (60%9Ni:1Fe/$SiO_2$) catalyst used for methane decomposition from our previous studies.[21] This CNT from this catalyst was chosen for purification studies due to the excellent performance of the catalyst and very high carbon yield as per our experiments. Also we have used CNT on Fe/Al2O3 catalyst employed here in our present studies. Acid refluxing of CNT deposited on the catalyst will remove the metal particles and carbon impurities along with some chemical surface modification. Several factors such as the reflux temperature time and strength of the acid determine the effectiveness of the purification process (see: H. Hu, et al., Phys. Chem. B 107, 13838 (2003); and Y. Wang, et al. Chem. Phys. Lett. 432, 205 (2006)). Longer refluxing time at higher temperature with strong acid results in the complete removal of the metal particles and also the acid attacks the defective sites of CNT. But shorter period of reflux with low temperature and acid concentration results in the incomplete removal of the catalyst particles from the CNT.

In Example 2, the following procedure was employed for isolation and purification of CNT: the spent catalyst (9Ni:1Fe/SiO2 or Fe/SiO2) of 0.3 g weight was refluxed in 45 ml of 3 M $HNO_3$ solution at 120° C. under continuous magnetic stirring for 24 h and 48 h. The residue obtained afterwards was filtered and washed with deionized water until the pH was neutral. It is believed that the acid solution left behind after reflux may contain dissolved metal particles and support on the spent catalysts. The solid carbon (CNT) left behind was then dried overnight (16 h) at 120° C. and was characterized using various physic-chemical techniques to analyze its purity.

Figure 37A:
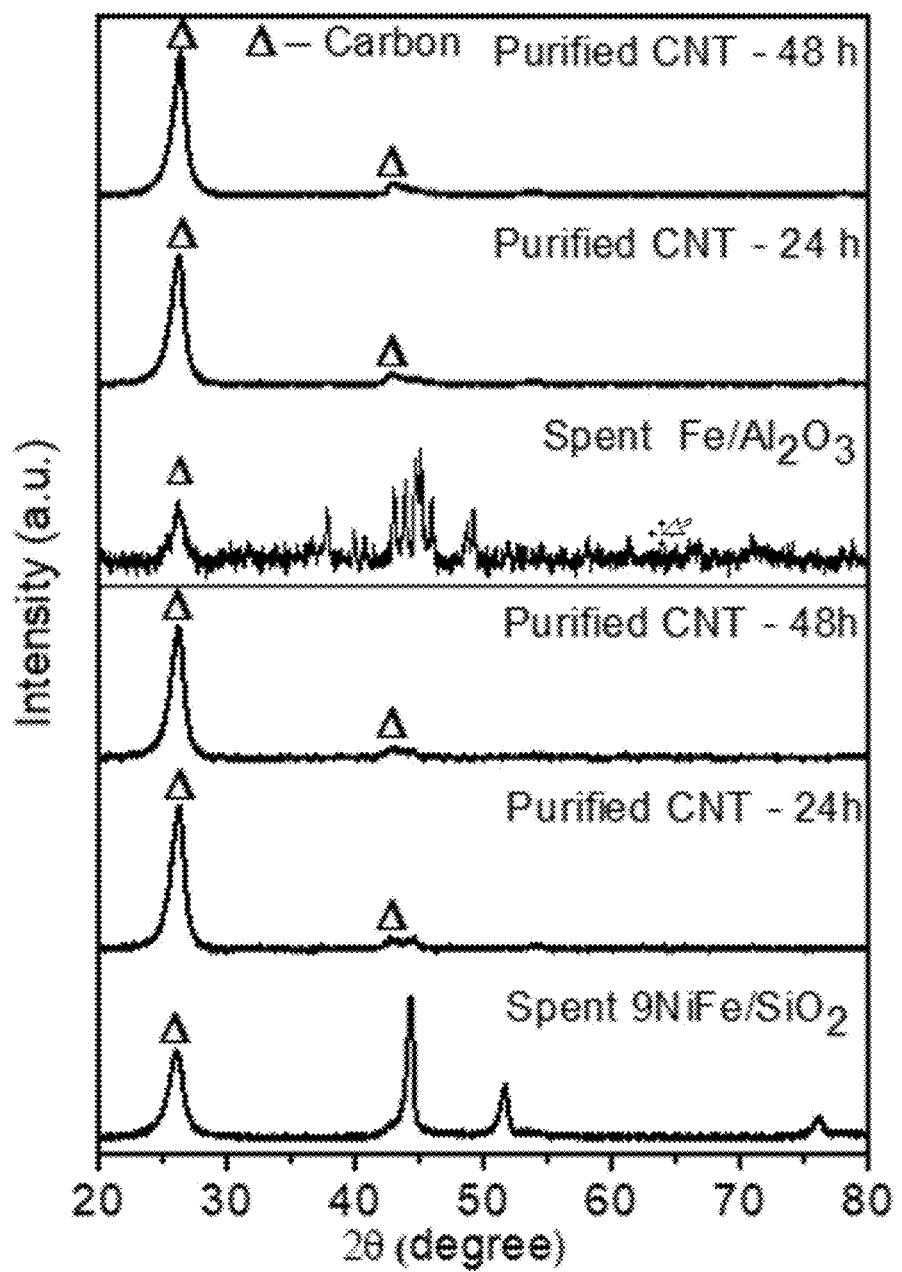
FIGS. 37A-37D show representative data pertaining to effects of an acid reflux method for isolation and purification of disclosed carbon nanotubes.

XRD and Raman analysis of isolated CNT. Carbon isolated from 9Ni:1Fe/$SiO_2$ and Fe/$SiO_2$ catalysts after acid reflux was analysed using XRD and Raman techniques. FIG. 37A represents the comparison of XRD patterns of spent 9Ni-1Fe/$SiO_2$ with its isolated CNT after 24 h and 48 h reflux. Similarly for Fe/$SiO_2$ catalysts also. In both the cases, it can be observed that before acid reflux metal characteristic peaks (Ni or Fe) along with graphitic carbon was clearly visible in the XRD pattern of the spent catalysts.

The intensity of these metal peaks was reduced after 24 h of acid reflux and was completely removed after 48 h reflux. Hence in the 48 h sample we could only detect the graphitic carbon characteristic peaks at 2θ=26.2 and 42.9 which confirms the purity of the isolated carbon after the purification process we employed.

Figure 37B:
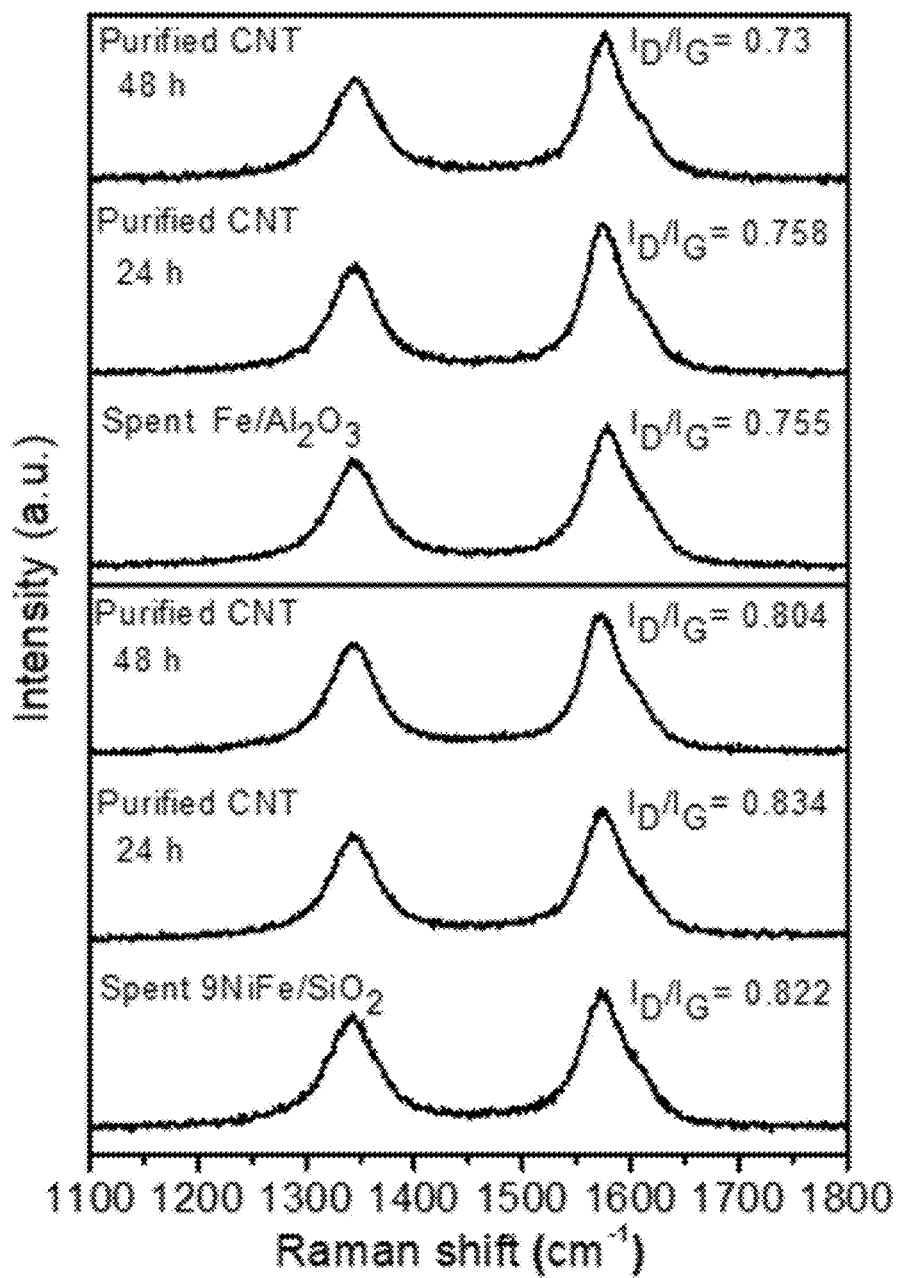

Raman analysis of spent 9Ni-1Fe/SiO2 with its isolated CNT after 24 h and 48 h of reflux is shown in FIG. 37B. The $I_D/I_G$ ratio of spent $Fe/Al_2O_3$ was 0.755 and purified $Fe/Al_2O_3$ were 0.758 (24 h) and 0.73 (48 h). The $I_D/I_G$ ratio of spent 9NiFe/SiO$_2$ was 0.822 and purified 9NiFe/SiO$_2$ were 0.834 (24 h) and 0.804 (48 h). These results show that the I$_D$/I$_G$ value for carbon before and after purification is not changed which indicates that the HNO$_3$ treatment for purification did not affect the crystalline structure of CNT isolated. Both results revealed that the acid treatment for 48 h effectively removed the metal and support residue of the spent catalyst from the CNT and maintained the crystalline nature of the CNT;s obtained after purification.

Figure 37C:
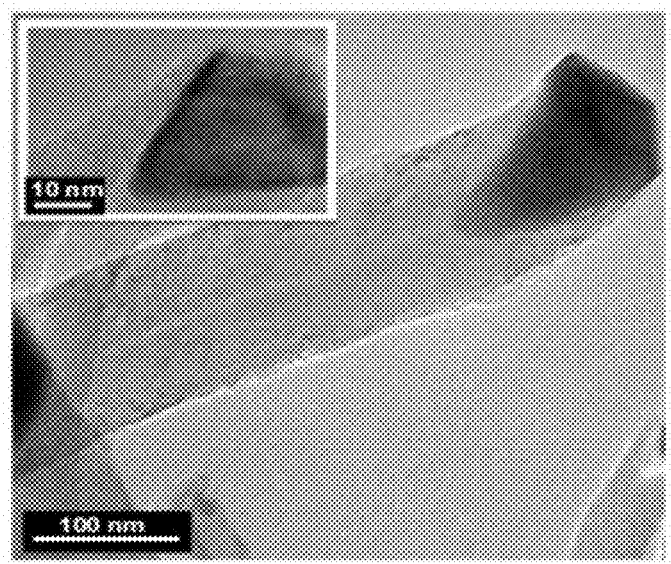
Figure 37D:
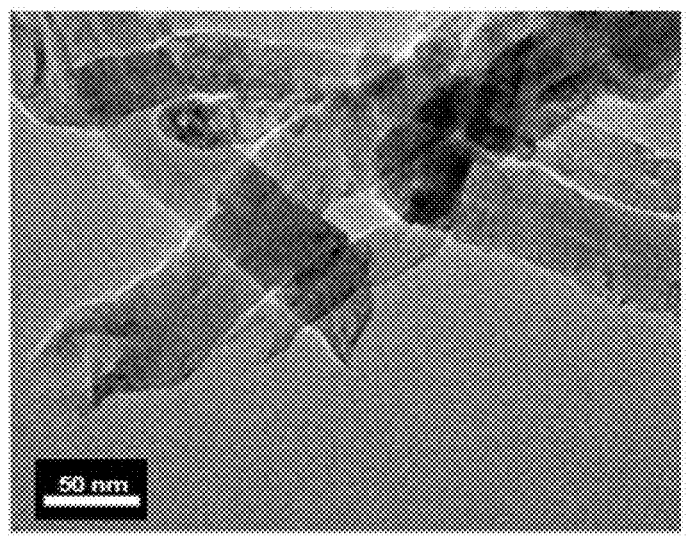

TEM analysis. FIG. 37C shows a representative TEM image of CNT formed after catalytic methane decomposition. It was observed that corn-shaped metal nanoparticles from the catalyst (9Ni—Fe/SiO2) were encapsulated at the tip of CNT formed. After purification using acid reflux the metal nanoparticles were removed from the CNT leaving behind an opening at the tip of nanotube (FIG. 37D). Thus, TEM analysis confirmed the removal of metal nanoparticles after acid reflux.

Example 3

Materials. Analytical grade chemicals including AlCl$_3$.6H$_2$O, Ni(NO$_3$)$_2$.6H$_2$O, Co(NO$_3$)$_2$.6H$_2$O, ethanol (anhydrous) and propylene oxide (PO) were purchased from Acros Organics and used as received without further purification. Deionized water used in preparing the metal solutions.

Synthesis of Ni/Al$_2$O$_3$ and Co/Al$_2$O$_3$ aerogel catalysts. Ni/Al$_2$O$_3$ and Co/Al$_2$O$_3$ aerogel catalysts were synthesized by a sol-gel method. This section describes the preparation of 2 g 50 wt % Ni/Al$_2$O$_3$ aerogel catalyst (50 wt % metal on 50 wt % Al$_2$O$_3$ support) as a particular example. In the preparation, 4.74 g of AlCl$_3$.6H$_2$O mixed with 4.95 g of Ni(NO$_3$)$_2$.6H$_2$O, followed by adding 10 mL of deionized water and 15.5 mL anhydrous ethanol under vigorous agitation for 30 min. The beaker containing the solution was sealed and then heated in an oil bath at 80° C. for 1 h. The solution was cooled to room temperature and transferred to an ice bath to which 16 mL of propylene oxide (purchased from Acros Organics) was added. The solution was set at room temperature without agitation for 35 min to allow aerogel to form. After that, the wet gel was washed with deionized water three times and soaked in anhydrous ethanol overnight to allow the pentation of ethanol into the pores. The wet gel was vacuum dried for 9 h followed by calcination at 600° C. for 8 h. Before catalytic methane decomposition test, the Ni/Al$_2$O$_3$ aerogel catalyst reduced at 450° C. for 2.5 h. For Co/Al$_2$O$_3$ aerogel catalyst, the preparation method was essentially the same as used in the Ni/Al$_2$O$_3$ aerogel catalyst, except that Co/Al$_2$O$_3$ aerogel catalysts were calcined at 500° C. for 3 h and reduced at 600° C. for 2.5 h.

Catalyst Characterization. After the reaction, the used catalysts characterized by a series of analytical instrumentations. The x-ray diffraction (XRD) measurements were performed on PANalytical X'pert Pro X-ray Diffractometer using Cu Kα radiation, where the step scans taken over the range of 10-80°. The morphologies and microstructures of the carbon materials characterized by transmission electron microscopy (TEM) on JEOL JEM-2100. The TEM samples prepared by sonication of the spent catalyst in isopropanol and a copper grid was used to load the suspension. Raman analyses performed on Renishaw InVia Raman spectrometer where the Raman spectra were recorded using a green excitation line 532 nm. Thermogravimetric analysis (TGA) was performed using a TA_SDT-650_Discovery model instrument in 5% O$_2$/He atmosphere. The temperature ramped from 150-900° C. at a heating rate of 10° C./min.

The BET analysis was carried out on an ASAP 2020 instrument using nitrogen at 77 K. The SEM images acquired on a Hitachi S-4700 scanning electron microscope. The XPS analysis was carried out on a Physical Electronics PHI 5000 Versa Probe X-Ray Photoelectron Spectroscopy.

Reactor Apparatus. Methane decomposition was carried out in a fixed-bed reactor. The reactor made of a quartz tube with an internal diameter of 10 mm. In each test, 100 mg of a Ni/Al$_2$O$_3$ or Co/Al$_2$O$_3$ aerogel catalyst placed in the reactor. The catalysts were reduced by hydrogen as described herein above before testing. After purging with N$_2$ gas, the reactor temperature was increased to 650° C. then switched to reactant gas (30% CH$_4$/N$_2$, 70 mL/min). The methane decomposition reaction was carried out at GHSV of 42000 h$^{-1}$. The composition of the outlet gas analyzed by an online gas chromatography (Perkin ElmerARNEL, Clarus 500) equipped with a thermal conductivity detector.

Effect of Different Preparation Methods on Catalyst Performance for Methane Decomposition.

Figure 39A:
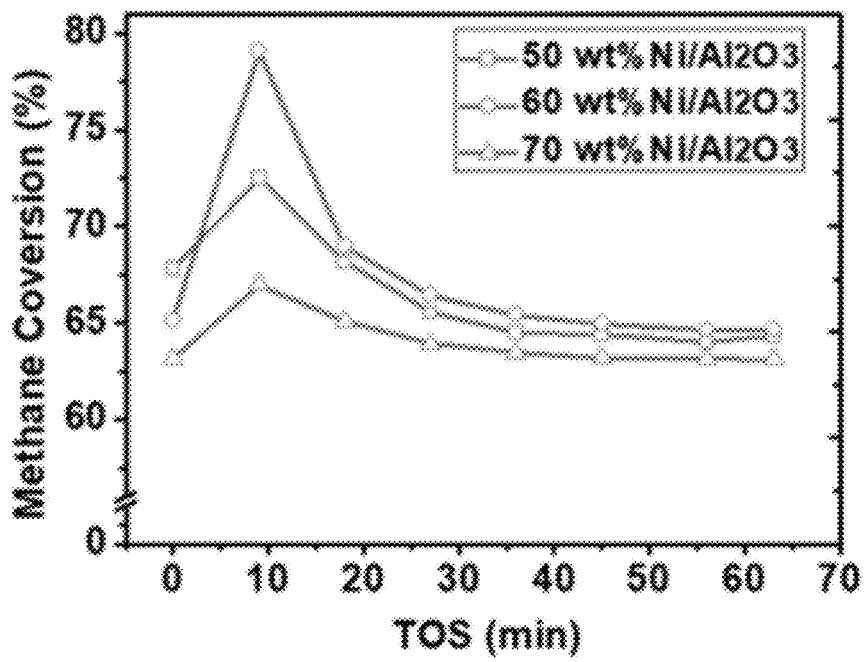
FIGS. 39A-39D show representative data for methane decomposition over disclosed metal oxide aerogel catalysts. For the data shown, T=650° C., P=0.1 MPa, and GHSV=42000 $h^{-1}$.
Figure 39B:
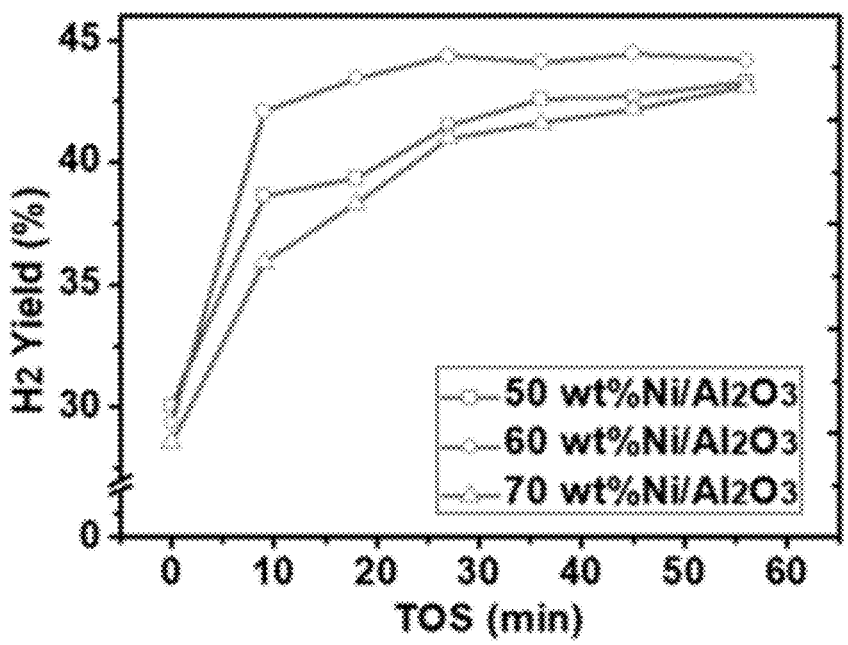

Synthesis and performance test of Ni/Al$_2$O$_3$ and Co/Al$_2$O$_3$ aerogel catalysts. FIGS. 38A and 38B schematically illustrate the major steps involved in the synthesis of the exemplary disclosed aerogel catalysts. In the process of aerogel catalyst preparation, AlCl$_3$.6H$_2$O was chosen as a precursor for alumina oxide, and ethanol and deionized water used as solvents. Propylene oxide (purchased from Acros Organics) was used as a gelation agent that consumed protons from the hydrated metal species to facilitate sol-gel polymerization reaction (e.g., see Baumann T F, et al. Chem Mater 2005; 17: 395-401; and Gash A E, et al. Chem Mater 2001; 13: 999-1007). As shown in FIG. 39A, in the initial 20 min reaction time, the 60 wt % Ni/Al$_2$O$_3$ aerogel catalyst exhibited the highest CH$_4$ conversion of 79.2%, but as the reaction proceeded, the conversion declined at a rate faster than 50 wt % and 70 wt % Ni/Al$_2$O$_3$ aerogel catalysts. It appeared that all three Ni/Al$_2$O$_3$ aerogel catalysts had induction periods during the early stage of the reaction. After the induction period, the 50 wt % Ni/Al$_2$O$_3$ catalyst showed the highest methane conversion. The amount of carbon formed per gram of aerogel catalyst was calculated, which was found to be approximately 0.63-0.83 g over 50 wt % Ni/Al$_2$O$_3$ aerogel catalyst, 3.31-3.39 g for 60 wt % Ni/Al$_2$O$_3$ aerogel catalyst and 0.53-0.65 g for 70 wt % Ni/Al$_2$O$_3$ aerogel catalyst, respectively. FIG. 39B shows hydrogen yields for the indicated three Ni/Al$_2$O$_3$ aerogel catalysts. Consistent with time-on-stream methane conversion as shown in FIG. 39A, hydrogen yields showed a trend of rapid increase during the first 20 min, then, starting to level off afterward.

Figure 39C:
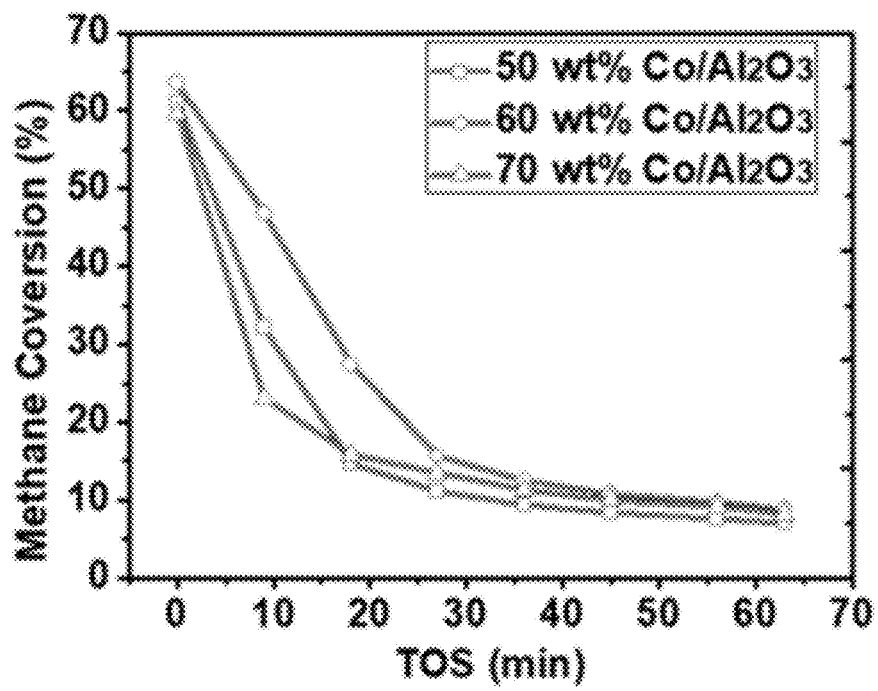
Figure 39D:
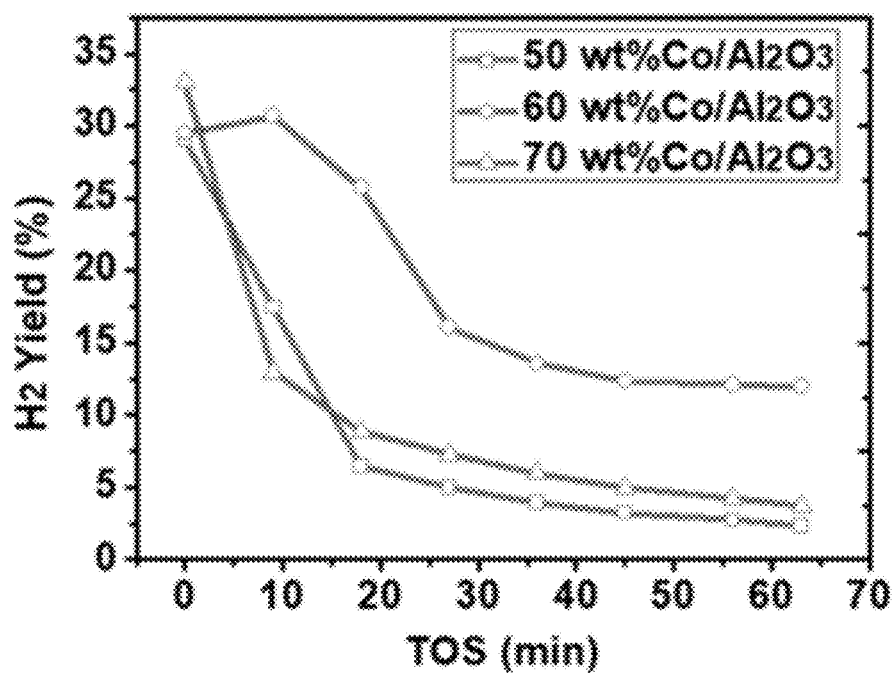

Methane decomposition over three different metal loading Co/Al$_2$O$_3$ aerogel catalysts performed. As shown in FIG. 39C, distinct from Ni/Al$_2$O$_3$ aerogel catalyst, the induction period was not observed over Co/Al$_2$O$_3$ aerogel catalysts. The initial activities of the three catalysts appeared to be slightly different with 60 wt % Co/Al$_2$O$_3$ aerogel being the highest. Methane conversion rate dropped significantly for all three catalysts during initial 20 min after which it levels off at 10% methane conversion level. Within one hour test, the loss of methane conversion was significant for Co/Al$_2$O$_3$ catalyst compared with Ni/Al$_2$O$_3$ which can be explained by the enhanced pore size distribution and tortuosity of Ni/Al$_2$O$_3$ aerogel in the following sections. The time-on-stream yield of hydrogen production was consistent with methane conversion. Ni/Al$_2$O$_3$ aerogel catalyst exhibited higher methane conversion and carbon productivity. As shown in FIG. 39D, for the Co/Al$_2$O$_3$ aerogel catalyst, H$_2$ yield was relatively high when the metal content was 50 or 60 wt %. However, when the metal content reached 70 wt % in the aerogel catalyst, $H_2$ production would decrease probably caused by metal sintering.

Figure 40A:
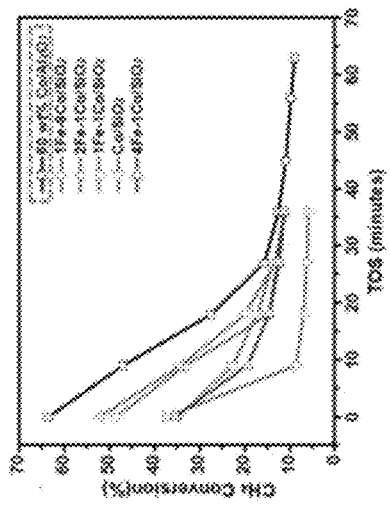
FIGS. 40A-40D show representative data for methane decomposition over disclosed metal oxide aerogel catalysts are compared metal oxide catalysts prepared by an incipient wetness method. For the data shown, T=650° C. and P=0.1 MPa[1]. The data obtained using disclosed aerogel catalysts in the figures correspond to the lines associated with 50 wt % Ni/$Al_2O_3$, 60 wt % Ni/$Al_2O_3$, and 70 wt % Ni/$Al_2O_3$. The other mono- or bimetallic metal oxide catalysts indicated in the figures were prepared by an incipient wetness method. Each of FIG. 40A, FIG. 40B, FIG. 40C, FIG. 40D, FIG. 40E.
Figure 40B:
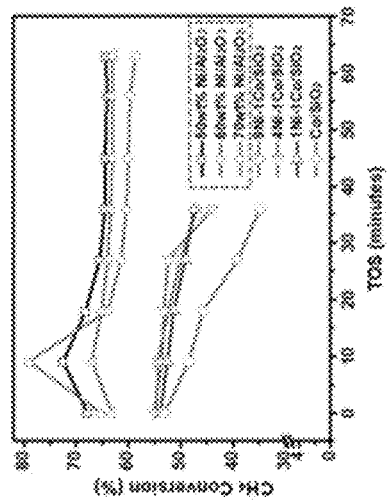
Figure 40C:
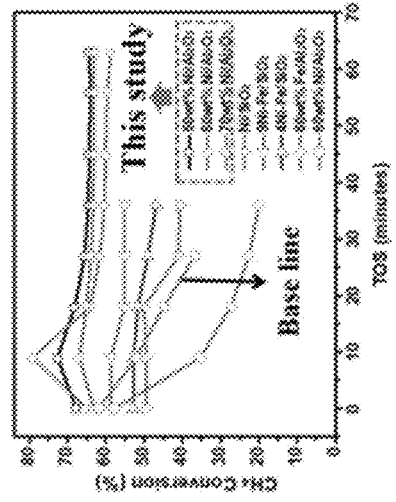
Figure 40D:
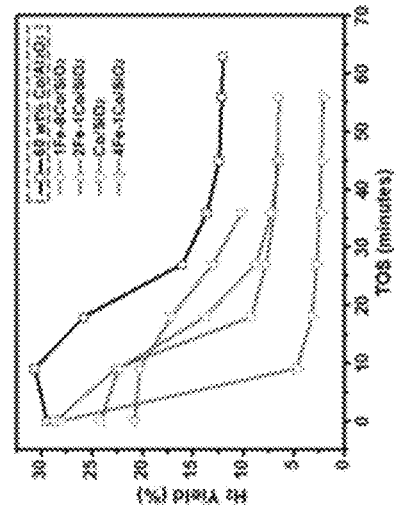
Figure 40E:
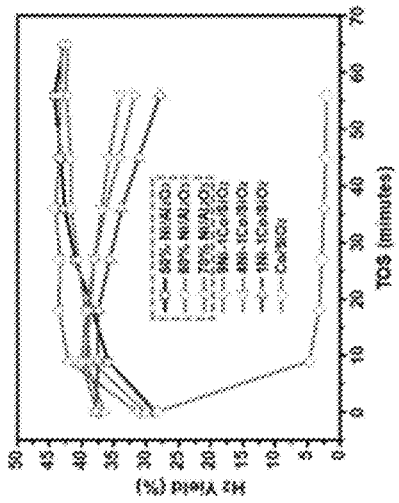
FIG. 40F shows methane conversion data over disclosed metal oxide aerogel catalysts (50 wt % Ni/$Al_2O_3$, 60 wt %
Figure 40F:
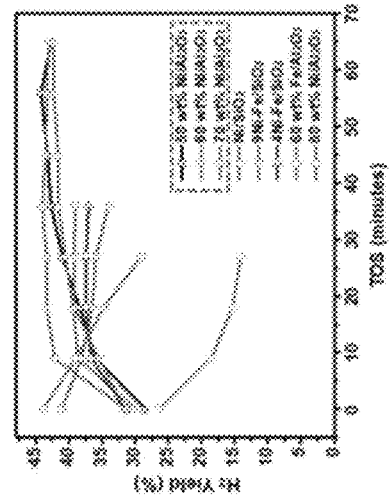

Catalytic performance comparison of the catalysts prepared by different methods. The catalytic activity of $Ni/Al_2O_3$ and $Co/Al_2O_3$ aerogel catalysts in the methane decomposition reaction compared with previously reported catalysts synthesized by conventional incipient wetness technique (see Ayilath-Kutteri D, et al. Catal Sci & Technol 2018). As shown in FIGS. 40A and 40B, the catalytic activity of $Ni/Al_2O_3$ aerogel catalyst was significantly higher than that of Ni, Fe, mono or bimetallic on $Al_2O_3$ or $SiO_2$ which were synthesized by conventional incipient wetness technique. As shown in FIG. 40C, the catalytic activity of $Co/Al_2O_3$ aerogel catalyst was also higher than that of other Co or Co-base catalysts synthesized by incipient wetness technique. As shown in FIGS. 40D and 40E, the $H_2$ yield was measured to be in the range of 30-45% for three $Ni/Al_2O_3$ aerogel catalysts, while the rest of the other catalysts showed only 5-30% of $H_2$ yield. As shown in FIG. 40F, the hydrogen yield of the $Co/Al_2O_3$ aerogel catalyst was also higher than that of other Co or Co-base catalysts. All of the above results suggest that the interaction between metal and support and the method of aerogel catalyst synthesis can influence the catalytic activity in methane decomposition. Catalysts synthesized by incipient wetness, without wishing to be bound by a particular, are believed to have mainly bonding between metal and support via weak van der Waals force between. The binding energy may not be strong enough to retain metal on the surface, leaching of metal particles from the support surface to form tip-growth CNT may occur. The data herein suggest that the method of preparation of a catalyst, and structure associated with the preparation method, can influence the performance of catalysts.

Characterization of $Ni/Al_2O_3$ and $Co/Al_2O_3$ aerogel catalysts. To investigate the properties of the $Ni/Al_2O_3$ and $Co/Al_2O_3$ aerogel catalysts, a series of characterization analysis including XRD, TGA, Raman, XPS, BET, and SEM were carried out. The properties of CNT were measured by TEM to assess correlation with the growth pattern and mechanism. The XRD patterns of fresh and spent $Ni/Al_2O_3$ and $Co/Al_2O_3$ aerogel catalysts are show in FIGS. 41A and 41B. The XRD spectra data therein show characteristic peaks associated with Ni, Co, and $Al_2O_3$ support. Some peaks related to $Al_2O_3$ support were not visible in the XRD spectra, likely due to the presence of high-intensity metal peaks. The sharp peaks for metals indicated the formation of the crystalline phase of the active element (Ni and Co). The Ni characteristic peaks identified at $2\theta=37.3°$, $46.7°$, $52.8°$, $66.6°$, and $76.6°$ (JCPDS No. 04-850) whereas Co characteristic peaks observed at $2\theta=44.8°$, $48.2°$, and $77.6°$ (JCPDS No. 15-0806; see Monzón A, et al. Catal Today 2006; 116: 264-70; and Li J, Zhou L, Zhu Q and Li H. Ind Eng Chem Res 2013; 52: 6647-54). After the reaction, the used catalysts were once again characterized by XRD analysis. As show in FIGS. 41A and 41B, compared to the fresh catalysts, XRD patterns of the spent $Ni/Al_2O_3$ and $Co/Al_2O_3$ aerogel catalysts showed the presence of graphitic carbon by a very intense peak (002) at $2\theta=26.2°$ (Wang G, et al. Energy & Fuels 2013; 27: 4448-56). Due to the limitation of XRD analysis, the microstructural features between CNT and similar graphitic structures were difficult to differentiate because their characteristic peaks are overlapping. The d-spacing of CNT was calculated using Bragg's equation ($d=\lambda/2 \sin \theta$) for the graphitic peak. D-spacing was calculated to be 0.34 nm, which correlated well with the distance of two graphite layers (0.335 nm), implying the high crystallinity of carbon formed over all the aerogel catalysts. The intensity of the (002) diffraction peak was related to the degree of graphitization. Lower intensity indicated the presence of the less graphitized material. In the case of $Co/Al_2O_3$ aerogel catalysts, the overall intensity of the CNT peaks appeared much less compared to the $Ni/Al_2O_3$ aerogel catalysts. The $Co/Al_2O_3$ aerogel catalysts produced CNTs that were less graphitized.

Raman spectroscopic measurement was carried out to study the quality and crystallinity of the carbon products. As shown in FIGS. 42A and 42B, two distinct bands were observed, the D-band at 1342 $cm^{-1}$ (likely representing either disordered or amorphous carbon) and the G-band at 1575 $cm^{-1}$ (likely representing the crystalline carbon; see Wei Q, et al. Appl Catal A Gen 2004; 260: 223-28). The graphitization degree and the crystallinity of CNTs can measure by the intensity ratio of $I_D/I_G$. The aerogel catalyst with the lowest $I_D/I_G$ carbon represents the highest crystallinity. The $I_D/I_G$ ratio for 60 wt % $Ni/Al_2O_3$ aerogel catalyst is slightly higher than 50 and 70 wt % $Ni/Al_2O_3$ aerogel catalysts. The $I_D/I_G$ values for 70 and 60 wt % $Co/Al_2O_3$ aerogel catalysts are similar. Raman spectra showed that both 70 wt % $Ni/Al_2O_3$ and 70 wt % $Co/Al_2O_3$ aerogel catalysts formed most crystalline CNTs with the lowest $I_D/I_G$(0.835 and 0.725). Although the 60 wt % $Ni/Al_2O_3$ aerogel catalyst showed higher productivity than $Co/Al_2O_3$ aerogel catalysts, the $I_D/I_G$ was not lower implying the formation of defect CNTs (D band in Raman). Without wishing to be bound by a particular theory, it is possible that the length of CNTs on $Ni/Al_2O_3$ aerogel catalysts are much longer than those on $Co/Al_2O_3$ aerogel catalysts. Poor electron transfer that may affect crystallization and cause a defect of CNTs. The data herein are consistent with the TEM analysis discussed herein below.

The used $Ni/Al_2O_3$ and $Co/Al_2O_3$ aerogel catalysts were characterized by TGA to investigate the thermal stability of CNTs. The TGA measurements were carried out in an atmosphere of 2% $O_2$/He. As shown in FIG. 42C, there is no thermal degradation taking place in the temperature range of 150-550° C. for $Ni/Al_2O_3$ aerogel catalysts and 150-400° C. for $Co/Al_2O_3$ aerogel catalysts, which likely correspond to amorphous carbon decomposition. The carbon deposited on the aerogel catalysts didn't appear to be characteristic of amorphous carbon. The TGA analysis revealed that carbon on the spent catalysts possessed a crystalline structure. As shown in FIG. 42C, for the 50 wt % $Ni/Al_2O_3$ aerogel catalyst, the thermal degradation started at around 500° C. with a weight loss of 84%. For the 60 wt % $Ni/Al_2O_3$ aerogel catalyst, the degradation started at 500° C. with a weight loss of 87%. Similar to the 60 wt % $Ni/Al_2O_3$ aerogel catalyst, the 70 wt % $Ni/Al_2O_3$ aerogel catalyst showed a weight loss of 78%.

It was found that the TGA curves of the $Co/Al_2O_3$ aerogel catalysts were different from $Ni/Al_2O_3$ aerogel catalysts. Thermal degradation temperature for $Co/Al_2O_3$ aerogel catalysts was much lower than occurred over $Ni/Al_2O_3$ aerogel catalysts. In addition, the amount of carbon formed over three $Co/Al_2O_3$ aerogel catalysts was found much less than that of $Ni/Al_2O_3$ aerogel catalysts, which was consistent with the results of catalytic activity results. XPS measurement was performed to analyze surface elements including carbon, oxygen, nickel, and cobalt. The results shown FIG. 42D are in general agreement with literature reported assignment of the peaks for C 1s, O 1s, Al 2p, Ni 2p3, and Co 2p3 spectra (e.g., see Monzón A, et al. Catal Today 2006; 116: 264-70; and Li J, Papadopoulos C, Xu J M and Moskovits M. Appl Phys Lett 1999; 75: 367-9). Specifically, the peaks for C1s of Ni/Al$_2$O$_3$ and Co/Al$_2$O$_3$ aerogel catalysts can be deconvoluted into the peaks at 284.6 and 288.0 eV, respectively. The core-level XPS spectrum of O 1s showed the main peak at 531.7 eV and 532.7 eV for Ni/Al$_2$O$_3$ and Co/Al$_2$O$_3$ aerogel catalysts, respectively. An apparent signal peak observed in the core-level XPS spectrum of Al 2p, which was at 80 eV. The XPS spectrum of Ni 2p3 showed two main peaks at 531.7 eV and 532.7 eV [23]. For Co 2p3, two main peaks at 785.6 and 800.2 eV confirmed in the core-level XPS spectrum of Co/Al$_2$O$_3$ aerogel catalyst. The results indicated the coordination of Ni$^{2+}$ and Co$^{2+}$ ions with Al$_2$O$_3$ support in Ni/Al$_2$O$_3$ and Co/Al$_2$O$_3$ aerogel catalysts. Without wishing to be bound by a particular theory, it is possible that the coordination forms strong interaction which will help to improve the catalytic activity.

SEM and BET measurements were carried out to study the microstructure, pore size distribution and adsorption-desorption properties of the Ni/Al$_2$O$_3$ and Co/Al$_2$O$_3$ aerogel catalysts. The measurements were limited to the 60 wt % Ni/Al$_2$O$_3$ and Co/Al$_2$O$_3$ aerogel catalysts which showed the best performance in the methane decomposition reaction. As shown in FIG. 43A, the isotherms of the 60 wt % Ni/Al$_2$O$_3$ and Co/Al$_2$O$_3$ aerogel catalysts were quite similar, and the BET surface area of the two aerogel catalysts was measured to be 324, 271 m$^2 \cdot$g$^{-1}$, respectively. The BET surface area was higher than that of other reported crystalline metal oxide aerogels (Baumann T F, et al. Chem Mater 2005; 17: 395-401; Gaponik N, et al. Adv Mater 2008; 20: 4257-62; Sanchez-Paradinas S, et al. Adv Mater 2015; 27: 6152-6; and Sorensen L, Strouse G F, and Stiegman A E. Adv Mater 2006; 18: 1965-7).

As shown in FIG. 43B, the Barrett-Joyner-Halenda (BJH) pore size for 60 wt % Ni/Al$_2$O$_3$ aerogel catalyst was positioned in the region of ~10-25 nm whereas for the 60 wt % Co/Al$_2$O$_3$ aerogel catalyst, the pore diameter was mainly distributed at ~5-15 nm. Although annealing reduced the surface area, the composite aerogel catalysts still exhibited high surface area after heat treatment at 650° C. and a broad pore size distribution at the mesoporous range. We have known that mesoporous catalysts showed a higher activity than that of microporous catalysts. Nanocomposite mesoporous Ni/Al$_2$O$_3$ and Co/Al$_2$O$_3$ aerogel catalysts have higher surface area and good adsorption properties, which helps to improve the catalytic activity and oxidative regeneration. In contrast, catalysts synthesized by conventional incipient wetness technique were not able to maintain the porous structure during the preparation process. Therefore, the results indicate that catalysts synthesized by different methods have great influence on its properties. SEM images showed that for 60 wt % Ni/Al$_2$O$_3$ and Co/Al$_2$O$_3$ aerogel catalysts, channels with the gap distance from a few tens to hundred nanometers were formed among colloidal particles. Cross-linking CNTs formed among CNTs and catalyst particles. As shown in FIGS. 43C and 43D, SEM images indicate that the CNTs were interlaced and combined with support particles to form a reticular structure and this cross-linked structure was very porous. It appeared that the tortuosity of the catalysts was very important for the growth of CNTs.

Effect of different preparation methods of catalysts on the growth pattern of CNTs. As shown in the part of FIG. 44A, for 60 wt % and 70 wt % Ni/Al$_2$O$_3$ aerogel catalysts, the CNTs formed was found to be multiwall CNTs due to large crystallite size of active site metal nanoparticles, which had been confirmed by XRD techniques. In addition, the CNTs formed over Ni/Al$_2$O$_3$ and Co/Al$_2$O$_3$ aerogel catalysts belong to the base growth pattern. It crowded dense population with entangled fibers. From the SEM images, we can observe that CNTs were growing in random direction due to space competition. The length of CNTs depends on process conditions, especially residence time. FIGS. 44A-44F show that the length of most of the CNTs formed was in the range of 50-200 nm. It observed that the walls of CNTs formed were of linear or curved structure in which the graphene layers stacked obliquely. In these types of CNTs, the graphite layer is not consistent with the axis of CNTs. Without wishing to be bound by a particular theory, as graphene layers stack up, the defects may form between the edge planes, which may explain the observation of a D band in Raman spectra, but not the amorphous phase identified in the TGA analysis.

For 60 wt % and 70 wt % Co/Al$_2$O$_3$ aerogel catalysts, as shown in FIGS. 45A-45F, multiwall CNTs with 50-150 nm diameters were formed together with a transition metal nanoparticles located at the bottom. It can observe that the wall of these CNTs had a parallel morphology. Compared to CNTs formed over Ni/Al$_2$O$_3$ aerogel catalysts, it was relatively thin and smaller in diameter. However, for those catalysts synthesized by conventional incipient wetness technique, CNTs formed had metal nanoparticles at the tip and base. These traditional catalysts gave a mixture of a tip and base growth CNTs (see Wang G, et al. Energy & Fuels 2013; 27: 4448-56). The growth patterns of catalysts prepared by different methods are different. Compared to conventional catalysts, the aerogel catalysts gave a selective approach to realize the base growth of CNTs that is lacking in conventional catalysts.

From the TEM images discussed herein, it can be observed that CNTs formed over Ni/Al$_2$O$_3$ or Co/Al$_2$O$_3$ aerogel catalysts were essentially all formed via base growth. Without wishing to be bound by a particular theory, this may be attributable to a strong interaction between metal nanoparticles and aerogel support. Further, without wishing to be bound by a particular theory, during the initial stage of methane decomposition reaction, carbon diffusion may occur on Ni or Co that strongly anchored in the aerogel structure, thereby providing a barrier for carbon to penetrate between the support and metal. As a result, carbon precipitation on the outer surface of metal can became dominant. CNTs can only grow from the upper surface of the metal that is anchored on the support. Without wishing to be bound by a particular theory, it is believed that graphene planes formed using the aerogel catalysts are strongly chemisorbed on the metal surface reducing the surface energy of the metal nanoparticles and enhancing metal-support interaction. Moreover, TEM analysis showed that graphitic caps formed on the metal nanoparticles which were lifted upwards during the subsequent deposition of carbon fragments. The results reveal that CNTs grow away from the metal nanoparticles, forming a base growth of CNTs.

Regeneration test of the Ni/Al$_2$O$_3$ aerogel catalyst. Aerogel catalyst regeneration test was performed using 60 wt % Ni/Al$_2$O$_3$ aerogel catalyst. The formation of base growth CNTs confirmed by TEM analysis. After the first cycle of CH$_4$ decomposition conducted under the conditions of T=650° C., TOS=60 min, and GHSV=42000 h$^{-1}$, the used aerogel catalyst was regenerated using 10% O$_2$ at 650° C. for 45 min. Equation 1 represents methane decomposition whereas equation R2 represents oxidative regeneration process. The whole process repeated five times and the results are shown in FIGS. 46A and 46B.

$$CH_4 \rightarrow C_{CNT} + 2H_2 \quad \text{(Equation 1)}$$

$$C_{CNT} + O_2 \leftrightarrow COx \quad \text{(Equation 2)}$$

The 60 wt % Ni/Al$_2$O$_3$ aerogel catalyst was selected to perform the regeneration test. As illustrated in FIG. 46A, this aerogel catalyst showed a CH$_4$ conversion of 67.2% in the first 15 min and gradually deactivated to 61.4% CH$_4$ conversion in the second cycle. In the third cycle, this aerogel catalyst exhibited a relatively higher conversion of 69.3% in the first 15 min and then deactivated to 44.7% CH$_4$ conversion in the last 30 min. In the fourth cycle, it began with the CH$_4$ conversion of 68.3% in the first 15 min and gradually deactivated to 39.7% CH$_4$ conversion. After four cycles, the 60 wt % Ni/Al$_2$O$_3$ aerogel catalyst can still resume initial activity, exhibiting CH$_4$ conversion of 68.7% in the first 15 min and then deactivated to 34.8% CH$_4$ conversion. Essentially, the regeneration protocol developed in this study was able to resume initial activity, and the loss of CH$_4$ conversion between cycles needed to be further investigated. As shown in FIG. 46B, the H$_2$ yield was found to be in the range of 44.3-35.9% for this aerogel catalyst in the second and third cycles. For the fourth and fifth cycle, H$_2$ yield decreased to 34.5-26.7% range.

As shown in FIGS. 47A-47D, CNTs formed in the 2$^{nd}$ cycle were characterized using TEM to confirm the base growth of CNTs. It was observed that metal nanoparticles remained on the support, whereas the CNTs grew from the base. Even after the fifth cycle, TEM analysis showed that CNTs formed were still base-growth as shown in FIGS. 48A-48D. The data herein show that improved porosity and tortuosity of the disclosed aerogel catalysts are of great significance and provide enhanced catalytic activity, stability, and reproducibility.

In summary, the results showed that aerogel catalysts synthesized by the disclosed sol-gel method exhibited enhanced performance compared with mono and bimetallic Ni, Fe, and Co conventional catalysts prepared by an incipient wetness technique. Without wishing to be bound by a particular theory, the enhanced performance of the disclosed aerogel catalysts may be attributable to a synergetic effect occurring at the interface of metals and support during the aerogel synthesis process. Further, without wishing to be bound by a particular theory, it is possible that the observed slight change in the catalytic activity observed after regeneration may be attributable to sintering of metal particles, or a need to further optimize regeneration protocols. For example, the 60 wt % Ni/Al$_2$O$_3$ aerogel catalyst showed a high CH$_4$ conversion of 79.2%. Among Co/Al$_2$O$_3$ aerogel catalysts the catalytic activity towards methane conversion was lower than that of the Ni/Al$_2$O$_3$ aerogel catalysts. Both Ni/Al$_2$O$_3$ and Co/Al$_2$O$_3$ aerogel catalysts produced base growth CNTs, which is considered to critical for easy for harvesting without sacrificing the catalyst sites. After five cycles, the 60 wt % aerogel catalyst still exhibited a high CH$_4$ conversion of 68.7%, while at the same continuing to provide essentially only base growth CNTs. The disclosed aerogel catalyst are believed to contain an increased number of active sites, while exhibiting relatively strong metal-support interactions, thereby leading to the formation of base growth CNTs. The disclosed aerogel catalysts provide a new approach to provide essentially only base growth CNTs.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed:

1. A method of decomposing a lower hydrocarbon, the method consisting of the steps of:
   heating a catalyst bed to a temperature of about 500° C. to about 1000° C. at a heating rate of about 1° C. min$^{-1}$ to about 20° C. min$^{-1}$;
      wherein the catalyst bed comprises a metal-supported catalyst;
         wherein the metal-supported composition comprises a 3d transition metal selected from Ni, Fe, Co, Mn, Cr, and Mo and a support material selected from a silica, an alumina, a zeolite, titanium dioxide, or a mixture thereof;
         wherein the 3d transition metal is present in an amount from about 5 wt % to about 70 wt % based on the total weight of the 3d transition metal and the support material; and
         wherein the support material is present in an amount from about 95 wt % to about 30 wt % based on the total weight of the 3d transition metal and the support material,
      wherein the metal-supported catalyst is positioned within a reactor;
      wherein the reactor has a fixed-bed or a moving bed flow reactor configuration;
      wherein the reactor comprises an inlet end and an outlet end for gas flow;
   providing a flow of a reactant gas through to the inlet end at a reactant gas flow rate of about 50 ml·min$^{-1}$ to about 150 ml·min$^{-1}$ and a time-on-stream (TOS) from about 10 minutes to about 240 minutes;
      wherein the flow of the reactant gas is in contact with the catalyst bed; and
      wherein the reactant gas comprises a lower hydrocarbon and an inert gas;
   collecting a outflow gas at the outlet end;
      wherein the outflow gas comprises hydrogen;
   regenerating the catalyst consisting of terminating the flow of reactant gas and providing a regeneration gas to the catalyst bed;
      wherein the regeneration gas is in contact with the catalyst bed for a contact period from about 5 minutes to about 240 minutes;
      wherein the temperature of the catalyst bed is from about 250° C. to about 750° C.; and
      wherein the regeneration gas comprises oxygen;
   and repeating the heating, the providing a flow of the reactant gas, the collecting the outflow gas, and the regenerating the catalyst for 1-10 cycles.

2. The method of claim 1, wherein the metal-supported catalyst is prepared by an incipient wetness technique.

3. The method of claim 1, wherein the metal-supported catalyst is an aerogel catalyst prepared by a sol-gel technique.

4. The method of claim 3, wherein the aerogel catalyst has a BET surface area of from about 50 m$^2$·g$^{-1}$ to about 500 m$^2$·g$^{-1}$.

5. The method of claim 3, wherein the aerogel catalyst has a catalyst pore volume of from about 0.3 cm$^3$·g$^{-1}$ to about 1.6 cm$^3$·g$^{-1}$.

6. The method of claim 1, wherein reactant gas comprises from about 10% to about 100% of the lower hydrocarbon and from about 90% to about 0% of a second inert gas.

7. The method of claim 1, wherein the lower hydrocarbon comprises methane, ethane, propane, butane, or a combination thereof.

8. The method of claim 1, wherein the inert gas is selected from nitrogen, argon, or a mixture thereof.

9. The method of claim 1, wherein the reactant gas flow rate of about 60 ml·min$^{-1}$ to about 80 ml·min$^{-1}$.

10. The method of claim 1, wherein the time-on-stream is from about 10 minutes to about 90 minutes.

11. The method of claim 1, wherein the decomposing the lower hydrocarbon yields hydrogen at a conversion efficiency of about 30% to at about 90%.

12. The method of claim 1, wherein the decomposing lower hydrocarbon yields carbon.

13. The method of claim 12, wherein the carbon is free of amorphous carbon.

14. The method of claim 12, wherein the carbon comprises carbon nanotubes.

15. The method of claim 14, wherein the carbon nanotubes have a mean outside diameter of about 5 nm to about 150 nm.

16. The method of claim 14, wherein the carbon nanotubes comprise tip growth carbon nanotubes, base growth carbon nanotubes, and mixtures thereof.

17. The method of claim 1, wherein the decomposing the lower hydrocarbon is associated with an efficiency of lower hydrocarbon conversion; and wherein the efficiency of lower hydrocarbon conversion does not change by more than 10% with each cycle of the 1-10 cycles.

18. The method of claim 1, wherein the regeneration gas comprises from about 5% to about 25% oxygen.

* * * * *